United States Patent
Iwata et al.

(10) Patent No.: US 9,404,010 B2
(45) Date of Patent: Aug. 2, 2016

(54) METHOD FOR FORMING MULTILAYER COATING FILM

(71) Applicant: KANSAI PAINT CO., LTD., Hyogo (JP)

(72) Inventors: Naoyuki Iwata, Kanagawa (JP); Fumio Yamashita, Kanagawa (JP); Minoru Ishikura, Kanagawa (JP); Takashi Nakayabu, Kanagawa (JP); Kazushi Konishi, Kanagawa (JP); Toshiaki Morita, Aichi (JP); Masami Kobata, Kanagawa (JP)

(73) Assignee: KANSAI PAINT CO., LTD., Hyogo (JP)

( * ) Notice: Subject to any disclaimer, the term of this patent is extended or adjusted under 35 U.S.C. 154(b) by 0 days.

(21) Appl. No.: 14/423,525

(22) PCT Filed: Jun. 24, 2013

(86) PCT No.: PCT/JP2013/067293
§ 371 (c)(1),
(2) Date: Feb. 24, 2015

(87) PCT Pub. No.: WO2014/045657
PCT Pub. Date: Mar. 27, 2014

(65) Prior Publication Data
US 2015/0218405 A1    Aug. 6, 2015

(30) Foreign Application Priority Data

Sep. 20, 2012  (JP) .................. 2012-206449

(51) Int. Cl.
| | | |
|---|---|---|
| C09D 133/08 | (2006.01) | |
| C09D 133/14 | (2006.01) | |
| C09D 175/04 | (2006.01) | |
| C08G 18/48 | (2006.01) | |
| C08L 75/04 | (2006.01) | |
| B05D 7/00 | (2006.01) | |
| C09D 133/06 | (2006.01) | |
| C08G 18/62 | (2006.01) | |
| C08G 18/79 | (2006.01) | |
| C08G 18/80 | (2006.01) | |
| C08G 18/10 | (2006.01) | |
| C08G 18/28 | (2006.01) | |
| C08G 18/22 | (2006.01) | |
| C08G 18/24 | (2006.01) | |
| C09D 5/00 | (2006.01) | |

(52) U.S. Cl.
CPC .............. *C09D 133/08* (2013.01); *B05D 7/572* (2013.01); *C08G 18/10* (2013.01); *C08G 18/222* (2013.01); *C08G 18/227* (2013.01); *C08G 18/244* (2013.01); *C08G 18/283* (2013.01); *C08G 18/2825* (2013.01); *C08G 18/4833* (2013.01); *C08G 18/6229* (2013.01); *C08G 18/792* (2013.01); *C08G 18/8064* (2013.01); *C09D 133/066* (2013.01); *C09D 133/14* (2013.01); *C09D 175/04* (2013.01); *B05D 2401/20* (2013.01); *B05D 2425/01* (2013.01); *C09D 5/00* (2013.01); *Y10T 428/31551* (2015.04)

(58) Field of Classification Search
CPC ........ B05D 7/572; B05D 1/02; B05D 3/0254; C09D 133/10; C09D 175/04; C09D 123/28; C09D 179/04; C09D 133/08; C09D 133/14; C09D 133/066; C09D 5/00; C08G 18/4833; C08G 18/6229; C08G 18/792; C08G 18/8064; C08G 18/10; C08G 18/2825; C08G 18/283
USPC ....................... 428/423.1; 524/507; 427/385.6
See application file for complete search history.

(56) References Cited

U.S. PATENT DOCUMENTS

| | | | | |
|---|---|---|---|---|
| 4,518,724 | A * | 5/1985 | Kuwajima | ............ C09D 133/06 523/501 |
| 5,747,558 | A * | 5/1998 | Nishi | ...................... B05D 7/57 523/201 |
| 6,274,693 | B1 * | 8/2001 | Poth | .................... C08G 18/6254 427/385.5 |
| 2001/0024693 | A1 * | 9/2001 | Morimoto | ................ B05D 7/57 427/404 |
| 2002/0165335 | A1 | 11/2002 | Kobata et al. | |
| 2006/0036007 | A1 | 2/2006 | Hsieh et al. | |
| 2006/0247341 | A1 * | 11/2006 | Hsieh | ..................... B01J 31/181 524/104 |

(Continued)

FOREIGN PATENT DOCUMENTS

| | | |
|---|---|---|
| CN | 101260272 | 9/2008 |
| CN | 101896521 | 11/2010 |

(Continued)

OTHER PUBLICATIONS

International Search Report issued Sep. 17, 2013 in International (PCT) Application No. PCT/JP2013/067293.

*Primary Examiner* — Michael M Bernshteyn
(74) *Attorney, Agent, or Firm* — Wenderoth, Lind & Ponack, L.L.P.

(57) ABSTRACT

An object of the present invention is to provide a method for forming a multilayer coating film, capable of achieving excellent curability under low-temperature, short-time conditions, and forming a multilayer coating film having excellent chipping resistance and an excellent finished appearance. This method comprises sequentially applying an aqueous first colored coating composition (X), an aqueous second colored coating composition (Y), and a clear coating composition (Z) to a substrate, and simultaneously bake-curing the resulting multilayer coating film. In this method, the aqueous first colored coating composition (X) comprises an aqueous film-forming resin (A) and a specific blocked polyisocyanate compound (B), and the clear coating composition (Z) comprises a hydroxy-containing acrylic resin (K) having a hydroxy value in a specific range, a polyisocyanate compound (L), and an organometallic catalyst (M) containing a metal compound (M1) selected from a specific range and an amidine compound (M2).

16 Claims, No Drawings

(56) References Cited

U.S. PATENT DOCUMENTS

| | | |
|---|---|---|
| 2008/0220275 A1 | 9/2008 | Noguchi et al. |
| 2010/0255328 A1 | 10/2010 | Tomizaki et al. |
| 2012/0107619 A1* | 5/2012 | Kitagawa ............... C08G 18/44 428/423.1 |
| 2015/0037591 A1 | 2/2015 | Ishikura et al. |

FOREIGN PATENT DOCUMENTS

| | | |
|---|---|---|
| EP | 1 236 751 | 9/2002 |
| JP | 9-125000 | 5/1997 |
| JP | 2001-521956 | 11/2001 |
| JP | 2002-97412 | 4/2002 |
| JP | 2004-25046 | 1/2004 |
| JP | 2005-225907 | 8/2005 |
| JP | 2009-155409 | 7/2009 |
| JP | 2010-58068 | 3/2010 |
| JP | 2011-530393 | 12/2011 |
| WO | 2010/018872 | 2/2010 |
| WO | 2012/137884 | 10/2012 |
| WO | 2013/047209 | 4/2013 |
| WO | 2013/125705 | 8/2013 |

* cited by examiner

METHOD FOR FORMING MULTILAYER COATING FILM

CROSS REFERENCE OF RELATED APPLICATION

This application claims priority to JP2012-206449A, filed Sep. 20, 2012, the disclosure of which is incorporated herein by reference in its entirety. The present invention relates to a method for forming a multilayer coating film. This method is capable of achieving excellent curability even when curing is performed at a low temperature and in a short period of time, and of forming a multilayer coating film having excellent water resistance, excellent adhesion, and an excellent finished appearance. The present invention also relates to a coated article.

TECHNICAL FIELD

Background Art

From the standpoint of energy saving and reducing environmental burden, research toward the development of a shortened bake-curing step and reduced operation steps has been actively conducted in the field of automotive body coating and industrial product coating.

In an effort to reduce the steps for coating automobile bodies, a possible approach is to skip the bake-curing step. Specifically, for example, a 3-coat 2-bake process has conventionally been used to form a multilayer coating film. The 3-coat 2-bake process sequentially comprises the following steps after electrocoating a steel plate followed by bake-curing: application of an intermediate coating composition→bake-curing→application of a base coating composition→preheating (preliminary heating)→application of a clear coating composition→bake-curing. In relation to this, an application process has currently been developed that skips the bake-curing step after the application of an intermediate coating composition, and that simultaneously bakes three layers formed of "an intermediate coating composition, a base coating composition, and a clear coating composition."

For coating automotive components, for example, a 3-coat 2-bake process has also conventionally been used to form a multilayer coating film. The 3-coat 2-bake process sequentially comprises the following steps after application of a primer coating composition to a plastic substrate: bake-curing→application of a base coating composition→preheating (preliminary heating)→application of a clear coating composition→bake-curing. To reduce the steps for coating automotive components, an application process has currently been developed that skips the step of bake-curing after the application of a primer coating composition, and that simultaneously bakes three layers formed of "a primer coating composition, a base coating composition, and a clear coating composition."

In relation to shortening the bake-curing step, a low-temperature, short-time bake-curing step is in increasing demand. To satisfy the demand for lowering the temperature and shortening the time for curing, a hydroxy/isocyanate-crosslinked coating composition that is used as a coating composition in a multilayer-coating film formation method has been considered to be a strong candidate in view of cost efficiency. Hydroxy/isocyanate-crosslinked coating compositions are obtained by crosslinking hydroxy-containing resins using a polyisocyanate compound as a crosslinking agent and curing the crosslinked resins. Such compositions have been researched so far.

However, in an attempt to improve curability under low-temperature, short-time curing conditions, the prior art has been insufficient in shortening the curing time, and it has been difficult for the prior art to achieve the required excellent finished appearance, particularly in automobile body coating and other kinds of coating.

Patent Literature (PTL) 1 discloses a coating composition comprising as essential components a pyrazole-blocked polyisocyanate compound that contains per molecule two or more tertiary isocyanate groups blocked by a pyrazole compound, and a hydroxy-containing resin having a specific hydroxy value and a specific weight average molecular weight. PTL 1 also discloses a method for forming a coating film using this coating composition. However, the method for forming a coating film using this coating composition has been unsatisfactory in curability under short-time curing conditions.

Patent Literature (PTL) 2 discloses a curable coating composition comprising a resin composition for preparing a coating composition and a (blocked) polyisocyanate compound, wherein the resin composition comprises a polyol (A1), a polyether polyol (B), and a solvent (C), wherein the polyol (A1) has a ring structure. PTL 2 also discloses another curable coating composition that further comprises an organometallic compound and an acidic substance in addition to the components of the above curable coating composition.

In an embodiment where the coating composition comprises an organometallic compound and an acidic substance, this coating composition achieves excellent low-temperature, short-time curing. However, the pot life is unsatisfactory. Further, when this composition is used in a method for forming a multilayer coating film, the resulting multilayer coating film can have an insufficient finished appearance.

A coating composition comprising a hydroxy group-containing resin and a melamine resin as a crosslinking agent is generally used to form an intermediate coating film and a base coating film, which are undercoating films of a clear coating film of a multilayer coating film. However, as stated above, when a multilayer coating film is obtained by low-temperature, short-time curing, i.e., by skipping the bake-curing step after application of an intermediate coating composition, the multilayer coating film can have insufficient hardness and insufficient chipping resistance due to insufficient curability under low-temperature, short-time conditions.

CITATION LIST

Patent Literature

PTL 1: JP2005-225907A
PTL 2: JP2002-97412A

SUMMARY OF INVENTION

Technical Problem

An object of the present invention is to provide a method for forming a multilayer coating film. This method is capable of achieving excellent curability under low-temperature, short-time conditions, and forming a multilayer coating film having excellent water resistance, excellent adhesion, and an excellent finished appearance.

Solution to Problem

The present inventors conducted extensive research to solve the above problems. As a result, they found that the above object can be achieved by a method for forming a multilayer coating film, in which an aqueous first colored coating composition, an aqueous second colored coating composition, and a clear coating composition are sequentially applied to a substrate. The aqueous first colored coating composition used in this method comprises an aqueous film-forming resin (A), and a specific blocked polyisocyanate compound (B), and the clear coating composition used in this method comprises a hydroxy-containing acrylic resin (K) having a hydroxy value in a specific range, a polyisocyanate compound (L), and an organometallic catalyst (M) containing a metal compound (M1) selected from a specific range and an amidine compound (M2). The present invention has been accomplished based on the above novel findings.

More specifically, the present invention provides the following Items:

Item 1. A method for forming a multilayer coating film, the method comprising:

applying an aqueous first colored coating composition (X) to a substrate to form a first colored coating film;

applying an aqueous second colored coating composition (Y) to the uncured first colored coating film to form a second colored coating film;

applying a clear coating composition (Z) to the uncured second colored coating film to form a clear coating film; and simultaneously curing the uncured first colored coating film, the uncured second colored coating film, and the uncured clear coating film, wherein the aqueous first colored coating composition (X) comprises an aqueous film-forming resin (A) and a blocked polyisocyanate compound (B) having at least one blocked isocyanate group selected from blocked isocyanate groups represented by Formula (I) below:

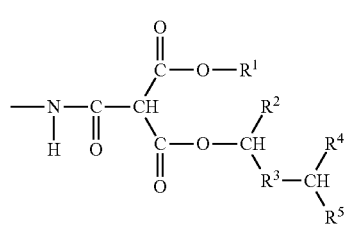
(I)

wherein $R^1$, $R^2$, $R^4$, and $R^5$ each independently represent $C_{1-12}$ hydrocarbon, and $R^3$ represents linear or branched $C_{1-12}$ alkylene, blocked isocyanate groups represented by Formula (II) below:

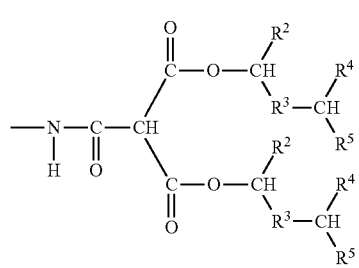
(II)

wherein $R^2$, $R^3$, $R^4$, and $R^5$ are as defined above, and blocked isocyanate groups represented by Formula (III) below:

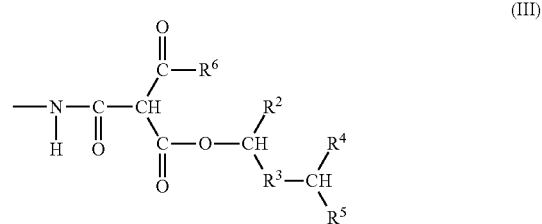
(III)

wherein $R^2$, $R^3$, $R^4$, and $R^5$ are as defined above, and $R^6$ represents $C_{1-12}$ hydrocarbon, and wherein the clear coating composition (Z) comprises a hydroxy-containing acrylic resin (K) having a hydroxy value of 85 to 215 mg KOH/g, a polyisocyanate compound (L), and an organometallic catalyst (M) containing a metal compound (M1) containing one or more metals selected from the group consisting of zinc, tin, zirconium, bismuth, lead, cobalt, manganese, titanium, aluminum, and molybdenum, and an amidine compound (M2).

Item 2. The method for forming a multilayer coating film according to Item 1, wherein $R^1$ of Formula (I) represents isopropyl.

Item 3. The method for forming a multilayer coating film according to Item 1 or 2, wherein $R^6$ of Formula (III) represents isopropyl.

Item 4. The method for forming a multilayer coating film according to Item 1 or 2, wherein the blocked polyisocyanate compound (B) is obtainable by reacting a blocked polyisocyanate compound (b3-1) having a blocked isocyanate group represented by Formula (IV) below:

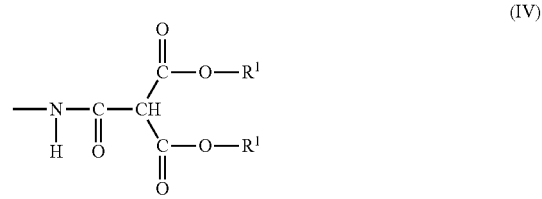
(IV)

wherein each $R^1$ is as defined above, and are identical or different, with a secondary alcohol (b4) represented by Formula (VI) below:

(VI)

wherein $R^2$, $R^3$, $R^4$, and $R^5$ are as defined above.

Item 5. The method for forming a multilayer coating film according to Item 1 or 3, wherein the blocked polyisocyanate compound (B) is obtainable by reacting a blocked polyisocyanate compound (b3-2) having a blocked isocyanate group represented by Formula (V) below:

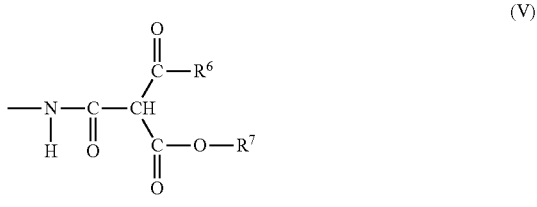

wherein $R^6$ is as defined above, and $R^7$ represents $C_{1-12}$ hydrocarbon, with the secondary alcohol (b4).

Item 6. The method for forming a multilayer coating film according to any one of Items 1 to 5, wherein the blocked polyisocyanate compound (B) is a blocked polyisocyanate compound (B') having a hydrophilic group.

Item 7. The method for forming a multilayer coating film according to any one of Items 1 to 6, wherein the hydroxy-containing acrylic resin (K) comprises a secondary hydroxy-containing polymerizable unsaturated monomer (k1-1) in an amount of 50 to 100 mass %, based on the total mass of hydroxy-containing polymerizable unsaturated monomer (k1).

Item 8. The method for forming a multilayer coating film according to any one of Items 1 to 7, wherein the hydroxy-containing acrylic resin (K) has a weight average molecular weight in the range of 2,000 to 50,000.

Item 9. The method for forming a multilayer coating film according to any one of Items 1 to 8, wherein the metal compound (M1) is a carboxylic acid metal salt compound.

Item 10. The method for forming a multilayer coating film according to any one of Items 1 to 9, wherein the organometallic catalyst (M) is used in an amount of 0.05 to 5 mass %, based on the total mass of the hydroxy-containing acrylic resin (K) and the polyisocyanate compound (L).

Item 11. An article having a multilayer coating film formed by the methods for forming a multilayer coating film of any one of Items 1 to 10.

Advantageous Effects of Invention

The method for forming a multilayer coating film of the present invention is capable of achieving excellent curability under low-temperature, short-time conditions, and forming a multilayer coating film having excellent water resistance, excellent adhesion, and an excellent finished appearance.

DESCRIPTION OF EMBODIMENTS

The method for forming a multilayer coating film of the present invention (hereinafter sometimes referred to as "the method of the present invention") is described in detail below.

The method for forming a multilayer coating film of the present invention comprises sequentially applying an aqueous first colored coating composition, an aqueous second colored coating composition, and a clear coating composition to a substrate. This method has a feature in that the aqueous first colored coating composition comprises an aqueous film-forming resin (A) and a specific blocked polyisocyanate compound (B), and that the clear coating composition comprises a hydroxy-containing acrylic resin (K) having a hydroxy value in a specific range, a polyisocyanate compound (L), and an organometallic catalyst (M) containing a metal compound (M1) selected from a specific range and an amidine compound (M2).

Substrate

The substrate to which the method of the present invention is applied is not particularly limited. Specific examples of the substrate include metal substrates, such as cold rolled steel plates, galvanized steel plates, zinc alloy-plated steel plates, stainless steel plates, tinned steel plates, and like steel plates, aluminum plates, and aluminum alloy plates; various plastic substrates; and the like. The substrate may also be the body or a part of various vehicles, such as automobiles, motorcycles, containers, and the like formed from these materials.

Usable substrates also include metal substrates and vehicle bodies whose metal surface has been subjected to a surface treatment such as phosphate treatment, chromate treatment, composite oxide treatment, or the like. Usable substrates further include such metal substrates, vehicle bodies, and the like having an undercoating film and/or an intermediate coating film of various electrodeposition coating compositions formed thereon, and plastic members such as a bumper, that have been subjected to degreasing treatment, washing treatment, or the like, or that have a primer coating film formed thereon.

Step (1)

In the method of the present invention, an aqueous first colored coating composition (X) is first coated.

Aqueous First Colored Coating Composition (X)

The aqueous first colored coating composition (X) comprises an aqueous film-forming resin (A) and a specific blocked polyisocyanate compound (B).

Aqueous Film-Forming Resin (A)

As the aqueous film-forming resin (A), it is possible to use any known water-soluble or water-dispersible film-forming resin that has been used for aqueous coating compositions. Examples of the resin types include acrylic resins, polyester resins, alkyd resins, polyurethane resins, polyolefin resins, and the like. The aqueous film-forming resin (A) preferably contains a crosslinkable functional group, such as hydroxy, carboxy, or epoxy.

As the aqueous film-forming resin (A), it is preferable to use a hydroxy-containing acrylic resin (A1) and/or a hydroxy-containing polyester resin (A2).

To improve the smoothness and distinctness of image of the resulting coating film, it is preferable to use the hydroxy-containing acrylic resin (A1) and the hydroxy-containing polyester resin (A2) in combination. When used in combination, the hydroxy-containing acrylic resin (A1) is used in a proportion of about 10 to 90 mass %, and particularly about 20 to 80 mass %, and the hydroxy-containing polyester resin (A2) is used in a proportion of about 90 to 10 mass %, and particularly about 80 to 20 mass %, based on the total amount of the hydroxy-containing acrylic resin (A1) and the hydroxy-containing polyester resin (A2).

When the aqueous film-forming resin (A) contains a hydroxy group, the aqueous film-forming resin (A) has a hydroxy value of preferably 1 to 300 mg KOH/g, more preferably 2 to 250 mg KOH/g, and even more preferably 5 to 180 mg KOH/g. When the resin (A) contains an acid group such as carboxy, the resin (A) preferably has an acid value of 1 to 200 mg KOH/g, more preferably 2 to 150 mg KOH/g, and even more preferably 5 to 80 mg KOH/g.

Hydroxy-Containing Acrylic Resin (A1)

The hydroxy-containing acrylic resin (A1) can be produced by copolymerizing, for example, a hydroxy-containing polymerizable unsaturated monomer with one or more other polymerizable unsaturated monomers that are copolymerizable with the hydroxy-containing polymerizable unsaturated monomer by using a known method, such as a solution polymerization method in an organic solvent, or an emulsion polymerization method in water.

As the hydroxy-containing acrylic resin (A1), it is preferable to use a water-dispersible hydroxy-containing acrylic resin (hereinafter referred to as "water-dispersible hydroxy-containing acrylic resin (A1-1)") to improve the finished appearance of the resulting multilayer coating film.

Specifically, as the hydroxy-containing acrylic resin (A1), it is preferable to use the water-dispersible hydroxy-containing acrylic resin (A1-1) alone, or the water-dispersible hydroxy-containing acrylic resin (A1-1) and water-soluble hydroxy-containing acrylic resin (A1-2) in combination.

The above hydroxy-containing polymerizable unsaturated monomer has at least one hydroxy group and at least one polymerizable unsaturated bond per molecule. Examples of the hydroxy-containing polymerizable unsaturated monomer include monoesterified products of (meth)acrylic acids with dihydric alcohols having 2 to 8 carbon atoms, such as 2-hydroxyethyl(meth)acrylate, 2-hydroxypropyl(meth)acrylate, 3-hydroxypropyl(meth)acrylate, and 4-hydroxybutyl(meth)acrylate; ε-caprolactone-modified compounds of the monoesterified products of (meth)acrylic acids with dihydric alcohols having 2 to 8 carbon atoms; N-hydroxymethyl(meth)acrylamide; allyl alcohol; and (meth)acrylates having hydroxy-terminated polyoxyethylene chains. In the present invention, the monomers corresponding to the polymerizable unsaturated monomers having a UV-absorbing functional group in item (xvii) below should be defined as being encompassed in other polymerizable unsaturated monomers that are copolymerizable with the hydroxy-containing polymerizable unsaturated monomer and are excluded from the hydroxy-containing polymerizable unsaturated monomers. These monomers may be used singly, or in a combination of two or more.

In this specification, the term "(meth)acrylate" means "acrylate or methacrylate." The term "(meth)acrylic acid" means "acrylic acid or methacrylic acid." The term "(meth)acryloyl" means "acryloyl or methacryloyl." The term "(meth)acrylamide" means "acrylamide or methacrylamide."

The above one or more other polymerizable unsaturated monomers that are copolymerizable with the hydroxy-containing polymerizable unsaturated monomer may be suitably selected according to the properties required of the hydroxy-containing acrylic resin (A1). Specific examples of these monomers are shown below in items (i) to (xix). These may be used singly, or in a combination of two or more.

(i) Alkyl or cycloalkyl(meth)acrylates, such as esterified products of (meth)acrylic acid with a $C_{1-18}$ alcohol or a $C_{3-12}$ cycloalcohol, such as methyl(meth)acrylate, ethyl(meth)acrylate, n-propyl(meth)acrylate, i-propyl(meth)acrylate, n-butyl(meth)acrylate, i-butyl(meth)acrylate, tert-butyl(meth)acrylate, n-pentyl(meth)acrylate, n-hexyl(meth)acrylate, n-heptyl(meth)acrylate, n-octyl(meth)acrylate, 2-ethylhexyl(meth)acrylate, nonyl(meth)acrylate, tridecyl(meth)acrylate, lauryl(meth)acrylate, stearyl(meth)acrylate, isostearyl(meth)acrylate, cyclohexyl(meth)acrylate, methylcyclohexyl(meth)acrylate, t-butylcyclohexyl(meth)acrylate, cyclododecyl(meth)acrylate, and tricyclodecanyl(meth)acrylate;

(ii) isobornyl-containing polymerizable unsaturated monomers, such as isobornyl(meth)acrylate;

(iii) adamantyl-containing polymerizable unsaturated monomers, such as adamantyl(meth)acrylate;

(iv) tricyclodecenyl-containing polymerizable unsaturated monomers, such as tricyclodecenyl(meth)acrylate;

(v) aromatic ring-containing polymerizable unsaturated monomers, such as benzyl(meth)acrylate, styrene, α-methylstyrene, and vinyltoluene;

(vi) alkoxysilyl-containing polymerizable unsaturated monomers, such as vinyltrimethoxysilane, vinyltriethoxysilane, vinyltris(2-methoxyethoxy)silane, γ-(meth)acryloyloxypropyltrimethoxysilane, and γ-(meth)acryloyloxypropyltriethoxysilane;

(vii) fluorinated alkyl-containing polymerizable unsaturated monomers, such as perfluorobutylethyl(meth)acrylate, perfluorooctylethyl(meth)acrylate, and like perfluoroalkyl(meth)acrylates; and fluoroolefin;

(viii) polymerizable unsaturated monomers having a photopolymerizable functional group, such as maleimide;

(ix) vinyl compounds, such as N-vinylpyrrolidone, ethylene, butadiene, chloroprene, vinyl propionate, and vinyl acetate;

(x) carboxy-containing polymerizable unsaturated monomers, such as (meth)acrylic acid, maleic acid, crotonic acid, and β-carboxyethyl acrylate;

(xi) sulfonic acid group-containing polymerizable unsaturated monomers, such as 2-acrylamido-2-methylpropane-sulfonic acid, 2-sulfoethyl(meth)acrylate, allylsulfonic acid, and 4-styrenesulfonic acid; and sodium salts and ammonium salts of these sulfonic acids;

(xii) phosphoric acid group-containing polymerizable unsaturated monomers, such as 2-acryloyloxyethyl acid phosphate, 2-methacryloyloxyethyl acid phosphate, 2-acryloyloxypropyl acid phosphate, and 2-methacryloyloxypropyl acid phosphate;

(xiii) nitrogen-containing polymerizable unsaturated monomers, such as (meth)acrylonitrile, (meth)acrylamide, N,N-dimethylaminoethyl(meth)acrylate, N,N-diethylaminoethyl(meth)acrylate, N,N-dimethylaminopropyl(meth)acrylamide, methylenebis(meth)acrylamide, ethylenebis(meth)acrylamide, 2-(methacryloyloxy)ethyltrimethylammonium chloride, and addition products of glycidyl(meth)acrylate with amines;

(xiv) polymerizable unsaturated monomers having at least two polymerizable unsaturated groups per molecule, such as methylenebisacrylamide, allyl(meth)acrylate, and 1,6-hexanediol di(meth)acrylate;

(xv) epoxy-containing polymerizable unsaturated monomers, such as glycidyl(meth)acrylate, β-methylglycidyl(meth)acrylate, 3,4-epoxycyclohexylmethyl(meth)acrylate, 3,4-epoxycyclohexylethyl(meth)acrylate, 3,4-epoxycyclohexylpropyl(meth)acrylate, and allyl glycidyl ether;

(xvi) (meth)acrylates having alkoxy-terminated polyoxyethylene chains;

(xvii) UV-absorbing functional group-containing polymerizable unsaturated monomers, such as 2-hydroxy-4-(3-methacryloyloxy-2-hydroxypropoxy)benzophenone, 2-hydroxy-4-(3-acryloyloxy-2-hydroxypropoxy)benzophenone, 2,2'-dihydroxy-4-(3-methacryloyloxy-2-hydroxypropoxy)benzophenone, 2,2'-dihydroxy-4-(3-acryloyloxy-2-hydroxypropoxy)benzophenone, and 2-(2'-hydroxy-5'-methacryloyloxyethylphenyl)-2H-benzotriazole;

(xviii) photostable polymerizable unsaturated monomers, such as 4-(meth)acryloyloxy-1,2,2,6,6-pentamethylpiperidine, 4-(meth)acryloyloxy-2,2,6,6-tetramethylpiperidine, 4-cyano-4-(meth)acryloylamino-2,2,6,6-tetramethylpiperidine, 1-(meth)acryloyl-4-(meth)acryloylamino-2,2,6,6-tetramethylpiperidine, 1-(meth)acryloyl-4-cyano-4-(meth)acryloylamino-2,2,6,6-tetramethylpiperidine, 4-crotonoyloxy-2,2,6,6-tetramethylpiperidine, 4-crotonoylamino-2,2,6,6-tetramethylpiperidine, and 1-crotonoyl-4-crotonoyloxy-2,2,6,6-tetramethylpiperidine; and (xix) carbonyl-containing polymerizable unsaturated monomers, such as acrolein, diacetonacrylamide, diacetonmethacrylamide, acetoacetoxyethyl methacrylate, formylstyrol, and $C_{4-7}$ vinyl alkyl ketones (e.g., vinyl methyl ketone, vinyl ethyl ketone, and vinyl butyl ketone).

Of these, from the viewpoint of the adhesion, the finished appearance, etc., of the resulting coating film, it is preferable to use a carboxy-containing polymerizable unsaturated monomer as a part of the one or more other polymerizable unsaturated monomers that are copolymerizable with the hydroxy-containing polymerizable unsaturated monomer. In this case, the amount of the carboxy-containing polymerizable unsaturated monomer used for producing the hydroxy-containing acrylic resin (A1) is preferably about 0.05 to 15 mass %, more preferably about 0.2 to 8 mass %, and still more preferably about 0.5 to 6 mass %, based on the total amount of the monomer components.

The amount of the hydroxy-containing polymerizable unsaturated monomer used for producing the hydroxy-containing acrylic resin (A1) is preferably about 1 to 50 mass %, more preferably about 2 to 40 mass %, and still more preferably about 3 to 30 mass %, based on the total amount of the monomer components.

From the viewpoint of the water resistance, etc., of the resulting coating film, the hydroxy-containing acrylic resin (A1) preferably has a hydroxy value of about 0.1 to 200 mg KOH/g, more preferably about 2 to 150 mg KOH/g, and still more preferably about 5 to 100 mg KOH/g.

From the viewpoint of the storage stability of the coating composition, as well as the water resistance, adhesion, and finished appearance of the resulting coating film, the hydroxy-containing acrylic resin (A1) preferably has an acid value of about 1 to 50 mg KOH/g, more preferably about 3 to 40 mg KOH/g, and still more preferably about 5 to 35 mg KOH/g.

The hydroxy-containing acrylic resin (A1) is preferably produced by using the (i) alkyl or cycloalkyl(meth)acrylate as a starting monomer. The (i) alkyl or cycloalkyl(meth)acrylate is preferably used in an amount of about 50 to 99 mass %, more preferably about 55 to 97 mass %, and still more preferably about 60 to 95 mass %, based on the total amount of the monomer components.

Of the (i) alkyl or cycloalkyl(meth)acrylate, a $C_{4-8}$ alkyl-containing polymerizable unsaturated monomer is preferably used to produce the hydroxy-containing acrylic resin (A1), from the viewpoint of the water resistance, adhesion, finished appearance, etc., of the resulting coating film. In the present invention, the "$C_{4-8}$ alkyl-containing polymerizable unsaturated monomer" refers to an alkyl-containing polymerizable unsaturated monomer whose alkyl moiety has 4 to 8 carbon atoms. The hydroxy-containing acrylic resin (A1) that is made using the $C_{4-8}$ alkyl-containing polymerizable unsaturated monomer as a starting monomer can be produced, for example, by using one or more hydroxy-containing polymerizable unsaturated monomers and one or more $C_{4-8}$ alkyl-containing polymerizable unsaturated monomers, such as n-butyl(meth)acrylate, i-butyl(meth)acrylate, tert-butyl(meth)acrylate, n-pentyl(meth)acrylate, n-hexyl(meth)acrylate, n-heptyl(meth)acrylate, n-octyl(meth)acrylate, 2-ethylhexyl(meth)acrylate, cyclohexyl(meth)acrylate, and methylcyclohexyl(meth)acrylate, as a part of one or more other polymerizable unsaturated monomers that are copolymerizable with the hydroxy-containing polymerizable unsaturated monomer.

The $C_{4-8}$ alkyl-containing polymerizable unsaturated monomer is preferably used in an amount of about 5 to 70 mass %, more preferably about 15 to 60 mass %, and still more preferably about 30 to 50 mass %, based on the total amount of the monomer components. The amount of the $C_{4-8}$ alkyl-containing polymerizable unsaturated monomer used is not limited to the above ranges. For example, the amount may be suitably set within a range of about 5 to 30 mass %, about 10 to 25 mass %, about 15 to 20 mass %, or the like, based on the total amount of the monomer components.

Further, the hydroxy-containing acrylic resin (A1) is preferably produced by using the aromatic ring-containing polymerizable unsaturated monomer (v) as a starting monomer. The aromatic ring-containing polymerizable unsaturated monomer (v) is preferably used in an amount of about 1 to 10 mass %, more preferably about 2 to 8 mass %, and still more preferably about 3 to 7 mass %, based on the total amount of the monomer components.

As a part of the hydroxy-containing acrylic resin (A1), it is possible to use a urethane-modified acrylic resin that is formed by extending polyisocyanate compounds at a part of hydroxyl groups in the resin by urethanation reaction to give the resin higher molecular weight.

From the viewpoint of the appearance, water resistance, etc., of the resulting coating film, it is preferable for the hydroxy-containing acrylic resin (A1) to have a weight average molecular weight of 2,000 to 5,000,000, and more preferably 100,000 to 2,000,000.

In this specification, the number average molecular weight and weight average molecular weight are values calculated from chromatograms obtained using gel permeation chromatography (GPC), based on the molecular weight of standard polystyrene. "HLC812OGPC" (trade name, produced by Tosoh Corporation) is used as the gel permeation chromatograph. The measurements were conducted using four columns: "TSKgel G-4000Hxl," "TSKgel G-3000Hxl," "TSKgel G-2500Hxl," and "TSKgel G-2000Hxl" (trade names, all produced by Tosoh Corporation) under the following conditions: mobile phase: tetrahydrofuran; measurement temperature: 40° C.; flow rate: 1 cc/mm; and detector: RI.

The water-dispersible hydroxy-containing acrylic resin (A1-1) is preferably a water-dispersible hydroxy-containing acrylic resin having a core/shell type multilayer structure (hereinafter referred to as a "core/shell-type water-dispersible hydroxy-containing acrylic resin (A1-1-1)") to provide a coating film having excellent water resistance, adhesion, and finished appearance by controlling the structure of resin particles. The "shell" as used herein refers to a polymeric layer present in the outermost layer of a resin particle, while the "core" refers to a portion other than the shell portion; i.e., the "core refers to a polymeric layer that is an internal layer of the resin particle. The "core/shell type multilayer structure" refers to a structure having a core portion and shell portion. The core/shell type multilayer structure generally takes a layered structure such that the core portion is completely covered by the shell portion. However, depending on, for example, the mass ratio of the core portion to the shell portion, the monomer amount for the shell portion may be insufficient for forming a layered structure. In that case, a complete layered structure as described above is not necessary. A structure in which the shell partially covers the core, or a structure in which a polymerizable unsaturated monomer that is a constituent of the shell is graft-polymerized at a part of the core, may be selected. The concept of the multilayer structure in the above core/shell type multilayer structure also applies to the case in which the core has a multilayer structure.

To improve the color development, the blackness, and the smoothness of the resulting coating film, the core/shell-type water-dispersible hydroxy-containing acrylic resin (A1-1-1) is preferably a core/shell-type water-dispersible hydroxy-containing acrylic resin comprising a core portion, which is a copolymer (I) consisting of a polymerizable unsaturated monomer having two or more polymerizable unsaturated groups per molecule and a polymerizable unsaturated monomer having one polymerizable unsaturated group per molecule, and a shell portion, which is a copolymer (II) consisting of a hydroxy-containing polymerizable unsaturated monomer, an acid group-containing polymerizable unsaturated monomer, a $C_{4-8}$ alkyl-containing polymerizable unsaturated monomer, and one or more other polymerizable unsaturated monomers.

Examples of the polymerizable unsaturated monomer that has two or more polymerizable unsaturated groups per molecule and that can be used as a monomer for the core copolymer (I) include allyl(meth)acrylate, ethylene glycol di(meth)acrylate, triethylene glycol di(meth)acrylate, tetraethylene glycol di(meth)acrylate, 1,3-butylene glycol di(meth)acrylate, trimethylol propane tri(meth)acrylate, 1,4-butanediol di(meth)acrylate, neopentyl glycol di(meth)acrylate, 1,6-hexanediol di(meth)acrylate, pentaerythritol di(meth)acrylate, pentaerythritol tetra(meth)acrylate, glycerol di(meth)acrylate, 1,1,1-tris-hydroxymethylethane di(meth)acrylate, 1,1,1-trishydroxymethylethane tri(meth)acrylate, 1,1,1-trishydroxymethylpropane tri(meth)acrylate, triallyl isocyanurate, diallyl terephthalate, divinylbenzene, methylenebis(meth)acrylamide, ethylenebis(meth)acrylamide, and the like. These monomers may be used singly, or in a combination of two or more.

The polymerizable unsaturated monomer having two or more polymerizable unsaturated groups per molecule functions to provide a crosslinked structure to the core copolymer (I). The amount of the polymerizable unsaturated monomer having two or more polymerizable unsaturated groups per molecule can be suitably selected according to the desired degree of crosslinking of the core copolymer (I); the amount thereof is preferably about 0.1 to 30 mass %, more preferably about 0.5 to 10 mass %, and even more preferably about 1 to 7 mass %, based on the total mass of the monomers constituting the core copolymer (I).

To improve the finished appearance of the resulting coating film, it is preferable to use allyl(meth)acrylate, ethylene glycol di(meth)acrylate, methylene bis(meth)acrylamide, ethylene bis(meth)acrylamide, etc., in the polymerizable unsaturated monomer having two or more polymerizable unsaturated groups per molecule. The amount of amide-containing monomer, when used, is preferably about 0.1 to 25 mass %, more preferably about 0.5 to 8 mass %, and even more preferably about 1 to 4 mass %, based on the total amount of the polymerizable unsaturated monomer having two or more polymerizable unsaturated groups per molecule and the unsaturated monomer having one polymerizable unsaturated group per molecule.

The polymerizable unsaturated monomer that has one polymerizable unsaturated group per molecule and that can be used as a monomer for the core copolymer (I) is a polymerizable unsaturated monomer that is copolymerizable with the polymerizable unsaturated monomer having two or more polymerizable unsaturated groups per molecule.

Examples of the polymerizable unsaturated monomer having one polymerizable unsaturated group per molecule include the hydroxy-containing polymerizable unsaturated monomer mentioned above, the monomers listed above in items (i) to (xii) and (xv) to (xix), and the nitrogen-containing polymerizable unsaturated monomers listed above in item (xiii) other than methylenebis(meth)acrylamide and ethylenebis(meth)acrylamide. These monomers may be used singly or in a combination of two or more according to the properties required of the core/shell-type water-dispersible hydroxy-containing acrylic resin (A1-1-1).

The polymerizable unsaturated monomer having one polymerizable unsaturated group per molecule is preferably used in an amount of about 70 to 99.9 mass %, more preferably about 90 to 99.5 mass %, and still more preferably about 93 to 99 mass %, based on the total mass of the monomers constituting the core copolymer (I).

The hydroxy-containing polymerizable unsaturated monomer that can be used as a monomer for the shell copolymer (II) functions to enhance the water resistance of the resulting coating film and enhance the stability of the water-dispersible acrylic resin in an aqueous medium when a hydroxy group that can crosslink with a curing agent is introduced into the resulting water-dispersible acrylic resin. Examples of the hydroxy-containing polymerizable unsaturated monomer include the hydroxy-containing polymerizable unsaturated monomers mentioned above. These monomers may be used singly, or in a combination of two or more. Preferable examples of the hydroxy-containing polymerizable unsaturated monomer include 2-hydroxyethyl(meth)acrylate, 2-hydroxypropyl(meth)acrylate, 3-hydroxypropyl(meth)acrylate, 4-hydroxybutyl(meth)acrylate, and the like.

To achieve excellent stability of the core/shell-type water-dispersible hydroxy-containing acrylic resin (A1-1-1) in an aqueous medium and to obtain excellent water resistance of the resulting coating film, the hydroxy-containing polymerizable unsaturated monomer is preferably used in an amount of about 1 to 40 mass %, more preferably about 4 to 25 mass %, and still more preferably about 7 to 19 mass %, based on the total mass of the monomers constituting the core copolymer (II).

Examples of the acid group-containing polymerizable unsaturated monomers that can be used as the monomers for the shell copolymer (II) include the monomers listed above in items (x) to (xii) and other monomers. These may be used singly, or in a combination of two or more.

The acid group-containing polymerizable unsaturated monomer preferably includes, in particular, a carboxy-containing polymerizable unsaturated monomer. In particular, acrylic acid and/or methacrylic acid are preferably used as the carboxy-containing polymerizable unsaturated monomer. The use of the carboxy-containing polymerizable unsaturated monomer as a part of the one or more other polymerizable unsaturated monomers achieves the stability of the resulting core/shell-type water-dispersible hydroxy-containing acrylic resin (A1-1-1) in an aqueous medium.

To achieve excellent stability of the core/shell-type water-dispersible hydroxy-containing acrylic resin (A1-1-1) in an aqueous medium and to obtain excellent water resistance of the resulting coating film, the amount of the carboxy-containing polymerizable unsaturated monomer, when used, is preferably about 1 to 30 mass %, more preferably about 5 to 25 mass %, and still more preferably about 7 to 19 mass %, based on the total mass of the monomers constituting the core copolymer (II).

The $C_{4-8}$ alkyl-containing polymerizable unsaturated monomers that can be used as the monomers for the shell copolymer (II) are polymerizable unsaturated monomers having linear, branched, or cyclic, saturated or unsaturated hydrocarbon of 4 to 8 carbon atoms. Examples of these monomers include polymerizable unsaturated monomers having linear or branched saturated alkyl, such as n-butyl(meth)acrylate, i-butyl(meth)acrylate, tert-butyl(meth)acrylate, n-pentyl(meth)acrylate, n-hexyl(meth)acrylate, n-heptyl(meth)acrylate, n-octyl(meth)acrylate, and 2-ethylhexyl(meth)acrylate; polymerizable unsaturated monomers having cyclic saturated alkyl, such as cyclohexyl(meth)acrylate, methylcyclohexyl(meth)acrylate, and ethylcyclohexyl(meth)acrylate; and polymerizable unsaturated monomers having cyclic unsaturated alkyl, such as styrene, α-methylstyrene, and vinyltoluene. These monomers may be used singly, or in a combination of two or more.

To improve the color development, the blackness, and the smoothness of the resulting coating film, it is preferable to use a polymerizable unsaturated monomer having linear or branched, saturated alkyl and/or a polymerizable unsaturated monomer having cyclic unsaturated alkyl, as the $C_{4-8}$ alkyl-containing polymerizable unsaturated monomer. In particular, a polymerizable unsaturated monomer having saturated alkyl of 4 carbon atoms is preferable, and n-butyl(meth)acrylate and n-pentyl(meth)acrylate are more preferable.

To achieve excellent stability of the core/shell-type water-dispersible hydroxy-containing acrylic resin (A1-1-1) in an aqueous medium and to obtain excellent water resistance of the resulting coating film, the $C_{4-8}$ alkyl-containing polymerizable unsaturated monomer is preferably used in an amount of about 30 to 80 mass %, more preferably about 40 to 70 mass %, and still more preferably about 45 to 65 mass %, based on the total mass of the monomers constituting the core copolymer (II).

The one or more other polymerizable unsaturated monomers that can be used as the monomers for the shell copolymer (II) are hydroxy-containing polymerizable unsaturated monomers, acid group-containing polymerizable unsaturated monomers, and polymerizable unsaturated monomers other than $C_{4-8}$ alkyl-containing polymerizable unsaturated monomers. These monomers may be suitably selected from the monomers listed above in terms of the hydroxy-containing acrylic resin (A1). Examples include, in particular, alkyl (meth)acrylate having 1 to 3, or 9 or more carbon atoms, such as methyl(meth)acrylate, ethyl(meth)acrylate, n-propyl (meth)acrylate, i-propyl(meth)acrylate, nonyl(meth)acrylate, tridecyl(meth)acrylate, lauryl(meth)acrylate, stearyl (meth)acrylate, and "Isostearyl Acrylate" (trade name, produced by Osaka Organic Chemical Industry, Ltd.); polymerizable unsaturated monomers having cycloalkyl of 9 or more carbon atoms, such as t-butylcyclohexyl(meth)acrylate and cyclododecyl(meth)acrylate; the monomers listed above in items (ii), (iii), (vi) to (ix), and (xiii) to (xix); and the like. These may be used singly, or in a combination of two or more.

The one or more other polymerizable unsaturated monomers that are used as the monomers for the shell copolymer (II) are used in an amount of preferably about 0 to 68 mass %, more preferably about 0 to 51 mass %, and still more preferably about 0 to 41 mass %, based on the total mass of the monomers constituting the core copolymer (II).

To improve the appearance of the resulting coating film, it is preferable to form an uncrosslinked copolymer (II) without using polymerizable unsaturated monomers having two or more polymerizable unsaturated groups per molecule as the one or more other polymerizable unsaturated monomers for constituting the shell copolymer (II).

To improve the finished appearance of the resulting coating film, the ratio of the copolymer (I)/the copolymer (II) in the core/shell-type water-dispersible hydroxy-containing acrylic resin (A1-1-1) is preferably in the range of about 10/90 to 90/10, more preferably about 50/50 to 85/15, and still more preferably about 65/35 to 80/20, on a solids basis.

To provide the coating film with excellent water resistance, etc., the core/shell-type water-dispersible hydroxy-containing acrylic resin (A1-1-1) preferably has a hydroxy value of about 1 to 70 mg KOH/g, more preferably about 2 to 50 mg KOH/g, and even more preferably about 5 to 30 mg KOH/g.

To provide the coating composition with excellent storage stability and provide the coating film with excellent water resistance, etc., the core/shell-type water-dispersible hydroxy-containing acrylic resin (A1-1-1) preferably has an acid value of about 1 to 50 mg KOH/g, more preferably about 3 to 40 mg KOH/g, and even more preferably about 5 to 30 mg KOH/g.

The core/shell-type water-dispersible hydroxy-containing acrylic resin (A1-1-1) can be prepared by a process comprising: subjecting to emulsion polymerization a monomer mixture of a polymerizable unsaturated monomer having two or more polymerizable unsaturated groups per molecule, and a polymerizable unsaturated monomer having one polymerizable unsaturated group per molecule to form an emulsion of a core copolymer (I); adding to this emulsion a monomer mixture of a hydroxy-containing polymerizable unsaturated monomer, an acid group-containing polymerizable unsaturated monomer, a $C_{4-8}$ alkyl-containing polymerizable unsaturated monomer, and one or more other polymerizable unsaturated monomers, and further performing emulsion polymerization to form a shell copolymer (II).

The emulsion polymerization for preparing an emulsion of the core copolymer (I) can be carried out according to known methods. For example, the emulsion can be prepared by subjecting the monomer mixture to emulsion polymerization using a polymerization initiator in the presence of an emulsifier.

For the above emulsifier, anionic emulsifiers and nonionic emulsifiers are suitable. Examples of the anionic emulsifiers include sodium salts and ammonium salts of alkylsulfonic acids, alkylbenzenesulfonic acids, alkylphosphoric acids, and the like. Examples of the nonionic emulsifiers include polyoxyethylene oleyl ether, polyoxyethylene lauryl ether, and the like. Other examples include polyoxyalkylene-containing anionic emulsifiers; and reactive anionic emulsifiers that have an anionic group and a radically polymerizable unsaturated group per molecule.

The emulsifier is preferably used in an amount of preferably about 0.1 to 15 mass %, more preferably about 0.5 to 10 mass %, and even more preferably about 1 to 5 mass %, based on the total mass of the monomers used.

Examples of the polymerization initiator include azo compounds, persulfates, and the like. These polymerization initiators may be used singly, or in a combination of two or more. Redox initiators prepared by combining a polymerization initiator as mentioned above with a reducing agent may also be used.

The polymerization initiator is generally preferably used in an amount of about 0.1 to 5 mass %, and more preferably about 0.2 to 3 mass %, based on the total mass of the monomers used. The method of adding the polymerization initiator is not particularly limited, and can be suitably selected according to the type and amount of the polymerization initiator used. For example, the polymerization initiator may be incorporated into a monomer mixture or an aqueous medium beforehand, or may be added dropwise or all at once at the time of polymerization.

The monomer mixture for forming the shell copolymer (II) may optionally contain other components, such as the polymerization initiators mentioned above, chain transfer agents, reducing agents, and emulsifiers. It is possible for the monomer mixture to be added dropwise as is. However, it is preferable to add the monomer mixture dropwise in the form of a monomer emulsion that is obtained by dispersing the monomer mixture into an aqueous medium. In this case, the particle size of the monomer emulsion is not particularly limited.

The method for polymerizing the monomer mixture for forming the shell copolymer (II) comprises, for example, adding the monomer mixture or an emulsion of the monomer mixture to the emulsion of the core copolymer (I) all at once or gradually dropwise, and heating to a suitable temperature while stirring.

The core/shell-type water-dispersible hydroxy-containing acrylic resin (A1-1-1) thus obtained has a multiple-layer structure comprising a core copolymer (I) of a monomer mixture of a polymerizable unsaturated monomer having two or more polymerizable unsaturated groups per molecule and a polymerizable unsaturated monomer having one polymerizable unsaturated group per molecule, and a shell copolymer (II) of a monomer mixture of a hydroxy-containing polymerizable unsaturated monomer, an acid group-containing polymerizable unsaturated monomer, a $C_{4-8}$ alkyl-containing polymerizable unsaturated monomer, and one or more other polymerizable unsaturated monomers.

The core/shell-type water-dispersible hydroxy-containing acrylic resin (A1-1-1) thus obtained generally has an average particle size of about 10 to 1,000 nm, and particularly about 20 to 500 nm.

In this specification, the average particle size of the core/shell-type water-dispersible hydroxy-containing acrylic resin (A1-1-1) refers to a value measured at 20° C. using a submicron particle size distribution analyzer after dilution with deionized water according to a usual method. For example, a "COULTER N4" (trade name, produced by Beckman Coulter, Inc.) may be used as the submicron particle size distribution analyzer.

To improve the mechanical stability of the particles of the core/shell-type water-dispersible hydroxy-containing acrylic resin (A1-1-1), acid groups such as carboxy groups of the water-dispersible acrylic resin are preferably neutralized with a neutralizing agent. The neutralizing agent is not particularly limited as long as it can neutralize acid groups. Examples of such neutralizing agents include sodium hydroxide, potassium hydroxide, trimethylamine, 2-(dimethylamino)ethanol, 2-amino-2-methyl-1-propanol, triethylamine, aqueous ammonia, and the like. Such a neutralizing agent is preferably used in an amount such that the pH of an aqueous dispersion of the water-dispersible acrylic resin after neutralization is about 6.5 to 9.0.

In a preferable embodiment of the present invention, it is possible to use the core/shell-type water-dispersible hydroxy-containing acrylic resin (A1-1-1) in combination with a hydroxy-containing acrylic resin that is not of a core-shell type.

The hydroxy-containing acrylic resin (A1) may be a hydroxy-containing acrylic resin (A1) modified with polyester and/or polyurethane resin.

When the aqueous first colored coating composition (X) comprises the hydroxy-containing acrylic resin (A1) as at least one member of the aqueous film-forming resin (A), the amount of the hydroxy-containing acrylic resin (A1) is preferably 5 to 90 parts by mass, more preferably 10 to 80 parts by mass, and still more preferably 15 to 70 parts by mass, per 100 parts by mass of the total solids content of the aqueous film-forming resin (A) and the specific blocked polyisocyanate compound (B).

Further, when the aqueous first colored coating composition (X) comprises the hydroxy-containing acrylic resin (A1) as at least one member of the aqueous film-forming resin (A), and further comprises a curing agent (C) mentioned below, the amount of the hydroxy-containing acrylic resin (A1) is preferably 2 to 85 parts by mass, more preferably 10 to 75 parts by mass, and still more preferably 15 to 65 parts by mass, per 100 parts by mass of the total solids content of the aqueous film-forming resin (A), the specific blocked polyisocyanate compound (B), and the curing agent (C).

Hydroxy-Containing Polyester Resin (A2)

When the aqueous first colored coating composition (X) comprises a hydroxy-containing polyester resin (A2) as the aqueous film-forming resin (A), the smoothness of the resulting coating film is improved.

The hydroxy-containing polyester resin (A2) can usually be produced by an esterification or transesterification reaction of an acid component with an alcohol component.

As the acid component, it is possible to use a compound that is generally used as an acid component for producing a polyester resin. Examples of such acid components include aliphatic polybasic acids, alicyclic polybasic acids, aromatic polybasic acids, and the like.

Aliphatic polybasic acids generally include aliphatic compounds having at least two carboxy groups per molecule; anhydrides of such aliphatic compounds; and esters of such aliphatic compounds. Examples of aliphatic polybasic acids include succinic acid, glutaric acid, adipic acid, pimelic acid, suberic acid, azelaic acid, sebacic acid, undecanedioic acid, dodecanedioic acid, brassylic acid, octadecanedioic acid, citric acid, and like aliphatic polycarboxylic acids; anhydrides of such aliphatic polycarboxylic acids; and esters of such aliphatic polycarboxylic acids with lower alkyls having about 1 to 4 carbon atoms. These aliphatic polybasic acids may be used singly, or in a combination of two or more.

Alicyclic polybasic acids generally include compounds having at least one alicyclic structure and at least two carboxy groups per molecule; acid anhydrides of such compounds; and esters of such compounds. The alicyclic structure is typically a 4-6 membered ring structure. Examples of alicyclic polybasic acids include 1,2-cyclohexanedicarboxylic acid, 1,3-cyclohexanedicarboxylic acid, 1,4-cyclohexanedicarboxylic acid, 4-cyclohexene-1,2-dicarboxylic acid, 3-methyl-1,2-cyclohexanedicarboxylic acid, 4-methyl-1,2-cyclohexanedicarboxylic acid, 1,2,4-cyclohexanetricarboxylic acid, 1,3,5-cyclohexanetricarboxylic acid, and like alicyclic polycarboxylic acids; anhydrides of such alicyclic polycarboxylic acids; and esters of such alicyclic polycarboxylic acids with lower alkyls having about 1 to 4 carbon atoms. These alicyclic polybasic acids may be used singly, or in a combination of two or more.

Aromatic polybasic acids generally include aromatic compounds having at least two carboxy groups per molecule; acid anhydrides of such aromatic compounds; and esters of such aromatic compounds. Examples of aromatic polybasic acids include phthalic acid, isophthalic acid, terephthalic acid, naphthalenedicarboxylic acid, 4,4'-biphenyldicarboxylic acid, trimellitic acid, pyromellitic acid, and like aromatic polycarboxylic acids; anhydrides of such aromatic polycarboxylic acids; and esters of such aromatic polycarboxylic acids with lower alkyls having about 1 to 4 carbon atoms. These aromatic polybasic acids may be used singly, or in a combination of two or more.

It is also possible to use acid components other than the aliphatic polybasic acids, alicyclic polybasic acids, and aromatic polybasic acids. Examples of such acid components include, but are not particularly limited to, coconut oil fatty acid, cottonseed oil fatty acid, hempseed oil fatty acid, rice bran oil fatty acid, fish oil fatty acid, tall oil fatty acid, soybean oil fatty acid, linseed oil fatty acid, tung oil fatty acid, rapeseed oil fatty acid, castor oil fatty acid, dehydrated castor oil fatty acid, safflower oil fatty acid, and like fatty acids; lauric acid, myristic acid, palmitic acid, stearic acid, oleic acid, linoleic acid, linolenic acid, benzoic acid, p-tert-butyl benzoic acid, cyclohexanoic acid, 10-phenyloctadecanoic acid, and like monocarboxylic acids; and lactic acid, 3-hydroxybutanoic acid, 3-hydroxy-4-ethoxybenzoic acid, and like hydroxycarboxylic acids. These acid components may be used singly, or in a combination of two or more.

Polyhydric alcohols having at least two hydroxy groups per molecule can be preferably used as the alcohol component. Examples of the polyhydric alcohols include dihydric alcohols, such as ethylene glycol, propylene glycol, diethylene glycol, trimethylene glycol, tetraethylene glycol, triethylene glycol, dipropylene glycol, 1,4-butanediol, 1,3-butanediol, 2,3-butanediol, 1,2-butanediol, 3-methyl-1,2-butanediol, 2-butyl-2-ethyl-1,3-propanediol, 1,2-pentanediol, 1,5-pentanediol, 1,4-pentanediol, 2,4-pentanediol, 2,3-dimethyltrimethylene glycol, tetramethylene glycol, 3-methyl-4,3-pentanediol, 3-methyl-1,5-pentanediol, 2,2,4-trimethyl-1,3-pentanediol, 1,6-hexanediol, 1,5-hexanediol, 1,4-hexanediol, 2,5-hexanediol, neopentyl glycol, 1,4-cyclohexanedimethanol, tricyclodecanedimethanol, hydrogenated bisphenol A, hydrogenated bisphenol F, and dimethylolpropionic acid; polylactone diols obtained by adding lactone compounds, such as ε-caprolactone, to such dihydric alcohols; ester diol compounds, such as bis(hydroxyethyl) terephthalate; polyether diol compounds, such as alkylene oxide adducts of bisphenol A, polyethylene glycols, polypropylene glycols, and polybutylene glycols; trihydric or higher polyhydric alcohols, such as glycerol, trimethylolethane, trimethylolpropane, diglycerol, triglycerol, 1,2,6-hexanetriol, pentaerythritol, dipentaerythritol, tris(2-hydroxyethyl)isocyanuric acid, sorbitol, and mannitol; and polylactone polyols obtained by adding lactone compounds, such as ε-caprolactone, to these trihydric or higher polyhydric alcohols.

It is also possible to use alcohol components other than polyhydric alcohols. These alcohol components are not particularly limited and include, for example, monohydric alcohols, such as methanol, ethanol, propyl alcohol, butyl alcohol, stearyl alcohol, and 2-phenoxyethanol; and alcohol compounds obtained by reacting monoepoxy compounds, such as propylene oxide, butylene oxide, and "Cardura E10" (product name, produced by HEXION Specialty Chemicals; glycidyl ester of a synthetic highly branched saturated fatty acid) with acids.

The method for producing the hydroxy-containing polyester resin (A2) is not limited, and may be performed in accordance with any usual method. For example, the acid component and the alcohol component can be heated in a nitrogen stream at about 150 to 250° C. for about 5 to 10 hours to carry out an esterification or transesterification reaction of the acid component with the alcohol component, thus providing a hydroxy-containing polyester resin.

For the esterification or transesterification reaction, the acid component and the alcohol component may be introduced into a reactor at one time, or one or both of the components may be added in several portions. Further, it is possible to first synthesize a hydroxy-containing polyester resin and then react the synthesized hydroxy-containing polyester resin with an acid anhydride for half-esterification to obtain a carboxy- and hydroxy-containing polyester resin. Examples of acid anhydrides as used herein include the anhydrides of aliphatic polybasic acids, the anhydrides of alicyclic polybasic acids, and the anhydrides of aromatic polybasic acids mentioned above, and the like. Specifically, for example, trimellitic anhydride is preferable. It is also possible to first synthesize a carboxy-containing polyester resin, followed by addition of the alcohol component to obtain a hydroxy-containing polyester resin.

As a catalyst for promoting the esterification or transesterification reaction, known catalysts are usable. Examples of catalysts include dibutyltin oxide, antimony trioxide, zinc acetate, manganese acetate, cobalt acetate, calcium acetate, lead acetate, tetrabutyl titanate, tetraisopropyl titanate, and the like.

The hydroxy-containing polyester resin (A2) can be modified with a fatty acid, a monoepoxy compound, a polyisocyanate compound, or the like, during or after the preparation of the resin.

Examples of the fatty acid include coconut oil fatty acid, cottonseed oil fatty acid, hempseed oil fatty acid, rice bran oil fatty acid, fish oil fatty acid, tall oil fatty acid, soybean oil fatty acid, linseed oil fatty acid, tung oil fatty acid, rapeseed oil fatty acid, castor oil fatty acid, dehydrated castor oil fatty acid, safflower oil fatty acid, and the like. Preferable examples of the monoepoxy compound include "Cardura E10" (trade name, produced by HEXION Specialty Chemicals; glycidyl ester of a synthetic highly branched saturated fatty acid).

Examples of the polyisocyanate compound include aliphatic diisocyanates, such as lysine diisocyanate, hexamethylene diisocyanate, and trimethylhexane diisocyanate; alicyclic diisocyanates, such as hydrogenated xylylene diisocyanate, isophorone diisocyanate, methylcyclohexane-2,4-diisocyanate, methylcyclohexane-2,6-diisocyanate, 4,4'-methylene bis(cyclohexylisocyanate), and 1,3-(isocyanatomethyl)cyclohexane; aromatic diisocyanates, such as tolylene diisocyanate, xylylene diisocyanate, and diphenylmethane diisocyanate; organic polyisocyanates, such as lysine triisocyanate and like tri- or higher polyisocyanates; adducts of these organic polyisocyanates with polyhydric alcohols, low-molecular-weight polyester resins, water, etc.; and cyclopolymers (e.g., isocyanurate), biuret adducts, etc., of these organic polyisocyanates. These polyisocyanate compounds may be used singly, or in a combination of two or more.

The hydroxy-containing polyester resin (A2) preferably has a hydroxy value of 10 to 300 mg KOH/g, more preferably 30 to 250 mg KOH/g, and even more preferably 50 to 180 mg KOH/g. When the hydroxy-containing polyester resin (A2) further contains a carboxy group, the acid value is preferably 1 to 200 mg KOH/g, more preferably 15 to 100 mg KOH/g, and even more preferably 20 to 60 mg KOH/g. The hydroxy-containing polyester resin (A2) preferably has a number average molecular weight of 500 to 50,000, more preferably 1,000 to 30,000, and even more preferably 1,200 to 10,000.

When the aqueous first colored coating composition (X) comprises the hydroxy-containing polyester resin (A2) as at least one member of the aqueous film-forming resin (A), the amount of the hydroxy-containing polyester resin (A2) is preferably 1 to 95 parts by mass, more preferably 2 to 70 parts by mass, and still more preferably 3 to 50 parts by mass, per 100 parts by mass of the total solids content of the aqueous film-forming resin (A) and the specific blocked polyisocyanate compound (B) mentioned above.

When the aqueous first colored coating composition (X) comprises the hydroxy-containing polyester resin (A2) as at least one member of the aqueous film-forming resin (A), and further comprises a curing agent (C) mentioned below, the amount of the hydroxy-containing polyester resin (A2) is preferably 1 to 95 parts by mass, more preferably 2 to 70 parts by mass, and still more preferably 3 to 50 parts by mass, per 100 parts by mass of the total solids content of the aqueous film-forming resin (A), the specific blocked polyisocyanate compound (B), and the curing agent (C).

Polyurethane Resin

Examples of the polyurethane resin include those prepared as follows: an aliphatic and/or alicyclic diisocyanate, at least one diol selected from the group consisting of polyetherdiols, polyesterdiols, and polycarbonate diols, a low-molecular-weight polyhydroxy compound, and dimethanol alkanoic acid are reacted to produce a urethane prepolymer; this urethane prepolymer is neutralized with a tertiary amine, and emulsified and dispersed in water; and the resulting emulsion is optionally mixed with an aqueous medium containing a chain extender, such as a polyamine, a crosslinking agent, and/or a terminator, to perform a reaction until substantially no isocyanate groups remain. This method usually yields a self-emulsifiable polyurethane resin with an average particle size of about 1 to 3,000 nm. Examples of commercially available products of the polyurethane resin include "U-Coat UX-310," "U-Coat UX-5000," and "U-Coat UX-8100" (trade names, produced by Sanyo Chemical Industries, Ltd.).

When the aqueous first colored coating composition (X) comprises a polyurethane resin as at least one member of the aqueous film-forming resin (A), the amount of the polyurethane resin is preferably 1 to 55 parts by mass, more preferably 2 to 50 parts by mass, and still more preferably 3 to 45 parts by mass, per 100 parts by mass of the total solids content of the aqueous film-forming resin (A) and the specific blocked polyisocyanate compound (B) mentioned above.

When the aqueous first colored coating composition (X) comprises a polyurethane resin as at least one member of the aqueous film-forming resin (A), and further comprises a curing agent (C) mentioned below, the amount of the polyurethane resin is preferably 1 to 50 parts by mass, more preferably 2 to 45 parts by mass, and still more preferably 3 to 40 parts by mass, per 100 parts by mass of the total solids content of the aqueous film-forming resin (A), the specific blocked polyisocyanate compound (B) mentioned above, and the curing agent (C).

Polyolefin Resin

In the method of the present invention, when the substrate is plastic, it is preferable to use a polyolefin resin, from the viewpoint of the adhesion, etc., of the resulting coating film. From the viewpoint of the applicability to aqueous coating compositions, the polyolefin resin is preferably, for example, a modified polyolefin resin aqueous dispersion in which polyolefin (i) modified with unsaturated carboxylic acid or an acid anhydride thereof is dispersed in an aqueous medium.

Unsaturated carboxylic acid- or acid anhydride-modified polyolefins (i) can be obtained by (co)polymerizing at least one olefin selected from olefins of 2 to 10, preferably 2 to 4, carbon atoms, such as ethylene, propylene, butylene, and hexene, to obtain a polyolefin, and then graft-polymerizing the obtained polyolefin using an unsaturated carboxylic acid of 3 to 10, preferably 4 to 8, carbon atoms, such as (meth) acrylic acid, maleic acid, fumaric acid, or itaconic acid (preferably unsaturated mono- or di-carboxylic acid), or an anhydride of these unsaturated carboxylic acids according to known methods. In particular, those modified with a maleic acid or an acid anhydride thereof are preferable. The amount of the unsaturated carboxylic acid or acid anhydride thereof for grafting is not strictly limited, and may vary according to the property, etc., required of the resulting coating film; the amount is generally in the range of 1 to 20 mass %, preferably 1.5 to 15 mass %, and still more preferably 2 to 10 mass %, based on the solids mass of polyolefin.

The unsaturated carboxylic acid- or acid anhydride-modified polyolefin (i) may further be optionally acrylic modified. Examples of polymerizable unsaturated monomers that can be used for the acrylic modification include alkyl esters of (meth)acrylic acids, such as methyl(meth)acrylate, ethyl (meth)acrylate, propyl(meth)acrylate, butyl(meth)acrylate, hexyl(meth)acrylate, cyclohexyl(meth)acrylate, 2-ethylhexyl(meth)acrylate, lauryl(meth)acrylate, and stearyl(meth) acrylate; acrylic-based monomers, such as (meth)acrylic acid, glycidyl(meth)acrylate, 2-hydroxy ethyl(meth)acrylate, (meth)acrylamide and (meth)acrylonitrile; styrene; and the like. These may be used singly, or in a combination of two or more.

Examples of the acrylic modification method include a method that comprises first reacting an unsaturated carboxylic acid- or acid anhydride-modified polyolefin with, for example, (meth)acrylic acid glycidyl, which has reactivity with the carboxy groups of the modified polyolefin, to introduce polymerizable unsaturated groups into the modified polyolefin, and then copolymerizing one or more other monomers with the unsaturated carboxylic acid- or acid anhydride-modified polyolefin, to which the polymerizable unsaturated groups have been introduced. From the viewpoint of the compatibility with other components and the adhesion of the resulting coating film, the amount of the polymerizable unsaturated monomer when the acrylic modification is performed is preferably 30 mass % or less, more preferably 0.1 to 20 mass %, and still more preferably 0.15 to 15 mass %, based on the solids mass of the resulting modified polyolefin (i).

From the viewpoint of the water resistance, the finished appearance, and the gasohol resistance of the resulting coating film, the unsaturated carboxylic acid- or acid anhydride-modified polyolefin (i) may further be optionally modified with a polyoxyalkylene chain-containing compound. Examples of polyoxyalkylene chains in polyoxyalkylene chain-containing compounds include a polyoxyethylene chain, a polyoxypropylene chain, and a block chain of polyoxyethylene and polyoxypropylene, and the like.

The polyoxyalkylene chain-containing compound preferably has a number average molecular weight of usually 400 to 3,000, and preferably 500 to 2,000. When the number average molecular weight is less than 400, the effect as a hydrophilic group cannot be sufficiently provided. Additionally, an adverse effect may be given to the properties (in particular, water resistance) of the resulting coating film. When the number average molecular weight is more than 3,000, solidification occurs at room temperature, solubility becomes insufficient, and handling becomes difficult. The unsaturated carboxylic acid- or acid anhydride-modified polyolefin (i) may further optionally be chlorinated. Polyolefin may be chlorinated by, for example, blowing chlorine gas into an organic solvent solution or dispersion of polyolefin or modified polyolefin. The reaction temperature may be in the range of 50 to 120° C. The chlorine content in chlorinated polyolefin (solids content) may vary according to the physical properties required of chlorinated polyolefin; it is generally 35 mass % or less, preferably 10 to 30 mass %, and more preferably 12 to 25 mass %, based on the mass of the chlorinated polyolefin, from the viewpoint of the adhesion of the resulting coating film.

As a polyolefin used for the unsaturated carboxylic acid- or acid anhydride-modified polyolefin (i), it is preferable to use those containing, in particular, propylene as a polymerization unit. The mass fraction of propylene for the unsaturated carboxylic acid- or acid anhydride-modified polyolefin (i) is in the range of usually 0.5 to 0.99, preferably 0.6 to 0.97, and more preferably 0.7 to 0.95, from the viewpoint of the compatibility with other components, as well as the adhesion of the resulting coating film.

The thus-obtained unsaturated carboxylic acid- or acid anhydride-modified polyolefin (i) may have a mass average molecular weight (Mw) in the range of generally 30,000 to 180,000, preferably 50,000 to 150,000, and still more preferably 70,000 to 120,000. It is not preferable for the mass average molecular weight of the modified polyolefin to be outside the above ranges, since the compatibility with other components and the interlaminar adhesion between the resulting coating film and a substrate or an upper coating layer will be insufficient. The mass average molecular weight of the modified polyolefin (i) is a value calculated from the mass average molecular weight as determined by gel permeation chromatography based on the mass average molecular weight of polystyrene. Specifically, the value is obtained from a measurement with HLC/GPC 150 C (trade name, produced by Water Inc.; 60 cm×1) with a column temperature of 135° C. using o-dichlorobenzene as a solvent and at a flow rate of 1.0 mL/min. The injection sample is prepared by dissolving polyolefin in o-dichlorobenzene for 1 to 3 hours at 140° C. to a solution concentration of 5 mg of modified polyolefin per 3.4 mL of o-dichlorobenzene. Examples of columns for gel permeation chromatography include GMHHR H(S)HT (trade name, produced by Tosoh Corporation).

The aqueous dispersion of the modified polyolefin can be obtained by dispersing the unsaturated carboxylic acid- or acid anhydride-modified polyolefin (i) in an aqueous medium, such as deionized water. At this time, some or all of the carboxy groups in the unsaturated carboxylic acid- or acid anhydride-modified polyolefin (i) may be neutralized with an amine compound, and/or dispersed in water using an emulsifier, if necessary. When the modified polyolefin (i) has a polyoxyalkylene chain, it is possible to disperse the modified polyolefin (i) in an aqueous medium by using no amine compound nor emulsifier, or using only a small amount of an amine compound or an emulsifier.

Examples of the amine compound include tertiary amines, such as triethylamine, tributylamine, dimethylethanolamine, and triethanolamine; secondary amines, such as diethylamine, dibutylamine, diethanolamine, and morpholine; primary amines, such as propylamine and ethanolamine; and the like.

The amount of the amine compound, when used, is generally preferably in the range of 0.1 to 1.0 molar equivalent relative to the carboxy groups in the unsaturated carboxylic acid- or acid anhydride-modified polyolefin (i).

Examples of the emulsifier include nonionic emulsifiers, such as polyoxyethylene monooleyl ether, polyoxyethylene monostearyl ether, polyoxyethylene monolauryl ether, polyoxyethylene tridecyl ether, polyoxyethylene phenyl ether, polyoxyethylene nonylphenyl ether, polyoxyethylene octylphenyl ether, polyoxyethylene monolaurate, polyoxyethylene monostearate, polyoxyethylene monooleate, sorbitan monolaurate, sorbitan monostearate, sorbitan trioleate, and polyoxyethylene sorbitan monolaurate; and anionic emulsifiers, such as sodium salts and ammonium salts of alkylsulfonic acids, alkylbenzenesulfonic acids, alkylphosphoric acids, etc. Further, polyoxyalkylene-containing anionic emulsifiers having an anionic group and a polyoxyalkylene group, such as a polyoxyethylene group or a polyoxypropylene group, per molecule may also be used. It is also possible to use reactive anionic emulsifiers having the anionic group and a polymerizable unsaturated group per molecule. These may be used singly, or in a combination of two or more.

The emulsifier is preferably used in an amount of generally 30 parts by mass or less, and particularly 0.5 to 25 parts by mass, per 100 parts by mass of the solids content of the unsaturated carboxylic acid- or acid anhydride-modified polyolefin (i).

When the aqueous first colored coating composition (X) comprises a polyolefin resin as at least one member of the aqueous film-forming resin (A), the amount of the polyolefin resin is preferably 15 to 65 parts by mass, more preferably 20 to 60 parts by mass, and still more preferably 25 to 55 parts by mass, per 100 parts by mass of the total solids content of the aqueous film-forming resin (A) and the specific blocked polyisocyanate compound (B) mentioned above.

When the aqueous first colored coating composition (X) comprises a polyolefin resin as at least one member of the aqueous film-forming resin (A), and further comprises a curing agent (C) mentioned below, the amount of the polyolefin resin is preferably 15 to 65 parts by mass, more preferably 20 to 55 parts by mass, and still more preferably 25 to 50 parts by mass, per 100 parts by mass of the total solids content of the aqueous film-forming resin (A), the specific blocked polyisocyanate compound (B) mentioned above, and the curing agent (C).

When the hydroxy-containing acrylic resin (A1) and a polyolefin resin are used as a part of the aqueous film-forming resin (A), the ratio of the polyolefin resin/the hydroxy-containing acrylic resin (A1) is generally 5/95 to 80/20, preferably 10/90 to 75/25, and more preferably 15/85 to 75/25, on a solids basis (by mass). It is not preferable for the ratio to be outside the above ranges since the adhesion to the material, and the water resistance and the gasohol resistance of the resulting coating film will be insufficient.

Blocked Polyisocyanate Compound (B)

The blocked polyisocyanate compound (B) used in the method of the present invention has a feature in that it has at least one blocked isocyanate group selected from the blocked isocyanate groups represented by Formula (I) below:

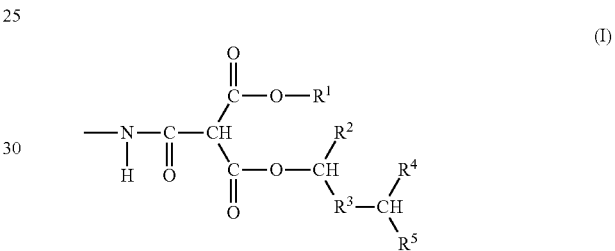

wherein $R^1$, $R^2$, $R^4$, and $R^5$ each independently represent $C_{1-12}$ hydrocarbon, and $R^3$ represents $C_{1-12}$ linear or branched alkylene, blocked isocyanate groups represented by Formula (II) below:

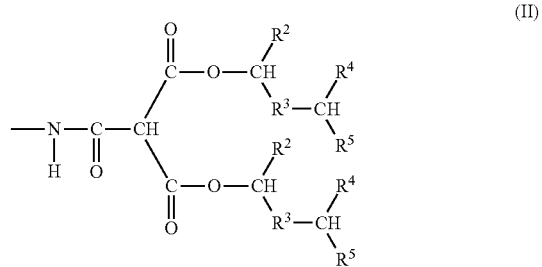

wherein $R^2$, $R^3$, $R^4$, and $R^5$ are as defined above, and blocked isocyanate groups represented by Formula (III) below:

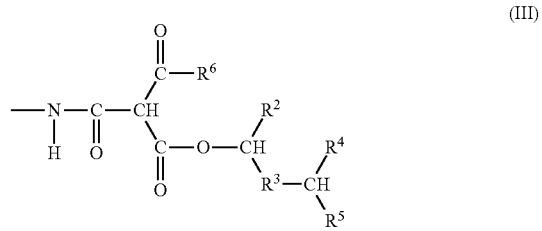

wherein $R^2$, $R^3$, $R^4$, and $R^5$ are as defined above, and $R^6$ represents $C_{1-12}$ hydrocarbon.

Examples of the $C_{1-12}$ hydrocarbon represented by $R^1$, $R^2$, $R^4$, $R^5$, and $R^6$ in Formulae (I) to (III) above include linear or branched alkyl, such as methyl, ethyl, n-propyl, isopropyl, n-butyl, isobutyl, sec-butyl, t-butyl, n-pentyl, n-hexyl, 2-ethylhexyl, n-heptyl, n-octylnonyl, n-decyl, n-undecyl, and n-dodecyl; aryl groups such as phenyl and benzyl; and the like.

Preferable examples of $R^1$ include methyl, ethyl, propyl, isopropyl, n-butyl, isobutyl, sec-butyl, t-butyl, n-pentyl, n-hexyl, 2-ethylhexyl, phenyl, and benzyl. Among these, $C_{1-3}$ alkyl, such as methyl, ethyl, and isopropyl, are preferable, with ethyl and isopropyl being particularly preferable.

$R^2$, $R^4$, and $R^5$ each preferably represent $C_{1-3}$ alkyl, such as methyl, ethyl, and isopropyl, with methyl being more preferable.

Specific examples of $R^3$ include $C_{1-12}$ linear or branched alkylene, which is represented by $-C_pH_{2p}-$ (wherein p is an integer of 1 to 12). $R^3$ is particularly preferably $C_{1-3}$ alkylene (methylene, ethylene, propylene, or trimethylene).

Preferable examples of $R^6$ include $C_{1-3}$ alkyl, such as methyl, ethyl, and isopropyl, with methyl and isopropyl being more preferable.

The blocked polyisocyanate compound (B) can be obtained, for example, by reacting the isocyanate groups in a polyisocyanate compound (b1) having at least two isocyanate groups per molecule with an active methylene compound (b2) to obtain a blocked polyisocyanate compound (b3), and then reacting the obtained blocked polyisocyanate compound (b3) with a secondary alcohol (b4).

Polyisocyanate Compound (b1)

The polyisocyanate compound (b1) has at least two isocyanate groups per molecule. Examples of such compounds include aliphatic polyisocyanates, alicyclic polyisocyanates, aromatic-aliphatic polyisocyanates, aromatic polyisocyanates, and derivatives of these polyisocyanates.

Examples of the aliphatic polyisocyanates include aliphatic diisocyanates, such as trimethylene diisocyanate, tetramethylene diisocyanate, hexamethylene diisocyanate, pentamethylene diisocyanate, 1,2-propylene diisocyanate, 1,2-butylene diisocyanate, 2,3-butylene diisocyanate, 1,3-butylene diisocyanate, 2,4,4- or 2,2,4-trimethylhexamethylene diisocyanate, dimeric acid diisocyanate, and methyl 2,6-diisocyanatohexanoate (common name: lysine diisocyanate); aliphatic triisocyanates, such as 2-isocyanatoethyl 2,6-diisocyanatohexanoate, 1,6-diisocyanato-3-isocyanatomethylhexane, 1,4,8-triisocyanatooctane, 1,6,11-triisocyanatoundecane, 1,8-diisocyanato-4-isocyanatomethyloctane, 1,3,6-triisocyanatohexane, and 2,5,7-trimethyl-1,8-diisocyanato-5-isocyanatomethyloctane; and the like.

Examples of the alicyclic polyisocyanates include alicyclic diisocyanates, such as 1,3-cyclopentene diisocyanate, 1,4-cyclohexane diisocyanate, 1,3-cyclohexane diisocyanate, 3-isocyanatomethyl-3,5,5-trimethylcyclohexyl isocyanate (common name: isophorone diisocyanate), 4-methyl-1,3-cyclohexylene diisocyanate (common name: hydrogenated TDI), 2-methyl-1,3-cyclohexylene diisocyanate, 1,3- or 1,4-bis(isocyanatomethyl)cyclohexane (common name: hydrogenated xylylene diisocyanate) or mixtures thereof, and methylenebis(4,1-cyclohexanediyl)diisocyanate (common name: hydrogenated MDI), and norbornane diisocyanate; alicyclic triisocyanates, such as 1,3,5-triisocyanatocyclohexane, 1,3,5-trimethylisocyanatocyclohexane, 2-(3-isocyanatopropyl)-2,5-di(isocyanatomethyl)-bicyclo(2.2.1) heptane, 2-(3-isocyanatopropyl)-2,6-di(isocyanatomethyl)- bicyclo(2.2.1)heptane, 3-(3-isocyanatopropyl)-2,5-di(isocyanatomethyl)-bicyclo(2.2.1)heptane, 5-(2-isocyanatoethyl)-2-isocyanatomethy-3-(3-isocyanatopropyl)-bicyclo(2.2.1)heptane, 6-(2-isocyanatoethyl)-2-isocyanatomethyl-3-(3-isocyanatopropyl)-bicyclo(2.2.1)heptane, 5-(2-isocyanatoethyl)-2-isocyanatomethyl-2-(3-isocyanatopropyl)-bicyclo(2.2.1)heptane, and 6-(2-isocyanatoethyl)-2-isocyanatomethyl-2-(3-isocyanatopropyl)-bicyclo(2.2.1)heptane; and the like.

Examples of the aromatic-aliphatic polyisocyanates include aromatic-aliphatic diisocyanates, such as methylenebis(4,1-phenylene)diisocyanate (common name: MDI), 1,3- or 1,4-xylylene diisocyanate or mixtures thereof, ω,ω'-diisocyanato-1,4-diethylbenzene, and 1,3- or 1,4-bis(1-isocyanato-1-methylethyl)benzene (common name: tetramethylxylylene diisocyanate) or mixtures thereof; aromatic-aliphatic triisocyanates such as 1,3,5-triisocyanatomethylbenzene; and the like.

Examples of the aromatic polyisocyanates include aromatic diisocyanates, such as m-phenylene diisocyanate, p-phenylene diisocyanate, 4,4'-diphenyldiisocyanate, 1,5-naphthalene diisocyanate, 2,4-tolylene diisocyanate (common name: 2,4-TDI), or 2,6-tolylene diisocyanate (common name: 2,6-TDI) or mixtures thereof, 4,4'-toluidine diisocyanate, and 4,4'-diphenylether diisocyanate; aromatic triisocyanates, such as triphenylmethane-4,4',4"-triisocyanate, 1,3,5-triisocyanatobenzene, and 2,4,6-triisocyanatotoluene; and aromatic tetraisocyanates, such as 4,4'-diphenylmethane-2, 2',5,5'-tetraisocyanate; and the like.

Examples of the polyisocyanate derivatives include dimers, trimers, biurets, allophanates, urethodiones, urethoimines, isocyanurates, oxadiazinetriones, polymethylene polyphenyl polyisocyanates (crude MDI, polymeric MDI), crude TDI, and the like, of the above-mentioned polyisocyanate compounds. Preferable examples include cyclopolymers of the polyisocyanate (e.g., isocyanurate), and the like.

The above polyisocyanates and derivatives thereof may be used singly, or in a combination of two or more. Among these polyisocyanates, it is preferable to use aliphatic diisocyanates, alicyclic diisocyanates, and derivatives of these diisocyanates as the polyisocyanate compound (b1) because yellowing is less likely to occur during heating of the obtained blocked polyisocyanate composition. From the viewpoint of improving the flexibility of the resulting coating film, aliphatic diisocyanates and derivatives thereof are more preferably used.

As the polyisocyanate compound (b1), it is also possible to use a prepolymer formed by reacting the polyisocyanate or a derivative thereof with a compound reactive to the polyisocyanate under conditions such that the isocyanate groups are present in excess. Examples of the compound reactive to the polyisocyanate include compounds that have active hydrogen, such as hydroxy or amino, and specific examples include polyhydric alcohols, low-molecular-weight polyester resins, amine, water, and the like.

As the polyisocyanate compound (b1), it is possible to use a polymer of an isocyanate-containing polymerizable unsaturated monomer, or a copolymer of the isocyanate-containing polymerizable unsaturated monomer and a polymerizable unsaturated monomer other than the isocyanate-containing polymerizable unsaturated monomer.

From the viewpoint of the reactivity of the resulting blocked polyisocyanate compound (B) and the compatibility between the blocked polyisocyanate compound (B) and other coating components, the polyisocyanate compound (b1) preferably has a number average molecular weight of 300 to 20,000, more preferably 400 to 8,000, and even more preferably 500 to 2,000.

From the viewpoint of the reactivity of the resulting blocked polyisocyanate compound (B) and the compatibility between the blocked polyisocyanate compound (B) and other coating components, the polyisocyanate compound (b1) preferably has an average isocyanate functionality per molecule of 2 to 100. To improve the reactivity of the obtained blocked polyisocyanate composition, the lower limit of the average isocyanate functionality per molecule is preferably 3. To inhibit gelation during the production of the blocked polyisocyanate compound (B), the upper limit of the average isocyanate functionality per molecule is preferably 20.

Active Methylene Compound (b2)

Examples of the active methylene compound (b2) that blocks isocyanate groups of the polyisocyanate compound (b1) include malonate diesters, such as dimethyl malonate, diethyl malonate, di-n-propyl malonate, diisopropyl malonate, di-n-butyl malonate, diisobutyl malonate, di-sec-butyl malonate, di-t-butyl malonate, di-n-pentyl malonate, di-n-hexyl malonate, di(2-ethylhexyl) malonate, methyl isopropyl malonate, ethyl isopropyl malonate, methyl n-butyl malonate, ethyl n-butyl malonate, methyl isobutyl malonate, ethyl isobutyl malonate, methyl sec-butyl malonate, ethyl sec-butyl malonate, diphenyl malonate, and dibenzyl malonate; acetoacetic esters, such as methyl acetoacetate, ethyl acetoacetate, n-propyl acetoacetate, isopropyl acetoacetate, n-butyl acetoacetate, isobutyl acetoacetate, sec-butyl acetoacetate, t-butyl acetoacetate, n-pentyl acetoacetate, n-hexyl acetoacetate, 2-ethylhexyl acetoacetate, phenyl acetoacetate, and benzyl acetoacetate; and isobutyryl acetic esters, such as isobutyryl methyl acetate, isobutyryl ethyl acetate, isobutyryl n-propyl acetate, isobutyryl isopropyl acetate, isobutyryl n-butyl acetate, isobutyl isobutyryl acetate, isobutyryl sec-butyl acetate, isobutyryl t-butyl acetate, isobutyryl n-pentyl acetate, isobutyryl n-hexyl acetate, isobutyryl 2-ethylhexyl acetate, isobutyryl phenyl acetate, and isobutyryl benzyl acetate. These may be used singly, or in a combination of two or more.

From the viewpoint of the finished appearance of a coating film formed of an aqueous coating composition comprising the resulting blocked polyisocyanate compound (B), the active methylene compound (b2) is preferably at least one compound selected from the group consisting of dimethyl malonate, diethyl malonate, diisopropyl malonate, methyl acetoacetate, ethyl acetoacetate, isobutyryl methyl acetate, and isobutyryl ethyl acetate, and more preferably at least one compound selected from the group consisting of diisopropyl malonate, isobutyryl methyl acetate, and isobutyryl ethyl acetate. From the viewpoint of the reactivity and storage stability of the resulting blocked polyisocyanate compound (B) and the finished appearance of a coating film formed of an aqueous coating composition comprising the blocked polyisocyanate compound (B), diisopropyl malonate is particularly preferable.

A reaction catalyst may optionally be used in a reaction in which isocyanate groups are blocked with the active methylene compound (b2). As the reaction catalyst, it is preferable to use basic compounds, such as metal hydroxides, metal alkoxides, metal carboxylates, metal acetylacetonates, hydroxides of onium salts, onium carboxylates, metal salts of active methylene compounds, onium salts of active methylene compounds, aminosilanes, amines, and phosphines. Among these, ammonium salts, phosphonium salts, and sulfonium salts are preferable as onium salts. The reaction catalyst is preferably used in an amount in the range of 10 to 10,000 ppm, and more preferably 20 to 5,000 ppm, based on the total solid mass of the polyisocyanate compound (b1) and the active methylene compound (b2).

The reaction in which the isocyanate groups are blocked with the active methylene compound (b2) can be carried out at 0 to 150° C. In the reaction, a solvent may be used. In this case, the solvent is preferably a non-protic solvent. Esters, ethers, N-alkylamides, ketones, and the like are particularly preferable. When the reaction has progressed as desired, the reaction may be terminated by adding an acid component to neutralize the basic compound, which is a catalyst.

The amount of the active methylene compound (b2) used in the reaction in which the isocyanate groups are blocked with the active methylene compound (b2) is not particularly limited but is preferably 0.1 to 3 moles, more preferably 0.2 to 2 moles, per mole of the isocyanate groups in the polyisocyanate compound (b1). The active methylene compound that has not reacted with the isocyanate groups in the polyisocyanate compound (b1) can be removed after the blocking reaction.

Some of the isocyanate groups in the polyisocyanate compound (b1) may be reacted with an active hydrogen-containing compound. The reaction of some of the isocyanate groups in the polyisocyanate compound (b1) with an active hydrogen-containing compound can enhance the storage stability of the resulting blocked polyisocyanate compound (B), adjust the compatibility between the blocked polyisocyanate compound (B) and other coating components, and improve the flexibility of the resulting coating film.

Examples of the active hydrogen-containing compound include hydroxy-containing compounds and amino-containing compounds.

Examples of hydroxy-containing compounds include propanol, butanol, pentanol, hexanol, heptanol, 2-ethyl-1-hexanol, octanol, nonanol, decanol, tridecanol, stearyl alcohol, ethylene glycol, propylene glycol, polyethylene glycol, polypropylene glycol, polyethylene glycol(propylene glycol), polyethylene glycol monoalkyl ether, polypropylene glycol monoalkyl ether, polyethylene glycol (propylene glycol)monoalkyl ether, trimethylolpropane, and the like. These may be used singly, or in a combination of two or more. In this specification, "polyethylene glycol (propylene glycol)" refers to a copolymer of ethylene glycol and propylene glycol, and includes any blocked copolymers and random copolymers.

To prevent the viscosity of the resulting blocked polyisocyanate compound (B) from increasing, the hydroxy-containing compound is preferably a monovalent alcohol. Examples of the monovalent alcohol include propanol, butanol, pentanol, hexanol, heptanol, 2-ethyl-1-hexanol, octanol, nonanol, decanol, tridecanol, stearyl alcohol, polyethylene glycol monoalkyl ether, polypropylene glycol monoalkyl ether, polyethylene glycol (propylene glycol) monoalkyl ether, and the like. These may be used singly, or in a combination of two or more.

Examples of the amino-containing compounds include butylamine, octylamine, stearylamine, dibutylamine, dioctylamine, dicyclohexylamine, di-lauryl amine, α-(aminoalkyl)-ω-alkoxy polyoxyethylene(oxypropylene), hexamethylenediamine, diethylenetriamine, polyoxypropylene-α,ω-diamine (examples of commercially available products include "Jeffamine D-400" produced by Huntsman Corporation), and the like. These may be used singly, or in a combination of two or more.

To prevent the viscosity of the resulting blocked polyisocyanate compound (B) from increasing, the amino-containing compound is particularly preferably a monovalent amine. Examples of the monovalent amine include butylamine, octylamine, stearylamine, dibutylamine, dioctylamine, dicyclohexylamine, dilauryl amine, α-(aminoalkyl)-ω-alkoxy polyoxyethylene(oxypropylene), and the like. These may be used singly, or in a combination of two or more.

From the viewpoint of the storage stability and curability of the aqueous coating composition, and the finished appearance of the resulting multilayer coating film, when some of the isocyanate groups in the polyisocyanate compound (b1) are reacted with the active hydrogen-containing compound, the reaction ratio is preferably such that the amount of the active hydrogen in the active hydrogen-containing compound is 0.03 to 0.6 mole per mole of the isocyanate groups in the polyisocyanate compound (b1). From the viewpoint of the curability of the aqueous coating composition and the water resistance of the resulting multilayer coating film, the upper limit is preferably 0.4, and more preferably 0.3. From the viewpoint of the storage stability of the aqueous coating composition and the finished appearance of the resulting multilayer coating film, the lower limit is preferably 0.04, and more preferably 0.05.

From the viewpoint of the storage stability and curability of the aqueous coating composition, and the finished appearance of the resulting multilayer coating film, the blocked polyisocyanate compound (B) is preferably a blocked polyisocyanate compound (B') having a hydrophilic group.

The blocked polyisocyanate compound (B') can be obtained, for example, by using an active hydrogen-containing compound having a hydrophilic group as the active hydrogen-containing compound.

As the active hydrogen-containing compound having a hydrophilic group, it is possible to use an active hydrogen-containing compound having a nonionic hydrophilic group, an active hydrogen-containing compound having an anionic hydrophilic group, an active hydrogen-containing compound having a cationic hydrophilic group, and the like. These compounds may be used singly, or in a combination of two or more. Among these, it is preferable to use an active hydrogen-containing compound having a nonionic hydrophilic group, which is less likely to inhibit the reaction in which the isocyanate groups in the polyisocyanate compound are blocked (b1) with the active methylene compound (b2).

As the active hydrogen-containing compound having a nonionic hydrophilic group, it is preferable to use, for example, an active hydrogen-containing compound having a polyoxyalkylene group. Examples of the polyoxyalkylene group include polyoxyethylene, polyoxypropylene, polyoxyethylene (oxypropylene), and the like. These may be used singly, or in a combination of two or more. From the viewpoint of the storage stability of the aqueous coating composition, it is particularly preferable to use an active hydrogen-containing compound having a polyoxyethylene group.

From the viewpoint of the storage stability of the resulting blocked polyisocyanate compound after being dispersed in water, and the water resistance, etc., of the resulting coating film, the active hydrogen-containing compound preferably has a polyoxyethylene group of 3 or more, more preferably 5 to 100, and still more preferably 8 to 45 continuous oxyethylene groups.

The active hydrogen-containing compound having a polyoxyethylene group may further have an oxyalkylene group other than oxyethylene groups, in addition to the continuous oxyethylene groups. Examples of the oxyalkylene group other than oxyethylene groups include oxypropylene, oxybutylene, oxystyrene, and the like. From the viewpoint of the storage stability of the resulting aqueous coating composition, the molar ratio of the oxyethylene groups relative to the oxyalkylene groups in the active hydrogen-containing compound having a polyoxyethylene group is preferably 20 to 100 mol %, and more preferably 50 to 100 mol %. When the molar ratio of the oxyethylene groups relative to the oxyalkylene groups is less than 20 mol %, sufficient hydrophilicity may not be imparted, and the resulting aqueous coating composition can have reduced storage stability.

From the viewpoint of the storage stability of the resulting aqueous coating composition and the water resistance of the resulting multilayer coating film, the active hydrogen-containing compound having a nonionic hydrophilic group preferably has a number average molecular weight of 200 to 2,000. From the viewpoint of the storage stability of the obtained aqueous coating composition, the lower limit of the number average molecular weight is preferably 300, and more preferably 400. From the viewpoint of the water resistance of a coating film formed of an aqueous coating composition containing the blocked polyisocyanate compound (B), the upper limit of the number average molecular weight is preferably 1,500, and more preferably 1,200.

Examples of the active hydrogen-containing compound having a nonionic hydrophilic group include polyethylene glycol monoalkyl ethers (alternate name: ω-alkoxypolyoxyethylenes), such as polyethylene glycol monomethyl ether and polyethylene glycol monoethyl ether; polypropyleneglycol monoalkyl ethers (alternate name: ω-alkoxypolyoxypropylenes), such as polypropyleneglycol monomethyl ether and polypropyleneglycol monoethyl ether; ω-alkoxypolyoxyethylene(oxypropylene), such as ω-methoxypolyoxyethylene (oxypropylene) and ω-ethoxypolyoxyethylene(oxypropylene); polyethylene glycol (propylene glycol)monoalkyl ethers, such as polyethylene glycol (propylene glycol) monomethyl ether and polyethylene glycol (propylene glycol)monoethyl ether; and polyethylene glycol, polypropylene glycol, polyethylene glycol(propylene glycol), α-(aminoalkyl)-ω-alkoxypolyoxyethylene, α-(aminoalkyl)-ω-alkoxypolyoxypropylene, α-(aminoalkyl)-ω-alkoxypolyoxyethylene(oxypropylene), and the like. These may be used singly, or in a combination of two or more. Among these, polyethylene glycol monomethyl ether, polyethylene glycol monoethyl ether, and polyethylene glycol are preferable. Polyethylene glycol monomethyl ether is more preferable.

Examples of commercial available products of the polyethylene glycol monomethyl ether include "Uniox M-400," "Uniox M-550," "Uniox M-1000," and "Uniox M-2000," all produced by NOF Corporation. Examples of commercially available products of the polyethylene glycol include "PEG #200," "PEG #300," "PEG #400," "PEG #600," "PEG #1000," "PEG #1500," "PEG #1540," and "PEG #2000," all produced by NOF Corporation.

Examples of the active hydrogen-containing compound having an anionic hydrophilic group include an active hydrogen-containing compound having a carboxy group, an active hydrogen-containing compound having a sulfonic acid group, an active hydrogen-containing compound having a phosphoric acid group, neutralized salts thereof, and the like. These may be used singly, or in a combination of two or more. Among these, an active hydrogen-containing compound having a carboxy group is preferable from the viewpoint of the compatibility of the resulting blocked polyisocyanate compound (B) with other coating components.

Some or all of the acid groups in the active hydrogen-containing compound having an anionic hydrophilic group are preferably neutralized with a basic compound, because the reaction of blocking isocyanate groups in the polyisocyanate compound (b1) with the active methylene compound (b2) described above is less likely to be inhibited.

The acid group in the active hydrogen-containing compound having an anionic hydrophilic group may be neutralized before or after the reaction of the active hydrogen-containing compound having an anionic hydrophilic group with the polyisocyanate compound (b1).

Examples of the basic compound include hydroxides of alkali metals or alkaline earth metals, such as sodium hydroxide, potassium hydroxide, lithium hydroxide, calcium hydroxide, and barium hydroxide; metal alkoxides; ammonia; primary monoamines, such as ethylamine, propylamine, butylamine, benzylamine, monoethanolamine, 2,2-dimethyl-3-amino-1-propanol, 2-aminopropanol, 2-amino-2-methyl-1-propanol, and 3-aminopropanol; secondary monoamines, such as diethylamine, diethanolamine, di-n-propanolamine, diisopropanolamine, N-methylethanolamine, and N-ethylethanolamine; tertiary monoamines, such as dimethylethanolamine, trimethylamine, triethylamine, triisopropylamine, methyldiethanolamine, and 2-(dimethylamino)ethanol; and polyamines, such as diethylenetriamine, hydroxyethylaminoethylamine, ethylaminoethylamine, and methylaminopropylamine. These may be used singly, or in a combination of two or more. The amount of the basic compound is usually in the range of 0.1 to 1.5 equivalents, and preferably 0.2 to 1.2 equivalents, relative to the anionic group in the active hydrogen-containing compound having an anionic hydrophilic group.

Examples of the active hydrogen-containing compound having a carboxy group include monohydroxycarboxylic acids, such as glycolic acid, lactic acid, hydroxypivalic acid, malic acid, and citric acid; dihydroxycarboxylic acids such as 2,2-dimethylolacetic acid, 2,2-dimethylollactic acid, 2,2-dimethylolpropionic acid, 2,2-dimethylolbutanoic acid, dimethylolheptanoic acid, dimethylolnonanoic acid, 2,2-dimethylolbutyric acid, and 2,2-dimethylolvaleric acid; lactone ring-opening adducts of these dihydroxycarboxylic acids; glycine, 1-carboxy-1,5-pentylenediamine, dihydroxybenzoic acid, 3,5-diaminobenzoic acid, lysine, and arginine.

Examples of the active hydrogen-containing compound having a sulfonic acid group include 2-amino-1-ethanesulfonic acid, N,N-bis(2-hydroxyethyl)-2-aminoethanesulfonic acid, 1,3-phenylenediamine-4,6-disulfonic acid, diaminobutanesulfonic acid, 3,6-diamino-2-toluenesulfonic acid, 2,4-diamino-5-toluenesulfonic acid, 2-(cyclohexylamino)-ethanesulfonic acid, 3-(cyclohexylamino)-propanesulfonic acid, and the like.

Examples of the active hydrogen-containing compound having a phosphoric acid group include 2,3-dihydroxypropyl phenyl phosphate, hydroxyalkylphosphonic acids, aminoalkylphosphonic acids, and the like.

From the viewpoint of the storage stability and curability of the resulting aqueous coating composition, and the adhesion, finished appearance, and water resistance of a coating film formed of this aqueous coating composition, when some of the isocyanate groups in the polyisocyanate compound (b1) are reacted with the active hydrogen-containing compound having a hydrophilic group, the reaction ratio is preferably such that the amount of the active hydrogen in the active hydrogen-containing compound is 0.03 to 0.6 mole per mole of the isocyanate groups in the polyisocyanate compound (b1). From the viewpoint of the curability of the resulting aqueous coating composition and the water resistance of a coating film formed of this aqueous coating composition, the upper limit is preferably 0.4, and more preferably 0.3. From the viewpoint of the storage stability of the resulting aqueous coating composition, and the adhesion, finished appearance, and water resistance of a coating film formed of this aqueous coating composition, the lower limit is preferably 0.04, and more preferably 0.05.

The blocked polyisocyanate compound (B) may also be added as a mixture with a surfactant to impart water dispersibility. In this case, the surfactant is preferably a nonionic surfactant and/or anionic surfactant, from the viewpoint of the stability of the coating composition.

Blocked Polyisocyanate Compound (b3)

The blocked polyisocyanate compound (b3) is obtainable by reacting a polyisocyanate compound (b1) having at least two isocyanate groups per molecule with an active methylene compound (b2). The blocked polyisocyanate compound (b3) is a blocked, polyisocyanate compound in which some or all of the isocyanate groups in the polyisocyanate compound (b1) are blocked with the active methylene compound (b2).

It is particularly preferable that the blocked polyisocyanate compound (b3) is at least one blocked isocyanate compound selected from a blocked polyisocyanate compound (b3-1) having a blocked isocyanate group represented by Formula (IV):

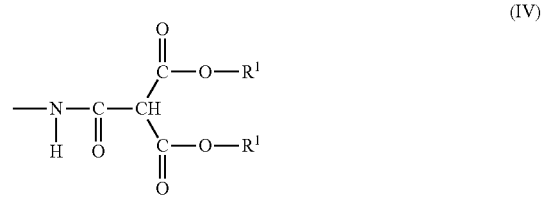

(IV)

wherein each $R^1$ independently represents $C_{1-12}$ hydrocarbon and may be identical or different, and a blocked polyisocyanate compound (b3-2) having a blocked isocyanate group represented by Formula (V):

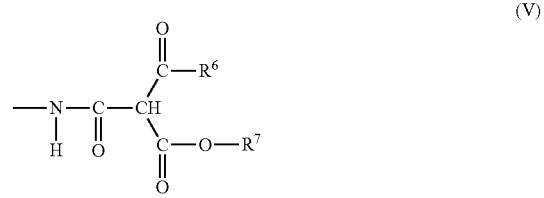

(V)

wherein $R^6$ and $R^7$ each independently represent $C_{1-12}$ hydrocarbon.

Blocked Polyisocyanate Compound (b3-1)

The blocked polyisocyanate compound (b3-1) has a blocked isocyanate group represented by Formula (IV).

The blocked polyisocyanate compound (b3-1) is preferably one wherein $R^1$ is $C_{1-3}$ alkyl because an active methylene compound, which can be relatively easily produced, can be used as the active methylene compound (b2), which is one of the starting materials for the blocked polyisocyanate compound. To improve the compatibility of the resulting blocked polyisocyanate compound (B) with other coating components, $R^1$ is more preferably $C_{2-3}$ alkyl. From the viewpoint of the storage stability of the resulting aqueous coating composition, and the finished appearance of a coating film formed of this aqueous coating composition, $R^1$ more preferably represents isopropyl.

The blocked polyisocyanate compound (b3-1) can be obtained, for example, by reacting the polyisocyanate compound (b1) with a dialkyl malonate having $C_{1-12}$ hydrocarbon as the active methylene compound (b2).

Examples of the dialkyl malonates include dimethyl malonate, diethyl malonate, di-n-propyl malonate, diisopropyl malonate, di-n-butyl malonate, di-isobutyl malonate, di-sec-butyl malonate, di-tert-butyl malonate, di-n-pentyl malonate, di-n-hexyl malonate, and di(2-ethylhexyl) malonate. These may be used singly, or in a combination of two or more. Among these, dimethyl malonate, diethyl malonate, di-n-propyl malonate, di-isopropyl malonate, di-n-butyl malonate, di-isobutyl malonate, di-sec-butyl malonate, and di-tert-butyl malonate are preferable; diethyl malonate, di-n-propyl malonate, and di-isopropyl malonate are more preferable; and di-isopropyl malonate is even more preferable.

Blocked Polyisocyanate Compound (b3-2)

The blocked polyisocyanate compound (b3-2) is a blocked polyisocyanate compound having a blocked isocyanate group represented by Formula (V).

The blocked polyisocyanate compound (b3-2) is preferably one wherein $R^6$ and $R^7$ represent $C_{1-3}$ alkyl, because an active methylene compound, which can be relatively easily produced, can be used as the active methylene compound (b2), which is one of the starting materials for the blocked polyisocyanate compound. To improve the compatibility of the resulting blocked polyisocyanate compound with other coating components, $R^6$ and $R^7$ more preferably represent $C_{2-3}$ alkyl. From the viewpoint of the storage stability of the resulting aqueous coating composition, and the finished appearance of a coating film formed of this aqueous coating composition, $R^6$ and $R^7$ more preferably represent isopropyl.

The blocked polyisocyanate compound (b3-2) can be obtained, for example, by reacting the polyisocyanate compound (b1) with an acetoacetic acid ester having $C_{1-12}$ hydrocarbon or with an isobutyrylacetic acid ester having $C_{1-12}$ hydrocarbon as the active methylene compound (b2). The active methylene compound (b3-2) is preferably obtained by reacting with an isobutyrylacetic acid ester having $C_{1-12}$ hydrocarbon as the active methylene compound (b2).

Examples of the isobutyrylacetic acid esters include methyl isobutyrylacetate, ethyl isobutyrylacetate, n-propyl isobutyrylacetate, isopropyl isobutyrylacetate, n-butyl isobutyrylacetate, isobutyl isobutyrylacetate, sec-butyl isobutyrylacetate, tert-butyl isobutyrylacetate, n-pentyl isobutyrylacetate, n-hexyl isobutyrylacetate, 2-ethylhexyl isobutyrylacetate, phenyl isobutyrylacetate, and benzyl isobutyrylacetate. These may be used singly, or in a combination of two or more. Among these, methyl isobutyrylacetate, ethyl isobutyrylacetate, and isopropyl isobutyrylacetate are preferable.

Examples of the acetoacetic acid esters include methyl acetoacetate, ethyl acetoacetate, n-propyl acetoacetate, isopropyl acetoacetate, n-butyl acetoacetate, isobutyl acetoacetate, sec-butyl acetoacetate, tert-butyl acetoacetate, n-pentyl acetoacetate, n-hexyl acetoacetate, 2-ethylhexyl acetoacetate, phenyl acetoacetate, benzyl acetoacetate, and the like. These may be used singly, or in a combination of two or more. Among these, methyl acetoacetate, ethyl acetoacetate, and isopropyl acetoacetate are particularly preferable.

The blocked polyisocyanate compound (b3) may also be a compound obtained by reacting the polyisocyanate compound (b1) having at least two isocyanate groups per molecule with the active methylene compound (b2) and the above-mentioned active hydrogen-containing compound. Specifically, for example, the use Of the active hydrogen-containing compound having a polyoxyalkylene group as the active hydrogen-containing compound allows the active methylene compound (b2) to block some of the isocyanate groups in the polyisocyanate compound (b1) to thereby produce a blocked polyisocyanate compound in which some or all of the other isocyanate groups are reacted with the active hydrogen-containing compound having a polyoxyalkylene group.

The blocked polyisocyanate compound (B) used in the method of the present invention can be obtained, for example, by reacting the blocked polyisocyanate compound (b3) with a secondary alcohol (b4) represented by Formula (VI):

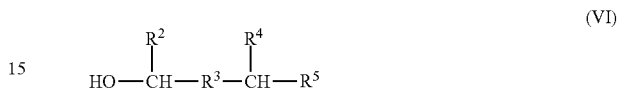

(VI)

wherein $R^2$, $R^4$, and $R^5$ each independently represent $C_{1-12}$ hydrocarbon, and $R^3$ represents $C_{1-12}$ linear or branched alkylene.

Secondary Alcohol (b4)

The secondary alcohol (b4) is a compound represented by Formula (VI). A compound wherein $R^2$ is methyl is particularly preferable to improve the reactivity of the blocked polyisocyanate compound (b3) with the secondary alcohol (b4). If each of $R^3$, $R^4$, and $R^5$ contains many carbon atoms, the resulting blocked polyisocyanate composition may have low polarity, which would result in reduced compatibility with other coating components. Therefore, $R^3$ is preferably $C_{1-3}$ alkylene, and $R^4$ and $R^5$ each preferably represent methyl.

Examples of the secondary alcohol (b4) include 4-methyl-2-pentanol, 5-methyl-2-hexanol, 6-methyl-2-heptanol, and 7-methyl-2-octanol. These may be used singly, or in a combination of two or more. Among these, 4-methyl-2-pentanol having a relatively low boiling point is preferable because the unreacted secondary alcohol (b4) can be relatively easily removed at the time of partial or complete removal of the unreacted secondary alcohol (b4) by distillation after reacting the blocked polyisocyanate compound (b3) with the secondary alcohol (b4).

Specifically, the blocked polyisocyanate compound (B) can be obtained, for example, by reacting the secondary alcohol (b4) with the blocked polyisocyanate compound (b3-1) having a blocked isocyanate group represented by Formula (IV):

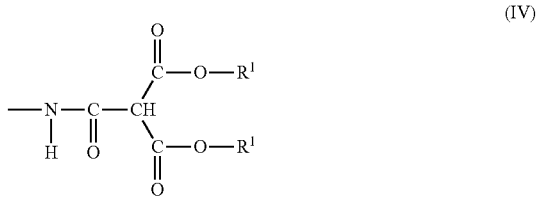

(IV)

wherein each $R^1$ independently represents $C_{1-12}$ hydrocarbon, and may be identical or different. The blocked polyisocyanate compound (b3-1) is described above in the Blocked polyisocyanate compound (b3) section.

In this case, at least one of the $R^1$s in the blocked isocyanate groups in the blocked polyisocyanate compound (b3-1) is replaced with a group represented by Formula (VII):

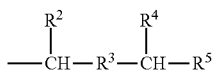
(VII)

wherein $R^2$, $R^4$, and $R^5$ each independently represent $C_{1-12}$ hydrocarbon, and $R^3$ represents $C_{1-12}$ linear or branched alkylene.

In this case, the resulting blocked polyisocyanate compound (B) has a blocked isocyanate group represented by Formula (I):

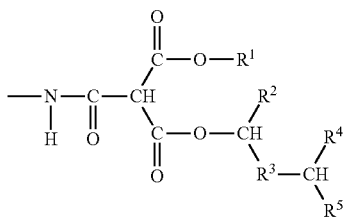
(I)

wherein $R^1$, $R^2$, $R^4$, and $R^5$ each independently represent $C_{1-12}$ hydrocarbon, and $R^3$ represents $C_{1-12}$ linear or branched alkylene, or a blocked isocyanate group represented by Formula (II):

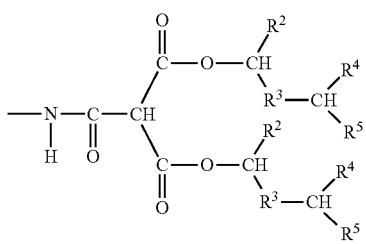
(II)

wherein $R^2$, $R^3$, $R^4$, and $R^5$ are as defined above.

The method of the reaction of the blocked polyisocyanate compound (b3-1) with the second alcohol (b4) is not particularly limited as long as, for example, at least one of the $R^1$s in the blocked isocyanate groups in the blocked polyisocyanate compound (b3-1) can be replaced with a group represented by Formula (VII). It is particularly preferable to use a method of obtaining a blocked polyisocyanate compound (B) having a blocked isocyanate group represented by Formula (I) or (II) by distilling off part or all of the alcohol derived from at least one of the $R^1$s in the blocked polyisocyanate compound (b3-1) from the system by heating, vacuuming, etc., and promoting the reaction.

Specifically, in the production method, it is suitable to remove part or all of the alcohol at a temperature of 20 to 150° C., preferably 75 to 95° C., over a period of 5 minutes to 20 hours, preferably 10 minutes to 10 hours, and optionally under reduced pressure. An excessively low temperature is not preferable because the exchange reaction of the alkoxy group in the blocked polyisocyanate compound (b3-1) having a hydrophilic group may progress slowly and result in reduced production efficiency. An excessively high temperature is also not preferable because severe decomposition/deterioration of the obtained blocked polyisocyanate compound (B) may occur, and result in unsatisfactory curability.

The blocked polyisocyanate compound (B) can be obtained by reacting the secondary alcohol (b4) and the blocked polyisocyanate compound (b3-2) having a blocked isocyanate group represented by Formula (V):

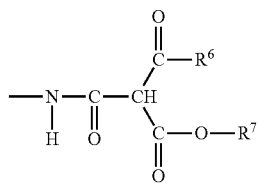
(V)

wherein $R^6$ and $R^7$ each independently represent $C_{1-12}$ hydrocarbon. The blocked polyisocyanate compound (b3-2) is described above in the Blocked polyisocyanate compound (b3) section.

In this case, $R^7$ in the blocked isocyanate group in the blocked polyisocyanate compound (b3-2) is replaced by a group represented by Formula (VII):

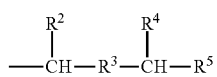
(VII)

wherein $R^2$, $R^4$, and $R^5$ each independently represent $C_{1-12}$ hydrocarbon, and $R^3$ represents $C_{1-12}$ linear or branched alkylene.

In this case, the blocked polyisocyanate compound (B) has a blocked isocyanate group represented by Formula (III):

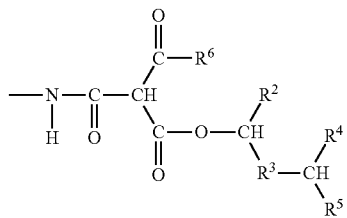
(III)

wherein $R^2$, $R^3$, $R^4$, and $R^5$ are as defined above, and $R^6$ represents $C_{1-12}$ hydrocarbon.

The method of the reaction of the blocked polyisocyanate compound (b3-2) with the secondary alcohol (b4) is not particularly limited, as long as, for example, $R^7$ in the blocked isocyanate group in the blocked polyisocyanate compound (b3-2) can be replaced with a group represented by Formula (VII). It is particularly preferable to use a method of obtaining a blocked polyisocyanate compound (B) having a blocked isocyanate group represented by formula (III) by distilling off part or all of the alcohol derived from $R^7$ in the blocked polyisocyanate compound (b3-2) from the system by heating, vacuuming, etc., and promoting the reaction.

Specifically, in the production method, it is suitable to remove part or all of the alcohol at a temperature of 20 to 150° C., preferably 75 to 95° C., over a period of 5 minutes to 20 hours, preferably 10 minutes to 10 hours, and optionally under reduced pressure. An excessively low temperature is not preferable because the exchange reaction of the alkoxy group in the blocked polyisocyanate compound (b3-2) may progress slowly and result in reduced production efficiency.

An excessively high temperature is also not preferable because severe decomposition/deterioration of the obtained blocked polyisocyanate compound (B) may occur and result in unsatisfactory curability.

From the viewpoint of the reactivity of the resulting blocked polyisocyanate compound (B) and the production efficiency, the amount ratio of the secondary alcohol (b4) to the blocked polyisocyanate compound (b3) in the production of the blocked polyisocyanate compound (B) is preferably such that the amount of the secondary alcohol (b4) is in the range of 5 to 500 parts by mass, more preferably 10 to 200 parts by mass, per 100 parts by mass of the solids content of the blocked polyisocyanate compound (b3). When the amount of the secondary alcohol (b4) is less than 5 parts by mass, the reaction of the blocked polyisocyanate compound (b3) with the secondary alcohol (b4) may progress too slowly. When the amount of the secondary alcohol (b4) is more than 500 parts by mass, the concentration of the resulting blocked polyisocyanate compound (B) may be too low and result in reduced production efficiency.

In the reaction of the blocked polyisocyanate compound (b3) with the secondary alcohol (b4), to control the molecular weight of the blocked polyisocyanate compound (B), the above-mentioned removing operation may be carried out after addition of a polyol compound to the blocked polyisocyanate compound (b3) and the secondary alcohol (b4).

From the viewpoint of the compatibility with other coating components, and the finished appearance, adhesion, and water resistance of the resulting coating film, the blocked polyisocyanate compound (B) preferably has a number average molecular weight of 600 to 30,000. The upper limit of the number average molecular weight is preferably 10,000, and more preferably 5,000, from the viewpoint of the compatibility with other coating components, and the finished appearance of the resulting coating film. The lower limit of the number average molecular weight is preferably 900, and more preferably 1,000, from the viewpoint of the adhesion and water resistance of the resulting coating film.

The blocked polyisocyanate compound (B) may be mixed with a surfactant in advance. In this case, the surfactant is preferably a nonionic surfactant and/or an anionic surfactant, from the viewpoint of the stability of the aqueous coating composition containing the blocked polyisocyanate compound (B).

The blocked polyisocyanate compound (B) that has a hydrophilic group exhibits, in particular, excellent storage stability in water. This is assumed to be because the blocked polyisocyanate compound (B) having a hydrophilic group is relatively stable in water, and also because the hydrocarbon having a branched structure reduces the polarity of the blocked isocyanate group, resisting hydrolysis.

From the viewpoint of the finished appearance, adhesion, water resistance, etc., of the resulting coating film, the aqueous first colored coating composition (X) preferably comprises the blocked polyisocyanate compound (B) in an amount of 5 to 50 mass %, and more preferably 10 to 40 mass %, based on the total solids content of the components (A) and (B).

The aqueous first colored coating composition (X) may further suitably comprise a curing agent (C) other than the blocked polyisocyanate compound (B).

When the aqueous first colored coating composition (X) comprises the curing agent (C), the amount of the blocked polyisocyanate compound (B) is preferably 5 to 45 parts by mass, and more preferably 10 to 35 parts by mass, per 100 parts by mass of the total solids content of the aqueous film-forming resin (A), the specific blocked polyisocyanate compound (B) mentioned above, and the curing agent (C).

Curing Agent (C) Other than Blocked Polyisocyanate Compound (B)

The curing agent (C) other than the blocked polyisocyanate compound (B) (hereinafter sometimes abbreviated as "curing agent (C)") is a compound that can react with crosslinkable functional groups, such as hydroxy, carboxy, and epoxy, in the aqueous film-forming resin (A) to thereby cure the aqueous first colored coating composition (X). Known curing agents may be used as the curing agent (C). Examples include amino resins, polyisocyanate compounds, blocked polyisocyanate compounds other than the component (B), epoxy-containing compounds, carboxy-containing compounds, carbodiimide-containing compounds, and the like. From the viewpoint of the water resistance of the resulting coating film, amino resins and blocked polyisocyanates other than the component (B), which can react with hydroxy, and carbodiimide-containing compounds, which can react with carboxy, are preferable, with amino resins being more preferable.

The curing agent (C) may be used singly, or in a combination of two or more.

Examples of the amino resins include partially or fully methylolated amino resins obtained by reacting amino components with aldehyde components. Examples of the amino components include melamine, urea, benzoguanamine, acetoguanamine, steroguanamine, spiroguanamine, dicyandiamide, and the like. Examples of the aldehyde components include formaldehyde, paraformaldehyde, acetaldehyde, benzaldehyde, and the like.

It is also possible to use methylolated amino resins in which some or all of the methylol groups have been etherified with suitable alcohols. Examples of alcohols that can be used for the etherification include methyl alcohol, ethyl alcohol, n-propyl alcohol, isopropyl alcohol, n-butyl alcohol, isobutyl alcohol, 2-ethyl-1-butanol, 2-ethyl-1-hexanol, and the like.

The amino resin is preferably a melamine resin. In particular, it is preferable to use a methyl-etherified melamine resin obtained by etherifying some or all of the methylol groups of a partially or fully methylolated melamine resin with methyl alcohol; a butyl-etherified melamine resin obtained by etherifying some or all of the methylol groups of a partially or fully methylolated melamine resin with butyl alcohol; and a methyl-butyl-etherified melamine resin obtained by etherifying some or all of the methylol groups of a partially or fully methylolated melamine resin with methyl alcohol and butyl alcohol. A methyl-butyl mixed etherified melamine resin is more preferably used. An imino-containing melamine resin is also preferably used.

The melamine resin preferably has a weight average molecular weight of 400 to 6,000, more preferably 500 to 4,000, and even more preferably 600 to 3,000.

Commercially available melamine resins can be used as the melamine resin. Examples of such commercially available products include "Cymel 202," "Cymel 203," "Cymel 204," "Cymel 211," "Cymel 238," "Cymel 250," "Cymel 303," "Cymel 323," "Cymel 324," "Cymel 325," "Cymel 327," "Cymel 350," "Cymel 385," "Cymel 1156," "Cymel 1158," "Cymel 1116," and "Cymel 1130" (all produced by Nihon Cytec Industries Inc.); and "U-VAN 120," "U-VAN 20HS," "U-VAN 20SE60," "U-VAN 2021," "U-VAN 2028," and "U-VAN 28-60" (all produced by Mitsui Chemicals, Inc.).

When a melamine resin is used as the curing agent, a sulfonic acid, such as p-toluenesulfonic acid, dodecylbenzenesulfonic acid, or dinonylnaphthalene sulfonic acid, salts of these acids with amine compounds, or the like, can be used as a catalyst.

The blocked polyisocyanate compound other than the component (B) above is a compound in which the isocyanate groups in a polyisocyanate compound having at least two isocyanate groups per molecule are blocked with a blocking agent.

Examples of the polyisocyanate compound having at least two isocyanate groups per molecule include aliphatic diisocyanates, such as hexamethylene diisocyanate, trimethylhexamethylene diisocyanate, dimer acid diisocyanate, and lysine diisocyanate; alicyclic diisocyanates, such as hydrogenated xylylene diisocyanate, cyclohexylene diisocyanate, and isophorone diisocyanate; aromatic diisocyanates, such as tolylene diisocyanate, phenylene diisocyanate, 4,4'-diphenylmethane diisocyanate, xylylene diisocyanate, tetramethylxylylene diisocyanate, and naphthalene diisocyanate; trivalent or higher organic polyisocyanate compounds, such as 2-isocyanatoethyl-2,6-diisocyanatocaproate, 3-isocyanatomethyl-1,6-hexamethylene diisocyanate, and 4-isocyanatomethyl-1,8-octamethylene diisocyanate (common name: triaminononane triisocyanate); dimers and trimers of these polyisocyanate compounds (e.g., biurets and isocyanurates); prepolymers obtained by urethanization reactions of these polyisocyanate compounds with polyhydric alcohols, low-molecular-weight polyester resins, or water, under conditions such that isocyanate groups are present in excess; and the like.

Examples of the blocking agents include phenol compounds such as phenol, cresol, xylenol, nitrophenol, ethylphenol, hydroxydiphenyl, butylphenol, isopropylphenol, nonylphenol, octylphenol, and methyl hydroxybenzoate; lactam compounds, such as ε-caprolactam, δ-valerolactam, γ-butyrolactam, and β-propiolactam; aliphatic alcohols, such as methanol, ethanol, propyl alcohol, butyl alcohol, amyl alcohol, and lauryl alcohol; ethers, such as ethylene glycol monomethyl ether, ethylene glycol monoethyl ether, ethylene glycol monobutyl ether, diethylene glycol monomethyl ether, diethylene glycol monoethyl ether, propylene glycol monomethyl ether, and methoxymethanol; alcohols, such as benzyl alcohol, glycolic acid, methyl glycolate, ethyl glycolate, butyl glycolate, lactic acid, methyl lactate, ethyl lactate, butyl lactate, methylol urea, methylol melamine, diacetone alcohol, 2-hydroxyethyl acrylate, and 2-hydroxyethyl methacrylate; oximes, such as formamide oxime, acetamide oxime, acetoxime, methyl ethyl ketoxime, diacetyl monoxime, benzophenone oxime, and cyclohexane oxime; active methylenes, such as dimethyl malonate, diethyl malonate, ethyl acetoacetate, methyl acetoacetate, and acetylacetone; mercaptans, such as butyl mercaptan, tert-butyl mercaptan, hexyl mercaptan, tert-dodecyl mercaptan, 2-mercaptobenzothiazole, thiophenol, methylthiophenol, and ethylthiophenol; acid amides, such as acetanilide, acetanisidide, acetotoluide, acrylamide, methacrylamide, acetic acid amide, stearic acid amide, and benzamide; imides, such as succinimide, phthalimide, and maleimide; amines, such as diphenylamine, phenylnaphthylamine, xylidine, N-phenylxylidine, carbazole, aniline, naphthylamine, butylamine, dibutylamine, and butylphenylamine; imidazoles, such as imidazole and 2-ethylimidazole; ureas, such as urea, thiourea, ethylene urea, ethylenethiourea, and diphenylurea; carbamate esters, such as phenyl N-phenylcarbamate; imines, such as ethyleneimine and propyleneimine; sulfites, such as sodium bisulfite and potassium bisulfite; azole-based compounds; and the like. Examples of the azole-based compounds include pyrazole or pyrazole derivatives, such as pyrazole, 3,5-dimethylpyrazole, 3-methylpyrazole, 4-benzyl-3,5-dimethylpyrazole, 4-nitro-3,5-dimethylpyrazole, 4-bromo-3,5-dimethylpyrazole, and 3-methyl-5-phenylpyrazole; imidazole or imidazole derivatives, such as imidazole, benzimidazole, 2-methylimidazole, 2-ethylimidazole, and 2-phenylimidazole; and imidazoline derivatives, such as 2-methylimidazoline and 2-phenylimidazoline.

Particularly preferable blocking agents are, for example, oxime-based blocking agents, active methylene-based blocking agents other than the component (B), and pyrazole or pyrazole derivatives.

As the blocking agent, it is also possible to use a hydroxycarboxylic acid that has at least one hydroxy group and at least one carboxy group, such as hydroxypivalic acid or dimethylolpropionic acid. In particular, it is preferable to use blocked polyisocyanate compounds that are rendered water-dispersible by blocking their isocyanate groups with the hydroxycarboxylic acid and then neutralizing the carboxy group of the hydroxycarboxylic acid.

As the carbodiimido-containing compound, it is possible to use, for example, those obtained by reacting isocyanate groups of the polyisocyanate compound with each other to remove carbon dioxide. As the carbodiimido-containing compound, commercially available products can also be used. Examples of such commercially available products include "Carbodilite V-02," "Carbodilite V-02-L2," "Carbodilite V-04," "Carbodilite E-01," and "Carbodilite E-02" (trade names, all produced by Nisshinbo).

To improve the water resistance, adhesion, and finished appearance of the resulting coating film, when the aqueous first colored coating composition (X) comprises the curing agent (C), the amount of the curing agent (C) is preferably 1 to 30 parts by mass, more preferably 3 to 25 parts by mass, and still more preferably 5 to 20 parts by mass, per 100 parts by mass of the total solids content of the aqueous film-forming resin (A), the blocked polyisocyanate compound (B), and the curing agent (C). The blocked polyisocyanate compound (B) and the curing agent (C) are sometimes collectively referred to as a "curing agent component."

The aqueous first colored coating composition (X) may usually comprise a pigment (D) as a coloring agent. Examples of the pigment (D) include color pigments, extender pigments, and effect pigments. The pigment (D) may be used singly, or in a combination of two or more.

When the aqueous first colored coating composition (X) comprises the pigment (D), the amount of the pigment (D) can be generally 1 to 200 parts by mass, preferably 10 to 150 parts by mass, and more preferably 20 to 120 parts by mass, per 100 parts by mass of the total amount of the aqueous film-forming resin (A) and the curing agent component in the aqueous first colored coating composition (X).

Examples of the color pigments include titanium dioxide, zinc oxide, carbon black, molybdenum red, Prussian blue, cobalt blue, azo pigments, phthalocyanine pigments, quinacridone pigments, isoindoline pigments, threne pigments, perylene pigments, and the like. Among these, titanium dioxide and carbon black can be preferably used.

When the aqueous first colored coating composition (X) comprises the color pigment, the amount of the color pigment is usually 1 to 120 parts by mass, preferably 3 to 100 parts by mass, and more preferably 5 to 90 parts by mass, per 100 parts by mass of the total amount of the aqueous film-forming resin (A) and the curing agent component in the aqueous first colored coating composition (X).

Examples of the extender pigments include clay, kaolin, barium sulfate, barium carbonate, calcium carbonate, talc, silica, alumina white, and the like. Among these, barium sulfate and/or talc are preferably used.

In particular, it is preferable to use barium sulfate with an average primary particle size of 1 μm or less, and more preferably 0.01 to 0.8 μm as the extender pigment to provide a multilayer coating film with excellent appearance, such as excellent smoothness, and to provide a multilayer coating film with excellent appearance, such as a high flip-flop effect and little metallic mottling when a coating composition comprising an effect pigment is used as an aqueous second colored coating composition (Y) (an aqueous base coating composition).

In the present specification, the average primary particle size of barium sulfate is determined by observing barium sulfate using a scanning electron microscope and averaging the maximum diameter of 20 barium sulfate particles on a straight line drawn at random on the electron microscope photograph.

When the aqueous first colored coating composition (X) comprises the extender pigment, the amount of the extender pigment is usually 1 to 120 parts by mass, preferably 5 to 100 parts by mass, and more preferably 10 to 80 parts by mass, per 100 parts by mass of the total amount of the aqueous film-forming resin (A) and the curing agent component in the aqueous first colored coating composition (X).

Examples of the effect pigments include aluminium (including vapor-deposited aluminum), copper, zinc, brass, nickel, aluminium oxide, mica, titanium oxide- or iron oxide-coated aluminium oxide, titanium oxide- or iron oxide-coated mica, glass flakes, and holographic pigments. These effect pigments may be used singly, or in a combination of two or more. Examples of aluminum pigments include non-leafing aluminum pigments and leafing aluminum pigments. Any of these pigments can be used.

When the aqueous first colored coating composition (X) comprises the effect pigment, the amount of the effect pigment is usually 1 to 50 parts by mass, preferably 2 to 30 parts by mass, and more preferably 3 to 20 parts by mass, per 100 parts by mass of the total amount of the aqueous film-forming resin (A) and the curing agent component in the aqueous first colored coating composition (X).

When the substrate is plastic, it is possible for the aqueous first colored coating composition (X) to comprise an electrically conductive pigment. The electrically conductive pigment is not particularly limited as long as it can impart electrical conductivity to the resulting coating film, and may be in the form of particles, flakes, or fibers (including whiskers). Specific examples include conductive carbon, such as conductive carbon black, carbon nanotube, carbon nanofiber, and carbon microcoil; and powder of metal, such as silver, nickel, copper, graphite, and aluminum. Examples further include antimony-doped tin oxide, phosphorus-doped tin oxide, acicular titanium oxide whose surface is coated with tin oxide/antimony, antimony oxide, zinc antimonate, indium tin oxide, carbon or graphite whiskers whose surface is coated with tin oxide; flaky mica pigments whose surface is coated with at least one conductive metal oxide selected from the group consisting of tin oxide, antimony-doped tin oxide, tin-doped indium oxide (ITO), fluorine-doped tin oxide (FTC), phosphorus-doped tin oxide, and nickel oxide; and conductive pigments of titanium dioxide particles containing tin oxide and phosphorus on their surfaces. These may be used singly, or in a combination of two or more. Of these, conductive carbon is preferably used.

To impart conductivity and to provide a coating film with excellent adhesion, water resistance, etc., the electrically conductive pigment is usually used in an amount of 1 to 300 parts by mass, preferably 2 to 250 parts by mass, and more preferably 3 to 180 parts by mass, per 100 parts by mass of the total amount of the aqueous film-forming resin (A) and the curing agent component in the aqueous first colored coating composition (X). In particular, when conductive carbon is used, the amount is usually 1 to 30 parts by mass, preferably 2 to 25 parts by mass, and more preferably 3 to 25 parts by mass, per 100 parts by mass of the total amount of the aqueous film-forming resin (A) and the curing agent component in the aqueous first colored coating composition (X).

Oligomer (E)

To improve the surface smoothness of the multilayer coating film, the aqueous first colored coating composition (X) may further comprise an oligomer compound (excluding the aqueous film-forming resin (A)) having a water tolerance of 10 or more, preferably 20 or more, and more preferably 50 or more, and a number average molecular weight of 200 to 1,500, preferably 300 to 1,000, and more preferably 400 to 1,000.

Specific examples of the oligomer compound include polyalkylene glycols, such as polyethylene glycol and polypropylene glycol; and etherified products thereof.

Among these, hydroxy-containing oligomers are preferable, and polyoxypropylene glyceryl ether is particularly preferable.

Examples of commercially available products that can be used include GP400, GP600, and GP1000 (all produced by Sanyo Chemical Industries, Ltd.).

In the present invention, the water tolerance of oligomers refers to a value obtained by the following measurement.

The water tolerance of oligomers is determined by the following method. 5.0 g of a sample (oligomer) is introduced into a 200-mL beaker having a diameter of 5 cm, and diluted with 50 mL of acetone. After the temperature of the sample solution is adjusted to 20° C., a newspaper having No. 4 type letters (i.e., 14-point characters) printed thereon is placed under the bottom of the beaker. Deionized water is dripped into the beaker, while stirring with a magnetic stirrer. The maximum amount (mL) of dripped deionized water allowing 14-point characters printed on the newspaper to be legible through the beaker when viewed from above the beaker is defined as the water tolerance.

A higher water tolerance value indicates a higher hydrophilicity of the oligomer.

When the aqueous first colored coating composition (X) comprises the oligomer (E), the amount is preferably 1 to 30 parts by mass, more preferably 2 to 20 parts by mass, and still more preferably 3 to 15 parts by mass, per 100 parts by mass of the total solids content of the aqueous film-forming resin (A) and the curing agent component.

Diester Compound

The aqueous first colored coating composition (X) comprises a diester compound represented by Formula (VIII) below:

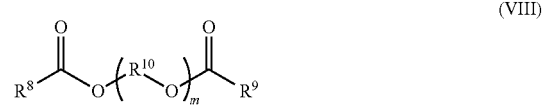

(VIII)

wherein $R^8$ and $R^9$ each independently represent $C_{4-18}$ hydrocarbon, $R^{10}$ represents $C_{2-4}$ alkylene, m is an integer of 3 to 25, and a plurality of $R^{10}$s may be identical or different.

The use of a coating composition comprising the diester compound enables the formation of a coating film having excellent distinctness of image, appearance, and water resistance.

The hydrocarbon is preferably $C_{5-11}$ alkyl, more preferably $C_{5-9}$ alkyl, and still more preferably $C_{6-8}$ alkyl. In particular, when $R_8$ and $R_9$ each independently represent $C_{6-8}$ branched alkyl, it is possible to obtain a coating film having excellent distinctness of image even if the film is formed by using a coating composition that has been stored for a relatively long period of time. $R_{10}$ preferably represents ethylene, and m is preferably an integer of 4 to 10.

The diester compound can be obtained by, for example, an esterification reaction of a polyoxyalkylene glycol having two terminal hydroxy groups with a monocarboxylic acid having a $C_{4-18}$ hydrocarbon group.

The aqueous first colored coating composition (X) may optionally comprise additives for coating compositions, such as thickening agents, curing catalysts, UV absorbers, light stabilizers, antifoaming agents, plasticizers, organic solvents, surface control agents, and antisettling agents.

Examples of the thickening agents include inorganic thickening agents, such as silicates, metal silicates, montmorillonite, and colloidal alumina; polyacrylic acid thickening agents, such as copolymers of (meth)acrylic acids and (meth) acrylic esters, and sodium polyacrylate; associative thickening agents having a hydrophilic moiety and a hydrophobic moiety per molecule and exhibiting a thickening effect by adsorption of the hydrophobic portion onto the surface of the pigment or emulsion particle in the coating composition in an aqueous medium or by association between the hydrophobic portions; cellulose derivative thickening agents such as carboxymethyl cellulose, methyl cellulose, and hydroxyethyl cellulose; protein thickening agents, such as casein, sodium caseinate, and ammonium caseinate; alginate thickening agents, such as sodium alginate; polyvinyl thickening agents, such as polyvinyl alcohol, polyvinylpyrrolidone, and polyvinyl benzyl ether copolymers; polyether thickening agents, such as Pluronic polyethers, polyether dialkyl esters, polyether dialkyl ethers, and polyether epoxy-modified compounds; maleic anhydride copolymer thickening agents, such as partial esters of vinyl methyl ether-maleic anhydride copolymers; and polyamide thickening agents, such as polyamide amine salts. These thickening agents may be used singly, or in a combination of two or more.

As the polyacrylic acid thickening agents, commercially available products can be used. Examples of the commercially available products include "PRIMAL ASE-60," "PRIMAL TT-615," and "PRIMAL RM-5," produced by Rohm and Haas; "SN Thickener 613," "SN Thickener 618," "SN Thickener 630," "SN Thickener 634," and "SN Thickener 636," produced by San Nopco Ltd.; and the like. As the associative thickening agents, commercially available products can be used. Examples of the commercially available products include "UH-420," "UH-450," "UH-462," "UH-472," "UH-540," "UH-752," "UH-756VF," and "UH-814N," produced by ADEKA Co. Ltd.; "PRIMAL RM-8W," "PRIMAL RM-825," "PRIMAL RM-2020NPR," "PRIMAL RM-12W," and "PRIMAL SCT-275," produced by Rohm and Haas; "SN Thickener 612," "SN Thickener 621N," "SN Thickener 625N," "SN Thickener 627N," and "SN Thickener 660T," produced by San Nopco Ltd.; and the like.

The thickening agent is preferably a polyacrylic acid thickening agent and/or an associative thickening agent. It is more preferable to use an associative thickening agent. It is furthermore preferable to use hydrophobic group-terminated urethane associative thickening agents containing a urethane bond in the molecular chain. As the urethane associative thickening agents, commercially available products can be used. Examples of the commercially available products include "UH-420," "UH-462," "UH-472," "UH-540," "UH-752," "UH-756VF," and "UH-814N," produced by ADEKA Co. Ltd.; "SN thickener 612," "SN thickener 621N," "SN thickener 625N," "SN thickener 627N," and "SN thickener 660T," produced by San Nopco Ltd.; and the like.

When the aqueous first colored coating composition (X) comprises the thickener, the amount of the thickener is preferably 0.01 to 10 parts by mass, more preferably, 0.05 to 3 parts by mass, and still more preferably 0.1 to 2 parts by mass, per 100 parts by mass of the total solids content of the aqueous film-forming resin (A) and the curing agent component.

Preparation of Aqueous First Colored Coating Composition (X)

The aqueous first colored coating composition (X) can be prepared by mixing the aqueous film-forming resin (A) and the blocked polyisocyanate compound (B), and optionally a curing agent (C) other than blocked polyisocyanate compound (B), the pigment (D), the oligomer (E), and other additives for coating compositions, and dispersing the resulting mixture in an aqueous medium. As the aqueous medium, deionized water or a mixture of deionized water and a hydrophilic organic solvent can be used. Examples of the hydrophilic organic solvent include propylene glycol monomethyl ether, and the like.

The aqueous first colored coating composition (X) generally has a solids concentration of preferably 20 to 70 mass %, more preferably 30 to 60 mass %, and still more preferably 35 to 60 mass %.

Application of Aqueous First Colored Coating Composition (X)

The method for applying the aqueous first colored coating composition (X) used in the method of the present invention is not particularly limited. For example, air spray coating, airless spray coating, rotary atomization coating, curtain coating, or other coating methods may be used to form a wet coating film. In these coating methods, an electrostatic charge may be applied, if necessary. Of these methods, air spray coating is particularly preferable. The aqueous first colored coating composition (X) is applied to obtain a cured film thickness of generally 5 to 30 μm, and preferably 10 to 25 μm. The aqueous first colored coating composition (X) is applied in this manner to thereby obtain a first colored coating film.

Step (2)

An aqueous second colored coating composition (Y) is applied to the first colored coating film.

Before the aqueous second colored coating composition (Y) is applied, the solids content of the first colored coating film can be adjusted by preheating, air-blowing, or the like. However, the method of the present invention can provide a multilayer coating film having excellent water resistance, excellent adhesion, and excellent finished appearance without preheating after the application of the aqueous first colored coating composition (X). When preheating is not performed, setting is preferably performed at room temperature for about 30 seconds to 5 minutes after the application of the aqueous first colored coating composition (X). This prevents a mixed layer of the first colored coating film and the second colored coating film from being formed.

When performed, the preheating can usually be performed by directly or indirectly heating the coated substrate in a drying furnace at a temperature of about 50 to 110° C., and preferably about 60 to 80° C., for about 1 to 30 minutes.

The air-blowing can usually be performed by blowing ordinary temperature air or air that is heated to about 25 to 80° C. onto the coated surface of the substrate.

The solids content of the first colored coating film can be measured, for example, by the following method.

First, the aqueous first colored coating composition (X) is applied simultaneously to the substrate and to an aluminum foil whose mass ($W_1$) is measured beforehand. Subsequently, the aluminum foil optionally subjected to preheating or like treatment after the application is collected just before the application of the aqueous second colored coating composition (Y) to measure the mass ($W_2$). Subsequently, the collected aluminum foil is dried at 110° C. for 60 minutes and allowed to cool to room temperature in a desiccator, followed by measurement of the mass ($W_3$) of the aluminum foil. The solids content is then calculated using the following equation.

$$\text{Solids content(mass \%)} = \{(W_3 - W_1)/(W_2 - W_1)\} \times 100$$

Aqueous Second Colored Coating Composition (Y)

As the aqueous second colored coating composition (Y) used in the method of the present invention, known coating compositions that are generally used for coating automotive bodies can be used.

The aqueous second colored coating composition (Y) can generally be prepared by mixing a base resin, a crosslinking agent, a pigment, and the like and dispersing the resulting mixture in an aqueous medium.

As the base resin, for example, a resin containing a carboxy group and a hydroxy group is preferably used. Examples of the base resin include acrylic resins, polyester resins, polyether resins, polycarbonate resins, polyurethane resins, and the like.

It is preferable that the carboxy groups in the carboxy- and hydroxy-containing resin be neutralized. The neutralization is preferably performed using a basic compound before the resin is mixed with a crosslinking agent and the like.

Examples of the basic compound usable for neutralization include ammonia; primary monoamines, such as ethylamine, propylamine, butylamine, benzylamine, monoethanolamine, neopentanolamine, 2-aminopropanol, and 3-aminopropanol; secondary monoamines, such as diethylamine, diethanolamine, di-n- or di-iso-propanolamine, N-methylethanolamine, and N-ethylethanolamine; tertiary monoamines, such as N,N-dimethylethanolamine, trimethylamine, triethylamine, triisopropylamine, and methyldiethanolamine; polyamines, such as diethylenetriamine, hydroxyethylaminoethylamine, ethylaminoethylamine, and methylaminopropylamine; and the like. These basic compounds may be used singly, or in a combination of two or more.

In the neutralization, the basic compound is preferably used in an amount of generally 0.1 to 1.5, and particularly 0.3 to 1.2, equivalent relative to the carboxy group contained in the carboxy- and hydroxy-containing resin.

From the viewpoint of the water dispersibility, the base resin preferably has an acid value in the range of generally 10 to 150 mg KOH/g, and particularly in the range of 30 to 100 mg KOH/g. From the viewpoint of the curability, the base resin has a hydroxy value generally in the range of 10 to 150 mg KOH/g, and particularly in the range of 30 to 100 mg KOH/g.

Furthermore, from the viewpoint of the weather resistance and the like, when the base resin is an acrylic resin, it preferably has a number average molecular weight in the range of generally 3,000 to 100,000, and particularly 5,000 to 50,000. When the base resin is a polyester resin, it preferably has a number average molecular weight in the range of generally 500 to 50,000, and particularly in the range of 3,000 to 30,000.

When a carboxy- and hydroxy-containing acrylic resin is used as the base resin, it is also possible to use a carboxy- and hydroxy-containing acrylic resin that is produced by emulsion polymerization in the presence of a dispersion stabilizer.

When an acrylic resin produced by emulsion polymerization is used, it preferably has a number average molecular weight generally in the range of 100,000 or more, and particularly in the range of 200,000 to 2,000,000.

Examples of the dispersion stabilizer preferably usable for emulsion polymerization include nonionic surfactants and anionic surfactants, as well as aqueous resins such as an acrylic resin having an acid value of about 10 to 150 mg KOH/g and a number average molecular weight in the range of about 5,000 to 30,000.

The emulsion polymerization can be performed by a known method.

Among these base resins, an acrylic emulsion obtained by multistage polymerization using a carboxy-containing unsaturated monomer as the copolymerization component is preferable to provide the aqueous second colored coating composition (Y) having excellent coating workability. More specifically, an acrylic emulsion obtained by the following polymerization reaction is preferable. That is, a polymerization reaction is first performed using a monomer mixture having a composition that contains no or a very small amount of a carboxy-containing unsaturated monomer (generally, 3 mass % or less based on the total amount of monomers), followed by a polymerization reaction using a monomer mixture having a composition that contains a carboxy-containing unsaturated monomer (generally, 5 to 30 mass % based on the total amount of monomers). The use of the resulting acrylic emulsion, which exhibits a viscosity developing effect due to the neutralization using a basic compound, can provide an aqueous second colored coating composition (Y) having excellent coating workability, such as anti-sagging.

As the crosslinking agent, at least one crosslinking agent that can react with hydroxy groups is selected from melamine resins, blocked polyisocyanate compounds, and water-dispersible blocked polyisocyanate compounds.

In the aqueous second colored coating composition (Y), the proportion of the base resin is generally 60 to 100 mass %, preferably 65 to 95 mass, and more preferably 70 to 90 mass %, based on the total solids content of the base resin and the crosslinking agent, and the proportion of the crosslinking agent is generally 0 to 40 mass %, preferably 5 to 35 mass %, and more preferably 10 to 30 mass %, based on the total solids content of the base resin and the crosslinking agent.

The pigment is not particularly limited and, for example, inorganic and organic color pigments, extender pigments, and effect pigments are suitably used. Examples of the color pigment include titanium oxide, zinc oxide, carbon black, cadmium red, molybdenum red, chrome yellow, chromium oxide, Prussian blue, cobalt blue, azo pigments, phthalocyanine pigments, quinacridone pigments, isoindoline pigments, threne pigments, perylene pigments, and the like. Specific examples of the extender pigments include talc, clay, kaolin, baryta, barium sulfate, barium carbonate, calcium carbonate, silica, and alumina white. Specific examples of the effect pigments include aluminum powder, mica powder, titanium oxide-coated mica powder, and the like.

The amount of the pigment is preferably in the range of generally 0.1 to 200 mass %, and preferably 1 to 100 mass %, based on the total solids content of the base resin and the crosslinking agent.

The aqueous second colored coating composition (Y) may further optionally contain a curing catalyst, a dispersant, an antisettling agent, a defoaming agent, a thickener, a UV absorber, a light stabilizer, a surface control agent, an antioxidant, and the like.

The aqueous second colored coating composition (Y) has a nonvolatile content of generally preferably 15 to 65 mass % at the time of the application. A coating film of the composition (Y) may be an opaque or transparent solid tone or metallic tone coating film when present alone. In the present specification, an opaque coating film refers to a coating film whose light transmittance for a 20-μm cured coating film of a single coating composition is less than 5%, and a transparent coating film refers to a coating film whose light transmittance for a 20-μm cured coating film is 5% or greater.

The aqueous second colored coating composition (Y) can be applied by air spray coating, airless spray coating, or rotary atomization coating, optionally conducting an electrostatic charge, in such a manner that the film thickness based on the cured coating film becomes generally 5 to 30 μm, and in particular, 10 to 25 μm.

In the method of the present invention, the aqueous second colored coating composition (Y) is applied to the first colored coating film, and subsequently a clear coating composition (Z) is applied thereto. Prior to the application of the clear coating composition (Z), a second colored coating film obtained by applying the aqueous second colored coating composition (Y) may optionally be pre-dried at a temperature of about 50 to 100° C.

This pre-drying process allows the volatile components contained in the second colored coating film to volatilize to some extent.

This pre-drying process dries and solidifies a coating film to some extent. Therefore, when a clear coating composition (Z) is applied to the second colored coating film, even if the solvents, the low-molecular resin components, and other components in the resulting coating film permeate and are dispersed in the second colored coating film, viscosity reduction is prevented in the second colored coating film; further, the reflow of metallic pigments or the like, when used, is prevented, inhibiting the occurrence of metallic mottling, etc.

Step (3)

A clear coating composition (Z) is applied to the thus-obtained aqueous second colored coating film formed of the second colored coating composition (Y).

Clear Coating Composition (Z)

A clear coating composition (Z) contains a hydroxy-containing acrylic resin (K), a polyisocyanate compound (L), and an organometallic catalyst (M) containing a metal compound (M1) and an amidine compound (M2).

Hydroxy-Containing Acrylic Resin (K)

The hydroxy-containing acrylic resin (K) can be prepared by copolymerizing monomer components comprising a hydroxy-containing polymerizable unsaturated monomer (k1) and one or more other polymerizable unsaturated monomers (k2) by an ordinary method.

The hydroxy-containing polymerizable unsaturated monomer (k1) is a compound having one hydroxy group and one polymerizable unsaturated bond per molecule.

Examples of the hydroxy-containing polymerizable unsaturated monomer (k1) include secondary hydroxy-containing polymerizable unsaturated monomers (k1-1) and hydroxy-containing (excluding secondary hydroxy groups) polymerizable unsaturated monomers (k1-2).

Examples of the secondary hydroxy-containing polymerizable unsaturated monomers (k1-1) include polymerizable unsaturated monomers having a secondary hydroxy group whose alkyl group in the ester moiety has 2 to 8, in particular 3 to 6, and still more particularly 3 or 4, carbon atoms, such as 2-hydroxypropyl(meth)acrylate, 2-hydroxybutyl(meth)acrylate, and 3-hydroxybutyl(meth)acrylate; and adducts of (meth)acrylic acid with an epoxy-containing compound, e.g., "Cardura E10" (tradename, produced by Hexion Specialty Chemicals; neodecanoic acid glycidyl ester). Among these, 2-hydroxypropyl(meth)acrylate is particularly preferable.

The monomers (k1-1) may be used singly, or in a combination of two or more.

The hydroxy-containing (excluding secondary hydroxy groups) polymerizable unsaturated monomer (k1-2) is a compound having one hydroxy group (excluding secondary hydroxy groups) and one polymerizable unsaturated bond per molecule.

Examples of the monomer include monoesterified products (excluding those containing a secondary hydroxy group) of (meth)acrylic acid with a dihydric alcohol containing 2 to 10 carbon atoms, such as 2-hydroxyethyl(meth)acrylate, 3-hydroxypropyl(meth)acrylate, and 4-hydroxybutyl(meth)acrylate; modified hydroxy-containing monomers (excluding those containing a secondary hydroxy group) obtained by subjecting ε-caprolactone to a ring-opening polymerization reaction; and the like.

Examples of the modified hydroxy-containing monomer obtained by subjecting ε-caprolactone to a ring-opening polymerization reaction include commercially available products, such as "Placcel FA-1," "Placcel FA-2," "Placcel FA-3," "Placcel FA-4," "Placcel FA-5," "Placcel FM-1," "Placcel FM-2," "Placcel FM-3," "Placcel FM-4," and "Placcel FM-5" (trade names, all produced by Daicel Chemical Industries Co., Ltd.), and the like.

The monomers (k1-2) may be used singly, or in a combination of two or more.

The one or more other polymerizable unsaturated monomers (k2) are monomers other than the hydroxy-containing polymerizable unsaturated monomer (k1). The one or more other polymerizable unsaturated monomers (k2) are compounds having one polymerizable unsaturated bond per molecule. Specific examples are listed in (1) to (7) below.

(1) Acid Group-Containing Polymerizable Unsaturated Monomer

The acid group-containing polymerizable unsaturated monomer is a compound having one acid group and one polymerizable unsaturated bond per molecule. Specific examples of the monomer include carboxy-containing monomers, such as (meth)acrylic acid, crotonic acid, itaconic acid, maleic acid, and maleic anhydride; sulfonic acid-containing monomers, such as vinyl sulfonic acid and sulfoethyl(meth)acrylate; acidic phosphate monomers, such as 2-(meth)acryloyloxyethyl acid phosphate, 2-(meth)acryloyloxypropyl acid phosphate, 2-(meth)acryloyloxy-3-chloropropyl acid phosphate, and 2-methacryloyloxyethylphenyl phosphoric acid; and the like. These monomers may be used singly, or in a combination of two or more. When an acid group-containing polymerizable unsaturated monomer is used, the acrylic resin (A) preferably has an acid value of preferably about 0.5 to 30 mg KOH/g, and particularly preferably about 1 to 20 mg KOH/g.

(2) Esterified Products of Acrylic Acid or Methacrylic Acid with a Monohydric Alcohol Having 1 to 20 Carbon Atoms Specific examples include methyl(meth)acrylate, ethyl(meth)acrylate, propyl(meth)acrylate, butyl acrylate, n-butyl(meth)acrylate, iso-butyl(meth)acrylate, tert-butyl(meth)acrylate, 2-ethylhexyl(meth)acrylate, isooctyl(meth)acrylate, isomyristyl(meth)acrylate, stearyl(meth)acrylate, "Isostearyl Acrylate" (trade name, produced by Osaka Organic Chemical Industry, Ltd.), lauryl(meth)acrylate, tridecyl(meth)acrylate, stearyl(meth)acrylate, tetrahydrofurfuryl(meth)acrylate, cyclohexyl(meth)acrylate, isobornyl(meth)acrylate, and the like.

Of the esterified products of acrylic acid or methacrylic acid with a monohydric alcohol having 1 to 20 carbon atoms, a $C_{6\text{-}20}$ alicyclic hydrocarbon-containing polymerizable unsaturated monomer (k2-1) can be suitably used to improve both finished appearance and coating film curability.

Typical examples of $C_{6-20}$ alicyclic hydrocarbon include cyclohexyl, cyclooctyl, cyclododecyl, isobornyl, adamanthyl, tricyclo decanyl, and the like.

Specific examples of the unsaturated monomer (k2-1) include cycloalkyl(meth)acrylates, such as cyclohexyl(meth) acrylate, 4-methylcyclohexylmethyl(meth)acrylate, 4-ethylcyclohexylmethyl(meth)acrylate, 4-methoxy cyclohexylmethyl(meth)acrylate, tert-butylcyclohexyl(meth)acrylate, cyclooctyl(meth)acrylate, and cyclododecyl(meth)acrylate; polymerizable unsaturated monomers having a bridged alicyclic hydrocarbon group, such as isobornyl(meth)acrylate, tricyclodecanyl(meth)acrylate, adamantyl(meth)acrylate, 3,5-dimethyl adamantyl(meth)acrylate, and 3-tetracyclododecyl(meth)acrylate; and the like.

When the unsaturated monomer (k2-1) is used, the amount of the monomer is preferably 10 to 60 mass %, more preferably 15 to 50 mass %, and even more preferably 20 to 45 mass %, based on the total amount of the monomer components.

(3) Alkoxysilyl Group-Containing Polymerizable Unsaturated Monomers

Specific examples include vinyltrimethoxysilane, vinyltriethoxysilane, acryloxyethyl trimethoxysilane, methacryloxyethyl trimethoxysilane, acryloxypropyl trimethoxysilane, methacryloxypropyl trimethoxysilane, acryloxypropyl triethoxysilane, methacryloxypropyl triethoxysilane, vinyltris(β-methoxyethoxy)silane, and the like. Preferable examples of alkoxysilyl group-containing polymerizable unsaturated monomers include vinyltrimethoxysilane, γ-acryloxyprophyl trimethoxysilane, γ-methacryloxpropyl trimethoxysilane, and the like.

When the alkoxysilane group-containing polymerizable unsaturated monomer is used as a constituent component, crosslinkages may be formed, in addition to the crosslinkages of hydroxy groups and isocyanate groups, by a condensation reaction of alkoxysilane groups and a reaction of alkoxysilane groups and hydroxy groups. It is thereby possible to improve the curability.

When the alkoxysilane group-containing polymerizable unsaturated monomer is included as a constituent component, the amount of the monomer is preferably 1 to 20 mass %, and more preferably 1 to 10 mass %, based on the total amount of the monomer components.

(4) Aromatic-Based Vinyl Monomers

Specific examples include styrene, α-methylstyrene, vinyltoluene, and the like.

When an aromatic-based polymerizable unsaturated monomer is used as a constituent component, the glass transition temperature of the resulting resin is raised and a hydrophobic coating film with a high refractive index can be obtained. This achieves an excellent finished appearance by improving the gloss of the coating film.

When an aromatic-based polymerizable unsaturated monomer is used as a constituent component, the amount thereof is preferably 3 to 40 mass %, and more preferably 5 to 30 mass %, based on the total amount of the monomer components.

(5) Glycidyl Group-Containing Polymerizable Unsaturated Monomers

A glycidyl group-containing polymerizable unsaturated monomer is a compound having one glycidyl group and one polymerizable unsaturated bond per molecule. Specific examples include glycidyl acrylate, glycidyl methacrylate, and the like.

(6) Compounds Containing Nitrogen and a Polymerizable Unsaturated Bond

Examples include acrylamide, methacrylamide, dimethylacrylamide, N,N-dimethylpropylacrylamide, N-butoxymethylacrylamide, N-methylolacrylamide, N-methylolmethacrylamide, diacetone acrylamide, N,N-dimethylaminoethyl(meth)acrylate, vinylpyridine, vinylimidazol, acrylonitrile, methacrylonitrile, and the like.

(7) Other Vinyl Compounds

Examples include vinyl acetate, vinyl propionate, vinyl chloride, vinyl versatates, and the like. Examples of vinyl versatates include commercially available products "VEOVA 9" and "VEOVA 10," produced by Japan Epoxy Resin Co., Ltd., and the like.

As the one or more other polymerizable unsaturated monomers (k2), those listed in (1) to (7) above may be used singly, or in a combination of two or more.

The hydroxy-containing acrylic resin (K) has a weight average molecular weight of preferably about 2,000 to 50,000, and more preferably about 5,000 to 30,000 to attain an excellent finished appearance and curability of the coating film.

The glass transition temperature of the hydroxy-containing acrylic resin (K) is preferably about −10 to 30° C., and more preferably about −5 to 20° C. to improve the finished appearance and curability of the coating film.

To improve the finished appearance and pot life of the coating film, the secondary hydroxy-containing polymerizable unsaturated monomer (k1-1) is preferably contained in an amount of 50 to 100 mass %, and more preferably 80 to 100 mass %, based on the total amount of the hydroxy-containing polymerizable unsaturated monomer (k1) in the hydroxy-containing acrylic resin (K).

The hydroxy-containing acrylic resin (K) has a hydroxy value of 85 to 215 mg KOH/g, preferably 100 to 200 mg KOH/g, and more preferably 120 to 200 mg KOH/g, to improve the curability and finished appearance.

To improve the curability and finished appearance in the cured coating film, the hydroxy-containing polymerizable unsaturated monomer (k1) and the one or more other polymerizable unsaturated monomers (k2) are used in such a manner that the amount of the hydroxy-containing polymerizable unsaturated monomer (k1) is preferably about 20 to 50 mass %, and more preferably about 30 to 45 mass %, and the amount of the one or more other polymerizable unsaturated monomers (k2) is preferably about 50 to 80 mass %, and more preferably about 55 to 70 mass %, based on the total monomer content.

To improve the finished appearance and pot life of the resulting coating film, the amount of the secondary hydroxy-containing polymerizable unsaturated monomer (k1-1) is preferably 10 to 50 mass %, and more preferably 20 to 45 mass %, based on the total amount of the monomers in the hydroxy-containing acrylic resin (K).

The hydroxy-containing acrylic resin (K) has an acid value of preferably about 0.5 to 30 mg KOH/g, and more preferably about 1 to 20 mg KOH/g, to improve the curability of the coating composition.

The hydroxy-containing acrylic resin (K) can be obtained by copolymerizing a monomer mixture of the polymerizable unsaturated monomers (k1) and (k2).

The method for copolymerizing the monomer mixture to obtain a hydroxy-containing acrylic resin (K) is not particularly limited, and known copolymerization methods can be used. Of these, a solution polymerization method, in which polymerization is conducted in an organic solvent in the presence of a polymerization initiator, is preferably used.

Examples of the organic solvent used in the solution polymerization method include toluene, xylene, Swasol 1000 (trade name, produced by Cosmo Oil Co., Ltd., an oil-based high-boiling-point solvent), and like aromatic-based solvents; ethyl acetate, butyl acetate, 3-methoxybutyl acetate, ethylene glycol ethyl ether acetate, propylene glycol methyl ether acetate, and like ester-based solvents; methyl ethyl ketone, methyl isobutyl ketone, methyl amyl ketone, and like ketone-based solvents; propyl propionate, butyl propionate, ethoxyethyl propionate; and the like.

These organic solvents may be used singly, or in a combination of two or more. However, considering the solubility of the acrylic resin, high-boiling-point ester-based solvents or high-boiling-point ketone-based solvents are preferably used. A high-boiling-point aromatic-based solvent may be suitably used in combination.

Examples of the polymerization initiator used for copolymerizing the hydroxy-containing acrylic resin (K) include known radical polymerization initiators, such as 2,2'-azobisisobutyronitrile, benzoyl peroxide, di-t-butyl peroxide, di-t-amyl peroxide, t-butyl peroctoate, 2,2'-azobis(2-methylbutyronitrile), and the like.

The hydroxy-containing acrylic resins (K) may be used singly, or in a combination of two or more.

The clear coating composition (Z) used in the method of the present invention may optionally further comprise resins other than the hydroxy-containing acrylic resin (K). Specific examples thereof include acrylic resins, polyester resins, polyether resins, and polyurethane resins other than the hydroxy-containing acrylic resin (K), and the like. Preferable examples include hydroxy-containing polyester resins and hydroxy-containing polyurethane resins.

The hydroxy-containing polyester resin may be produced by a known method, for example, by an esterification reaction of a polybasic acid and polyhydric alcohol. The polybasic acid is a compound having at least two carboxy groups per molecule. Examples of the polybasic acid include phthalic acid, isophthalic acid, terephthalic acid, succinic acid, adipic acid, azelaic acid, sebacic acid, tetrahydrophthalic acid, hexahydrophthalic acid, maleic acid, fumaric acid, itaconic acid, trimellitic acid, pyromellitic acid, anhydrides thereof, and the like. The polyhydric alcohol is a compound having at least two hydroxy groups per molecule. Examples of the polyhydric alcohol include diols, such as ethylene glycol, propylene glycol, 1,3-propanediol, 1,4-butanediol, 1,5-pentanediol, 1,6-hexanediol, 2,2-diethyl-1,3-propanediol, neopentyl glycol, 1,9-nonanediol, 1,4-cyclohexanediol, hydroxypivalic acid neopentyl glycol ester, 2-butyl-2-ethyl-1,3-propanediol, 3-methyl-1,5-pentanediol, 2,2,4-trimethyl pentanediol, hydrogenation bisphenol A, and the like; trihydric or higher polyol components, such as trimethylolpropane, trimethylolethane, glycerin, pentaerythritol, and the like; and hydroxycarboxylic acids, such as 2,2-dimethylolpropionic acid, 2,2-dimethylolbutanoic acid, 2,2-dimethylolpentanoic acid, 2,2-dimethylolhexanoic acid, 2,2-dimethyloloctanoic acid, and the like.

Alternatively, a monoepoxy compound, such as propylene oxide, butylene oxide or like α-olefin epoxide, or "Cardura E10" (trade name, produced by Japan Epoxy Resin Co., Ltd.; a synthetic highly branched saturated fatty acid glycidyl ester) may be reacted with an acid, and the resulting compound may be introduced into the polyester resin.

Carboxyl groups can be introduced into the polyester resin by, for example, adding an acid anhydride to a hydroxy-containing polyester for half-esterification.

The hydroxy-containing polyester resin has a hydroxy value of preferably 85 to 250 mg KOH/g, and more preferably 100 to 220 mg KOH/g. The hydroxy-containing polyester resin has a weight average molecular weight of preferably 2,500 to 40,000 and more preferably 5,000 to 30,000.

Examples of hydroxy-containing polyurethane resins include hydroxy-containing polyurethane resins that are obtainable by a reaction of a polyol and a polyisocyanate.

Examples of low-molecular weight polyols include ethylene glycol, diethylene glycol, propylene glycol, butylene glycol, hexamethylene glycol and like dihydric alcohols; trimethylolpropane, glycerol, pentaerythritol, and like trihydric alcohols; and the like. Examples of higher molecular weight polyols include polyether polyols, polyester polyols, acrylic polyols, and epoxy polyols; and the like. Examples of polyether polyols include polyethylene glycol, polypropylene glycol, polytetramethylene glycol, and the like. Examples of polyester polyols include polycondensates of the dihydric alcohols described above, dipropylene glycol, 1,4-butanediol, 1,6-hexanediol, neopentyl glycol or like alcohols with a dibasic acid, such as adipic acid, azelaic acid, sebacic acid, or the like; polyols obtained by ring-opening polymerization of a lactone, such as polycaprolactone; polycarbonate diols; and the like. It is also possible to use, for example, carboxy-containing polyols, such as 2,2-dimethylolpropionic acid, 2,2-dimethlolbutanoic acid, and the like.

Examples of polyisocyanates to be reacted with such polyols include aliphatic polyisocyanate, such as hexamethylene diisocyanate, trimethylhexamethylene diisocyanate, dimer acid diisocyanate, lysine diisocyanate, and the like; biuret adducts and isocyanurate ring adducts of such polyisocyanates; alicyclic diisocyanates, such as isophorone diisocyanate, 4,4-methylenebis(cyclohexylisocyanate), methylcyclohexane-2,4- (or -2,6-)diisocyanate, 1,3- (or 1,4-)di(isocyanatomethyl)cyclohexane, 1,4-cyclohexane diisocyanate, 1,3-cyclopentane diisocyanate, 1,2-cyclohexane diisocyanate, and the like; biuret adducts and isocyanurate ring adducts of such polyisocyanates; aromatic diisocyanate, such as xylylene diisocyanate, metaxylylene diisocyanate, tetramethylxylylene diisocyanate, tolylene diisocyanate, 4,4'-diphenylmethane diisocyanate, 1,5-naphthalene diisocyanate, 1,4-naphthalene diisocyanate, 4,4'-toluidine diisocyanate, 4,4'-diphenylether diisocyanate, m- (or p-)phenylene diisocyanate, 4,4'-biphenylene diisocyanate, 3,3'-dimethyl-4,4'-biphenylene diisocyanate, bis(4-isocyanatophenyl)sulfone, isopropylidene bis(4-phenylisocyanate), and the like; biuret adducts and isocyanuric ring adducts of such polyisocyanates; polyisocyanates having at least three isocyanate groups per molecule, such as triphenylmethane-4,4',4"-triisocyanate, 1,3,5-triisocyanatobenzene, 2,4,6-triisocyanatotoluene, 4,4'-dimethyldiphenylmethane-2,2',5,5'-tetraisocyanate, and the like; biuret adducts and isocyanurate ring adducts of such polyisocyanates; and the like.

The hydroxy-containing polyurethane resin has a hydroxy value of preferably 85 to 250 mg KOH/g, and more preferably 100 to 220 mg KOH/g. The hydroxy-containing polyurethane resin has a weight average molecular weight of preferably 2,500 to 40,000 and more preferably 5,000 to 30,000. The hydroxy-containing polyurethane resin has a glass transition temperature of preferably −40° C. to 85° C. and more preferably −30° C. to 80° C.

When a resin other than the above hydroxy-containing acrylic resin (K) (specifically, polyester resin, polyether resin, polyurethane resin, and the like) is used in combination, the amount of the resin other than the hydroxy-containing acrylic resin (K) is preferably 10 to 50 mass %, based on the total solids content of the hydroxy-containing acrylic resin (K).

Polyisocyanate Compound (L)

The polyisocyanate compound (L) is a curing agent of the clear coating composition (Z), and has at least two isocyanate groups per molecule. Examples of the polyisocyanate compound (L) include aliphatic polyisocyanates, alicyclic polyisocyanates, aliphatic-aromatic polyisocyanates, aromatic polyisocyanates, derivatives of these polyisocyanates, and the like.

Examples of aliphatic polyisocyanates include trimethylene diisocyanate, tetramethylene-1,4-diisocyanate, pentamethylene-1,5-diisocyanate, hexamethylene diisocyanate, 1,2-propylene diisocyanate, 1,2-butylene diisocyanate, 2,3-butylene diisocyanate, 1,3-butylene diisocyanate, 2,2,4-trimethylhexamethylene-1,6-diisocyanate, 2,6-diisocyanatomethylcaproate, lysine diisocyanate, and like aliphatic diisocyanates; lysine ester triisocyanate, 1,4,8-triisocyanato octane, 1,6,11-triisocyanato undecane, 1,8-diisocyanato-4-isocyanato methyloctane, 1,3,6-triisocyanato hexane, 2,5,7-trimethyl-1,8-diisocyanate-5-isocyanato methyloctane, and like aliphatic triisocyanates; and the like.

Examples of alicyclic polyisocyanates include 1,3-cyclopentene diisocyanate, 1,4-cyclohexane diisocyanate, 1,3-cyclohexane diisocyanate, 3-isocyanatomethyl-3,5,5-trimethylcyclohexyl isocyanate (common name: isophorone diisocyanate), 4,4'-methylenebis(cyclohexylisocyanate), methyl-2,4-cyclohexane diisocyanate, methyl-2,6-cyclohexane diisocyanate, 1,3- or 1,4-bis(isocyanatomethyl)cyclohexane (common name: hydrogenated xylylene diisocyanate) or a mixture thereof, norbornane diisocyanate and like alicyclic diisocyanates, for example, 1,3,5-triisocyanato cyclohexane, 1,3,5-trimethylisocyanato cyclohexane, 2-(3-isocyanatopropyl)-2,5-di(isocyanatomethyl)-bicyclo[2.2.1]heptane, 2-(3-isocyanatopropyl)-2,6-di(isocyanatomethyl)-bicyclo[2.2.1]heptane, 3-(3-isocyanatopropyl)-2,5-di(isocyanatomethyl)-bicyclo[2.2.1]heptane, 5-(2-isocyanatoethyl)-2-isocyanatomethyl-3-(3-isocyanatopropyl)-bicyclo[2.2.1]heptane, 6-(2-isocyanatoethyl)-2-isocyanatomethyl-3-(3-isocyanatopropyl)-bicyclo[2.2.1]heptane, 5-(2-isocyanatoethyl)-2-isocyanatomethyl-2-(3-isocyanatopropyl)-bicyclo[2.2.1]heptane, 6-(2-isocyanatoethyl)-2-isocyanatomethyl-2-(3-isocyanatopropyl)-bicyclo[2.2.1]heptane and like alicyclic triisocyanates; and the like.

Examples of aliphatic-aromatic polyisocyanates include 1,3- or 1,4-xylylene diisocyanate or a mixture thereof, ω,ω'-diisocyanato-1,4-diethylbenzene, 1,3- or 1,4-bis(1-isocyanato-1-methylethyl)benzene (common name: tetramethylxylylene diisocyanate) or a mixture thereof, and like aliphatic-aromatic diisocyanates; and 1,3,5-triisocyanate methylbenzene and like aliphatic-aromatic triisocyanates; and the like.

Examples of aromatic polyisocyanates include m-phenylene diisocyanate, p-phenylene diisocyanate, 4,4'-diphenyl diisocyanate, 1,5-naphthalene diisocyanate, 2,4'- or 4,4'-diphenylmethane diisocyanate, or a mixture thereof, 2,4- or 2,6-tolylene diisocyanate, or a mixture thereof, 4,4'-toluidine diisocyanate, 4,4'-diphenylether diisocyanate and like aromatic diisocyanates, for example, triphenylmethane-4,4',4'''-triisocyanate, 1,3,5-triisocyanato benzene, 2,4,6-triisocyanato toluene and like aromatic triisocyanates, for example, 4,4'-diphenylmethane-2,2',5,5'-tetraisocyanate and like aromatic tetraisocyanates, and the like.

Examples of polyisocyanate derivatives include dimers, trimers, biurets, allophanates, carbodiimides, urethodiones, urethoimines, isocyanurates, oxadiazine triones, polymethylene polyphenyl polyisocyanates (crude MDI, polymeric MDI), crude TDI, and the like, of the above-mentioned polyisocyanate compounds.

Of these, hexamethylene diisocyanate (hereinbelow sometimes referred to as HMDI), isophorone diisocyanate (hereinbelow sometimes referred to as IPDI), and derivatives thereof are particularly preferably used because they are industrially readily available.

These polyisocyanate compounds may be used singly, or in a combination of two or more.

To improve the curability and finished appearance of the resulting coating film, the viscosity of the polyisocyanate compound (L) at 25° C. is preferably 200 to 4,000 mPa·s, more preferably 250 to 3,000 mPa·s, and still more preferably 300 to 2,000 mPa·s. When the viscosity is less than 200 mPa·s, the curability of the clear coating film, and further, the curability of the multilayer coating film, can be insufficient. When the viscosity exceeds 4,000 mPa·s, the finished appearance of the obtained multilayer coating film can be insufficient.

As the polyisocyanate compound (L), it is preferable to use those containing a dimer or higher multimer diisocyanate compound to improve the finished appearance and curability under low-temperature, short-time conditions.

When the polyisocyanate compound (L) contains a dimer or higher multimer as mentioned above, the amount of isocyanurate trimer is preferably 30 to 70 mass %, more preferably 40 to 70 mass %, and even more preferably 50 to 70 mass %; the amount of a urethodione dimer is preferably 3 to 30 mass %, more preferably 5 to 25 mass %, and even more preferably 8 to 20 mass %; and the amount of other trimers or higher multimers is preferably 0 to 67 mass %, more preferably 5 to 55 mass %, and even more preferably 10 to 42 mass %, based on the total amount of the polyisocyanate compound.

The isocyanurate trimer is a polyisocyanate having an isocyanurate group and comprising three diisocyanate monomers, and the urethodione dimer is a polyisocyanate having a urethodione group and comprising two diisocyanate monomers.

The polyisocyanate compound is preferably free from unreacted diisocyanate monomers. The concentration of the remaining diisocyanate monomer is preferably 1 mass % or less, and more preferably 0.5 mass % or less.

Organometallic Catalyst (M)

The organometallic catalyst (M) contains a metal compound (M1) and an amidine compound (M2).

The combined use of a metal compound (M1) and an amidine compound (M2) contributes to excellent curability under low-temperature, short-time conditions and to the excellent finished appearance of the resulting coating film, and makes it possible to sufficiently maintain the pot life as a two-liquid-type coating composition.

The reason for this is considered to be as follows. The catalyst comprising a metal compound (M1) and an amidine compound (M2) forms a complex structure, and the amidine compound serves as a blocking agent. The amidine compound as a blocking agent is dissociated at a low temperature. After dissociation of the amidine compound, the catalytic performance with excellent low-temperature curability inherent in the metal compound is activated. The clear coating composition (Z) can thereby achieve both satisfactory pot life and satisfactory curability under low-temperature, short-time conditions.

The metal compound (M1) contains one or more metals selected from the group consisting of zinc, tin, zirconium, bismuth, lead, cobalt, manganese, titanium, aluminum, and molybdenum. Examples of the metal compound include carboxylic acid metal salt compounds, acetylacetone metal complexes, and the like. In particular, carboxylic acid metal salt compounds can be preferably used.

Specific examples of carboxylic acid metal salt compounds include compounds represented by the following formula (IX):

$$(RCO_2)_nM \qquad (IX)$$

wherein M is a metal selected from the group consisting of Zn, Sn, Zr, Bi, Pb, Co, Mn, Ti, Al, and Mo; R represents $C_{1-30}$ alkyl, $C_{1-30}$ aralkyl or alkylaryl; and n is an integer having a value of 1 or more and 4 or less.

Specific examples include 2-ethylhexanoic acid metal salts, acetic acid metal salts, naphthenic acid metal salts, octanoic acid metal salts, stearic acid metal salts, neodecanoic acid metal salts, oleic acid metal salts, and the like.

It is preferable to use manganese octylate, tin octylate, cobalt octylate, titanium octylate, aluminum octylate, zinc octylate, zirconium octylate, bismuth octylate, or lead octylate, because they have excellent catalytic activity and are industrially readily available.

The amidine compound (M2) is an organic compound having a structure represented by $R^{11}$—C(=$NR^{12}$)—$NR^{13}R^{14}$. In this structure, the carbon (C) atom is bonded to one nitrogen atom via a double bond and to another nitrogen atom via a single bond.

In the structural formula (X): $R^{11}$—C(=$NR^{12}$)—$NR^{13}R^{14}$..., $R^{11}$ represents hydrogen, an optionally substituted organic group attached to carbon, or an optionally substituted amine group; specifically, an optionally substituted hydrocarbyl group or an optionally etherified hydroxy group.

$R^{12}$ and $R^{13}$ each independently represent hydrogen or an organic group attached to carbon, or are bonded to each other to form a heterocyclic ring (a heterocyclic ring with one or more heteroatoms or a fused bicyclic ring with one or more heteroatoms).

$R^{14}$ represents hydrogen, an optionally substituted organic group attached to carbon, or an optionally substituted and optionally etherified hydroxy group; preferably an optionally substituted hydrocarbyl group having 8 or more carbon atoms.

When $R^{11}$ or $R^{14}$ represent an organic group, it may be an organic group having 1 to 40 carbon atoms or a polymer group having a molecular weight of, for example, 500 to 50,000.

The groups represented by $R^{11}$, $R^{12}$, $R^{13}$, and $R^{14}$ may each independently contain an alcoholic hydroxy group as a substituent.

Specific examples of amidine compounds represented by the structural formula (X): $R^{11}$—C(=$NR^{12}$)—$NR^{13}R^{14}$..., wherein $R^{12}$ and $R^{13}$ are not bonded to each other, include N'-cyclohexyl-N,N-dimethylformamidine, N'-methyl-N,N-di-n-butylacetamidine, N'-octadecyl-N,N-dimethylformamidine, N'-cyclohexyl-N,N-dimethylvaleramidine, 1-methyl-2-cyclohexyliminopyrrolidine, 3-butyl-3,4,5,6-tetrahydropyrimidine, N-(hexyliminomethyl)morpholine, N-(α-(decyliminoethyl)ethyl)pyrrolidine, N'-decyl-N,N-dimethylformamidine, N'-dodecyl-N,N-dimethylformamidine, N'-cyclohexyl-N,N-acetamidine, and the like.

Examples of the amidine compound (M2) also include amidine compounds having a structure in which $R^{12}$-$R^{13}$, taken together with the two nitrogen atoms in the amidine structure, form a 5- to 7-membered ring, and in which either $R^{11}$-$R^{13}$ or $R^{11}$-$R^{14}$, taken together with one nitrogen atom and a plurality of carbon atoms in the amidine structure, form a 5- to 9-membered ring.

Specific examples of amidine compounds having such a structure include 1,5-diazabicyclo[4.3.0]non-5-ene, 1,8-diazabicyclo[5.4.0]undec-7-ene, 1,4-diazabicyclo[3.3.0]oct-4-ene, 2-methyl-1,5-diazabicyclo[4.3.0]non-5-ene, 2,7,8-trimethyl-1,5-diazabicyclo[4.3.0]non-5-ene, 2-butyl-1,5-diazabicyclo[4.3.0]non-5-ene, 1,9-diazabicyclo[6.5.0]tridec-8-ene, and the like.

Other examples of the amidine compounds include a heterocyclic compound in which $R^{12}$ and $R^{13}$ of the structural formula (X): $R^{11}$—C(=$NR^{12}$)—$NR^{13}R^{14}$..., are bonded to each other. Examples of this compound include imidazoline, imidazole, tetrahydropyrimidine, dihydropyrimidine, and pyrimidine ring-containing compounds.

An imidazole compound is generally represented by Formula (XI) below:

(XI)

In this formula, $R^{15}$, $R^{16}$, $R^{17}$, and $R^{18}$ each independently represent hydrogen, alkyl, substituted alkyl, hydroxyalkyl, allyl, aralkyl, cycloalkyl, a heterocyclic ring, ether, thioether, halogen, —N(R)$_2$, polyethylene polyamine, nitro, keto, ester, carbonamide, or these functional groups substituted with alkyl.

Specific examples of imidazole compounds include N-(2-hydroxyethyl) imidazole, N-(3-aminopropyl)imidazole, 4-(hydroxymethyl)imidazole, 1-(tert-butoxycarbonyl)imidazole, imidazole-4-propionic acid, 4-carboxyimidazole, 1-butylimidazole, 1-methylimidazole, 2-methyl-4-imidazolecarboxylic acid, 4-formylimidazole, 1-(ethoxycarbonyl) imidazole, reaction product of propylene oxide with imidazole and 2-methylimidazole, (1-trimethylsilyl imidazole, 4-(hydroxymethyl)imidazole hydrochloride, copolymer of 1-chloro-2,3-epoxypropane and imidazole, 1-(p-toluenesulfonyl)imidazole, 1,1-carbonylbisimidazole, 1-(2-cyanoethyl)-2-ethyl-4-methylimidazole, 2-phenyl-2-imidazoline pyromellitate, 4-(hydroxymethyl)imidazole picrate, disodium salt of 2-propenoic acid with 4,5-dihydro-2-nonyl-1H-imidazole-1-ethanol and 2-heptyl-4,5-dihydro-1H-imidazole-1-ethanol, 1-(cyanoethyl)-2-undecylimidazole trimellitate, 1-(2-hydroxypropyl)imidazole formate, sodium imidazolate, silver imidazolate, and the like.

These amidine compounds may be used singly, or in a combination of two or more.

More specifically, in the clear coating composition (Z), the organometallic catalyst (M) is a metal complex, and the complex can be produced, for example, by heating 1 mol of a carboxylic acid metal salt and 2 mol of an amidine compound in a solvent, such as methanol.

In this production, the mixture is maintained at about 50° C. for about 2 hours until it becomes a transparent solution, thereby forming a metal complex. The transparent solution is filtered and dried.

The molar ratio of the amidine compound (M2) to the metal compound (M1) (the ratio of the mole number of (M2)/the mole number of (M1)) is preferably 1.3 to 8.0, more preferably 1.6 to 5.0, and even more preferably 1.8 to 4.0.

When the molar ratio is outside the range of 1.3 to 8.0, any of the curability under low-temperature, short-time conditions, the pot life, and the finished appearance can be insufficient.

From the viewpoint of the curability under low-temperature, short-time conditions, pot life, and finished appearance, the amount of the component (M) is preferably 0.05 to 5 mass %, more preferably 0.1 to 4 mass %, and even more preferably 0.3 to 3 mass %, based on the total mass of the components (K) and (L).

When the amount of the component (M) is less than 0.05 mass %, curability under low-temperature, short-time conditions can be insufficient. When the amount exceeds 5 mass %, the finished appearance of the resulting clear coating film and multilayer coating film can be unsatisfactory.

The organometallic catalyst (M) may be used after being dissolved in a solvent. Examples of solvents include, but are not limited to, alcohols, such as ethylene glycol, diethylene glycol, dipropylene glycol, propylene glycol, and butanediol; hydrocarbons, such as toluene, xylene, mineral turpentine, and mineral spirit; esters, such as ethyl acetate, butyl acetate, methyl glycol acetate, and cellosolve acetate; ketones, such as methyl ethyl ketone, methyl isobutyl ketone, and cyclohexanone; glycol ethers, such as 3-ethoxyethyl propionate and 3-methoxybutyl acetate; organic solvents of amides, such as N,N-dimethylformamide and N,N-dimethylacetamide; β-diketones, such as acetylacetone and its fluorine-substituted derivatives; ketoesters, such as methyl acetoacetate and ethyl acetoacetate; and other solvents.

The clear coating composition (Z) may optionally further comprise a catalyst other than the organometallic catalyst (M), in addition to the organometallic catalyst (M).

Catalysts other than the organometallic catalyst (M) are not particularly limited, as long as they are organic metals that are known as catalysts for producing polyurethane. Specific examples thereof include organic tin catalysts, such as stannous diacetate, stannous dioctoate, stannous dioleate, stannous dilaurate, dibutyltin oxide, dibutyltin diacetate, dibutyltin dilaurate, dibutyltin dichloride, and dioctyltin dilaurate.

Among these, stannous dioctoate and dibutyltin dilaurate are preferred.

From the viewpoint of curability under low-temperature, short-time conditions and the finished appearance of the resulting coating film, as well as the water resistance, acid resistance, etc., of the cured coating film, the equivalent ratio of the isocyanate groups in the polyisocyanate compound (L) to the hydroxy groups in the hydroxy-containing acrylic resin (K) (NCO/OH) in the clear coating composition (Z) is 0.8 to 1.8, preferably 0.8 to 1.6, and more preferably 0.8 to 1.4.

To improve the finished appearance of the resulting clear coating film and multilayer coating film, the glass transition temperature (Tg) of the clear coating film formed from the clear coating composition (Z) is preferably about 80 to 120° C., and more preferably about 90 to 110° C.

In this specification, the glass transition temperature (Tg) of a coating film is a value of the cured coating film determined by dynamic viscoelasticity measurement.

The dynamic viscoelasticity measurement was performed at a temperature increase rate of 3° C./min in a temperature range of 20 to 200° C. at a frequency of 11 Hz. In this measurement, the glass transition temperature (Tg: ° C.) of a coating film is a temperature at which tan δ is the maximum value. The dynamic viscoelasticity measuring device used was an FT Rheospectra DVE-V4 (trade name of a dynamic viscoelasticity measuring device, produced by Rheology Co. Ltd.).

Other Components

The clear coating composition (Z) comprises a hydroxy-containing acrylic resin (K), a polyisocyanate compound (L), and an organometallic catalyst (M) as essential components. The clear coating composition (Z) generally contains an organic solvent, and may optionally further contain pigments, pigment dispersants, leveling agents, rheology control agents, ultraviolet absorbers, light stabilizers, plasticizers, and other coating composition additives generally used in the field of coating compositions.

Any pigment can be used without limitation. Examples thereof include coloring pigments, such as titanium oxide, zinc white, carbon black, cadmium red, molybdenum red, chrome yellow, chromium oxide, Prussian blue, cobalt blue, azo pigments, phthalocyanine pigments, quinacridone pigments, isoindoline pigments, threne pigments, and perylene pigments; extender pigments, such as talc, clay, kaolin, baryta, barium sulfate, barium carbonate, calcium carbonate, silica, and alumina white; metallic pigments, such as aluminum powder, mica powder, and titanium oxide-coated mica powder; and the like.

These pigments may be used singly, or in a combination of two or more. The amount of the pigment varies depending on the type of pigment, but is generally 0 to 200 mass, and preferably about 1 to 100 mass %, based on the total solids content of the components (K), (L), and (M).

The amount of the coloring pigment varies depending on the type of coloring pigment, but is generally 0 to 150 mass %, and preferably about 1 to 100 mass %, based on the total solids content of the components (K), (L), and (M).

The pigment is preferably used in an amount that does not impair the transparency of the coating film obtained from the clear coating composition (Z).

A known ultraviolet absorber may be used. Examples thereof include benzotriazole absorbers, triazine absorbers, salicylic acid derivative absorbers, benzophenone absorbers, and other ultraviolet absorbers.

The amount of the ultraviolet absorber contained in the clear coating composition (Z) is generally 0 to 10 mass %, preferably 0.2 to 5 mass %, and more preferably 0.3 to 2 mass %, based on the total resin solids content, from the viewpoint of weather resistance and yellowing resistance.

A known light stabilizer may be used. For example, a hindered amine light stabilizer may be used.

The amount of the light stabilizer contained in the clear coating composition (Z) is generally 0 to 10 mass %, preferably 0.2 to 5 mass %, and more preferably 0.3 to 2 mass %, based on the total resin solids content, from the viewpoint of weather resistance and yellowing resistance.

From the viewpoint of the storage stability, the clear coating composition (Z) is preferably in the form of a two-liquid-type coating composition in which the hydroxy-containing acrylic resin (K) and the organometallic catalyst (M) are separated from the polyisocyanate compound (L). It is preferable to mix both components immediately before use.

Method of Applying Clear Coating Composition (Z)

The method of applying the clear coating composition (Z) is not particularly limited. For example, air spray coating, airless spray coating, rotary atomization coating, curtain coating, or other coating method may be used to form a wet coating film. In these coating methods, an electrostatic charge may be applied, if necessary. Of these methods, air spray coating is particularly preferred. The clear coating composition (Z) is generally applied to a cured film thickness of about 10 to 50 μm, and preferably about 20 to 40 μm.

When air spray coating, airless spray coating, or rotary atomization coating is performed, it is preferable for the viscosity of the clear coating composition (Z) to be appropriately adjusted to a range that is suitable for coating by using a solvent, such as an organic solvent. The viscosity range is generally from about 15 to 60 seconds at 20° C. as measured by a Ford Cup No. 4 viscometer.

Step (4)

The three layers, i.e., the first colored coating film, the second colored coating film, and the clear coating film, of the thus-formed multilayer coating film can be simultaneously cured by a usual coating-film-baking method, such as hot-air heating, infrared heating, or high-frequency heating.

The heating retention temperature (keeping temperature) is preferably 60 to 120° C., more preferably 70 to 110° C., and even more preferably 80 to 100° C., because the present method is capable of achieving excellent curability at low temperatures. The heating retention time (keeping time) is preferably 5 to 15 minutes, more preferably 5 to 12 minutes, and even more preferably 5 to 10 minutes, because the present method is capable of achieving excellent curability under short-time conditions.

Before the bake-curing, preheating may optionally be performed at about 50 to 100° C.

The method of the present invention is capable of achieving excellent curability under low-temperature, short-time conditions, and forming a multilayer coating film having excellent water resistance, excellent adhesion, and an excellent finished appearance.

The method of the present invention can be suitably used as a method for forming a multilayer coating film for general industrial products. In particular, the method of the present invention can be suitably used as a method for forming a multilayer coating film for automobiles.

It is not certain why the method of the present invention can achieve excellent curability under low-temperature, short-time conditions, and can form a multilayer coating film having excellent water resistance, adhesion, and finished appearance. The reasons are assumed to be as follows: In the method of the present invention, the aqueous first colored coating composition comprises a specific blocked polyisocyanate. The blocking groups of the blocked polyisocyanate are eliminated at low temperatures and in a short time to initiate the curing. In this manner, the method of the present invention achieves excellent curability under low-temperature, short-time conditions. This excellent curability increases the crosslinking density of the coating film; thus the film has excellent water resistance and adhesion. Further, the excellent curability provides the first colored coating film with a viscosity developing effect, preventing the formation of a mixed layer of the first colored coating film and the second colored coating film. The resulting multilayer coating film thus has an excellent finished appearance without being deteriorated by the mixed layer.

Further, as a catalyst for a crosslinking reaction between a hydroxy-containing resin and a polyisocyanate compound, the clear coating composition comprises an organometallic catalyst containing a specific metal compound and an amidine compound. It is thereby possible to achieve excellent curability under low-temperature, short-time conditions, as well as satisfactory pot life.

Specifically, the organometallic catalyst presumably has a complex structure in which the amidine compound is coordinated to the metal compound. In this manner, the amidine compound causes steric hindrance; thus, the organometallic catalyst that has a structure in which the amidine compound is coordinated shows a reduced catalytic activity for urethanization reaction, which metal compounds (metal ions) inherently possess, achieving excellent pot life.

Meanwhile, the amidine compound dissociates at a relatively low temperature. The coordinated amidine compound is thus presumably eliminated at a relatively low dissociation temperature, regenerating the metal compound, and due to the catalytic activity for urethanization reaction, which metal compounds (metal ions) inherently possess, a coating composition that shows excellent curability under low-temperature, short-time conditions is obtained.

It is presumed that these facts synergetically act to achieve excellent curability under low-temperature, short-time conditions, and excellent water resistance, adhesion, and finished appearance of the multilayer coating film.

EXAMPLES

The present invention is described in more detail below with reference to Examples and Comparative Examples. However, the present invention is not limited to the following Examples. In the following Examples, "part(s)" and "%" are based on mass, and the film thickness of coating film is based on the cured coating film.

Production of Aqueous First Colored Coating Composition (X)

Production of Hydroxy-Containing Acrylic Resin (A1)

Production Example 1

35 parts of propylene glycol monopropyl ether was placed in a reactor equipped with a thermometer, a thermostat, a stirrer, a reflux condenser, a nitrogen inlet tube, and a dropping funnel, and heated to 85° C. Subsequently, a mixture of 30 parts of methyl methacrylate, 20 parts of 2-ethylhexyl acrylate, 29 parts of n-butyl acrylate, 15 parts of 2-hydroxyethyl acrylate, 6 parts of acrylic acid, 15 parts of propylene glycol monopropyl ether, and 2.3 parts of 2,2'-azobis(2,4-dimethylvaleronitrile) was added dropwise thereto over a period of 4 hours. After completion of the dropwise addition, the mixture was aged for 1 hour. Subsequently, a mixture of 10 parts of propylene glycol monopropyl ether and 1 part of 2,2'-azobis(2,4-dimethylvaleronitrile) was further added dropwise thereto over a period of 1 hour. After completion of the dropwise addition, the mixture was aged for 1 hour. To the resulting mixture, 7.4 parts of diethanolamine was further added to obtain a hydroxy-containing acrylic resin solution (A1-1) having a solids content of 55%. The obtained hydroxy-containing acrylic resin had an acid value of 47 mg KOH/g, and a hydroxy value of 72 mg KOH/g.

Production Example 2

130 parts of deionized water and 0.52 parts of "Aqualon KH-10" were placed in a reactor equipped with a thermometer, a thermostat, a stirrer, a reflux condenser, a nitrogen inlet tube, and a dropping funnel. The mixture was mixed by stirring in a nitrogen stream and heated to 80° C. Subsequently, 1% of the total amount of the monomer emulsion (1) described below and 5.3 parts of 6% ammonium persulfate solution were introduced into the reactor, which was maintained at 80° C. for 15 minutes. The remaining monomer emulsion (1) was then added dropwise to the reactor over a period of 3 hours while the temperature of the reactor was maintained. After completion of the dropwise addition, the mixture was aged for 1 hour. Then, the monomer emulsion (2) described below was added dropwise over a period of 1 hour and aged for 1 hour. Thereafter, while 40 parts of a 5% aqueous dimethylethanolamine solution was gradually added to the reactor, the mixture was cooled to 30° C., and filtered through a 100-mesh nylon cloth to provide a hydroxy-containing acrylic resin (A1-2) dispersion having an average particle size of 100 nm (diluted with deionized water and measured at 20° C. with a "COULTER Model N4" submicron particle size distribution analyzer (produced by Beckman Coulter, Inc.)), and a solids concentration of 30%. The obtained acrylic resin had an acid value of 33 mg KOH/g, and a hydroxy value of 25 mg KOH/g.

Monomer emulsion (1): 42 parts of deionized water, 0.72 parts of "Aqualon KH-10," 2.1 parts of methylenebisacrylamide, 2.8 parts of styrene, 16.1 parts of methyl methacrylate, 28 parts of ethyl acrylate, and 21 parts of n-butyl acrylate were mixed by stirring to provide a monomer emulsion (1).

Monomer emulsion (2): 18 parts of deionized water, 0.31 parts of "Aqualon KH-10," 0.03 parts of ammonium persulfate, 5.1 parts of methacrylic acid, 5.1 parts of 2-hydroxyethyl acrylate, 3 parts of styrene, 6 parts of methyl methacrylate, 1.8 parts of ethyl acrylate, and 9 parts of n-butyl acrylate were mixed by stirring to provide a monomer emulsion (2).

Production Example 3

130 parts of deionized water and 0.52 parts of "Aqualon KH-10" were placed in a reactor equipped with a thermometer, a thermostat, a stirrer, a reflux condenser, a nitrogen inlet tube, and a dropping funnel. The mixture was mixed by stirring in a nitrogen stream and heated to 80° C. Subsequently, 3% of the total amount of the monomer emulsion (3) described below and 5.3 parts of a 6% aqueous ammonium persulfate solution were introduced into the reactor, which was maintained at 80° C. for 15 minutes. The remaining monomer emulsion (3) was then added dropwise over a period of 3 hours to the reactor while the temperature of the reactor was maintained. After completion of the dropwise addition, the mixture was aged for 1 hour. Then, while 0.3 parts of a 5% dimethylethanolamine aqueous solution was gradually added to the reactor, the mixture was cooled to 30° C., and filtered through a 100-mesh nylon cloth to provide a hydroxy-containing acrylic resin (A1-3) dispersion having an average particle size of 140 nm (diluted with deionized water and measured at 20° C. with a "COULTER Model N4" submicron particle size distribution analyzer (produced by Beckman Coulter, Inc.)), and a solids concentration of 30%. The obtained acrylic resin had an acid value of 12 mg KOH/g, and a hydroxy value of 12 mg KOH/g.

Monomer emulsion (3): 42 parts of deionized water, 0.72 parts of "Aqualon KH-10," 2.5 parts of 2-hydroxyethyl acrylate, 47 parts of methyl methacrylate, 45 parts of n-butyl acrylate, 4 parts of styrene, and 1.5 parts of methacrylic acid were mixed by stirring to provide a monomer emulsion (3).

Production of Hydroxy-Containing Polyester Resin (A2)

Production Example 4

142 parts of isophthalic acid, 313 parts of adipic acid, 59 parts of 3-methyl-1,5-pentanediol, 220 parts of trimethylolpropane, and 228 parts of 2-butyl-2-ethyl-1,3-propanediol were placed in a reactor equipped with a thermometer, a thermostat, a stirrer, a reflux condenser, and a water separator, and the mixture was heated from 160 to 230° C. over a period of 3 hours. Thereafter, the temperature was maintained at 230° C. while the resulting condensation water was distilled off via the water separator, and a reaction was allowed to proceed until the acid value became 3 mg KOH/g or less. 38 parts of trimellitic anhydride was added to the reaction product, and an addition reaction was conducted at 170° C. for 30 minutes. The resulting product was cooled to 50° C. or lower, and neutralized by adding one equivalent of 2-(dimethylamino)ethanol per equivalent of the acid group. Subsequently, deionized water was gradually added to provide a hydroxy-containing polyester resin (A2-1) solution having a solids content of 45% and a pH of 6.3. The obtained hydroxy-containing polyester resin had an acid value of 35 mg KOH/g, a hydroxy value of 164 mg KOH/g, and a number average molecular weight of 1,600.

Production Example 5

105 parts of neopentylglycol, 273 parts of trimethylolpropane, 320 parts of 2-butyl-2-ethyl-1,3-propanediol, 219 parts of adipic acid, and 385 parts of isophthalic acid were placed in a reactor equipped with a thermometer, a thermostat, a stirrer, a reflux condenser, and a water separator, and the mixture was heated from 160 to 220° C. over a period of 3 hours. Thereafter, while the resulting condensation water was distilled off via the water separator, a condensation reaction was performed at 220° C. for 4 hours. Subsequently, 76 parts of trimellitic anhydride was further added, and a reaction was allowed to proceed at 170° C. for 30 minutes to add carboxy groups to the resulting condensation reaction product. Then, 5.5 parts of dimethylethanolamine and 120 parts of deionized water were added to the reaction product while stirring to provide a hydroxy-containing polyester resin (A2-2) solution having a solids concentration of 70%. The obtained hydroxy-containing polyester resin had an acid value of 35 mg KOH/g, a hydroxy value of 140 mg KOH/g, and a number average molecular weight of 5,000.

Production Example 6

A polyolefin was modified by adding 8 mass % of maleic acid to an ethylene-propylene copolymer (ethylene content: 5%) obtained by using a metallocene-based catalyst, and the thus obtained modified polyolefin having a melting point of 80° C., a Mw of about 100,000, and Mw/Mn of about 2.1 was neutralized with an equivalent amount of dimethylethanolamine, and dispersed in water by using 10 parts of emulsifier per 100 parts of the polypropylene/ethylenic copolymer to provide an aqueous dispersion of modified polyolefin.

Production Example 7

25 parts (resin solids content: 10 parts) of the hydroxy-containing acrylic resin (A1-1) solution obtained in Production Example 1, 60 parts of "JR-806" (trade name, produced by Tayca Corporation, rutile titanium dioxide), 1 part of "Carbon MA-100" (trade name, produced by Mitsubishi Chemical, Inc., carbon black), 15 parts of "Bariace B-35" (trade name, produced by Sakai Chemical Industry Co., Ltd., barium sulfate powder, average primary particle size: 0.5 μm,), 3 parts of "MICRO ACE S-3" (trade name, produced by Nippon Talc Co., Ltd., talc powder, average primary particle size: 4.8 μm), and 46 parts of deionized water were mixed. The mixture was adjusted to a pH of 8.0 with 2-(dimethylamino)ethanol, and then dispersed in a paint shaker for 30 minutes to obtain a pigment dispersion paste (P-1).

Production Example 8

25 parts (resin solids content: 10 parts) of the hydroxy-containing acrylic resin (A1-1) solution obtained in Production Example 1, 80 parts of "JR-806, 20 parts of "Balkan XC72" (trade name, produced by Cabot Specialty Chemicals, Inc, conductive carbon black pigment), and 46 parts of deionized water were mixed. The mixture was adjusted to a pH of 8.0 with 2-(dimethylamino)ethanol, and then dispersed in a paint shaker for 30 minutes to obtain a pigment dispersion paste (P-2).

Production of Blocked Polyisocyanate Compound (B)

Production Example 9

360 parts of "Sumidur N-3300" (trade name, Sumika Bayer Urethane Co., Ltd., polyisocyanate having a hexamethylene diisocyanate-derived isocyanurate structure, solids content: about 100%, isocyanate group content: 21.8%), 60 parts of "Uniox M-550" (produced by NOF Corporation, polyethylene glycol monomethyl ether, average molecular weight: about 550), and 0.2 parts of 2,6-di-tert-butyl-4-methylphenol were placed in a reactor equipped with a thermometer, a thermostat, a stirrer, a reflux condenser, a nitrogen inlet tube, a dropping funnel, and a simplified trap for removed solvent, then mixed well, and heated in a nitrogen stream at 130° C. for 3 hours. Subsequently, 110 parts of ethyl acetate, and 252 parts of diisopropyl malonate were added. While the mixture was stirred in a nitrogen stream, 3 parts of a 28% methanol solution of sodium methoxide was added thereto, and the resulting mixture was stirred at 65° C. for 8 hours. The amount of isocyanate in the obtained resin solution was 0.12 mol/kg, 683 parts of 4-methyl-2-pentanol was added thereto. While the temperature of the reaction system was maintained at 80 to 85° C., the solvent was distilled off under reduced pressure over a period of 3 hours to obtain 1,010 parts of a blocked polyisocyanate compound solution (B-1). 95 parts of isopropanol was contained in the simplified trap for removed solvent. The obtained blocked polyisocyanate compound solution (B-1) had a solids concentration of about 60%.

Production Example 10

360 parts of "Sumidur N-3300," 50 parts of "Uniox M-440" (produced by NOF Corporation, polyethylene glycol monomethyl ether, average molecular weight: about 400), 5 parts of "PEG #600" (produced by NOF Corporation, polyethylene glycol, average molecular weight: about 600), and 0.2 parts of 2,6-di-tert-butyl-4-methylphenol were placed in a reactor equipped with a thermometer, a thermostat, a stirrer, a reflux condenser, a nitrogen inlet tube, a dropping funnel, and a simplified trap for removed solvent, then mixed well, and heated in a nitrogen stream at 130° C. for 3 hours. Subsequently, 110 parts of ethyl acetate and 247 parts of diisopropyl malonate were added thereto. While the mixture was stirred in a nitrogen stream, 3 parts of 28% methanol solution of sodium methoxide was added, and the resulting mixture was stirred at 65° C. for 8 hours. The amount of isocyanate in the resin solution was 0.11 mol/kg. 670 parts of 4-methyl-2-pentanol was added thereto. While the temperature of the reaction system was maintained at 80 to 85° C., the solvent was distilled off under reduced pressure over a period of 3 hours to obtain 1,010 parts of a blocked polyisocyanate compound solution (B-2). 92 parts of isopropanol was contained in the simplified trap for removed solvent. The obtained blocked polyisocyanate compound solution (B-2) had a solids concentration of about 60%.

Production Example 11

480 parts of "Sumidur N-3300" (trade name, Sumika Bayer Urethane Co., Ltd., polyisocyanate having a hexamethylene diisocyanate-derived isocyanurate structure, solids content: about 100%, isocyanate group content: 21.8%), 150 parts of ethyl acetate, and 365 parts of diisopropyl malonate were placed in a reactor equipped with a thermometer, a thermostat, a stirrer, a reflux condenser, a nitrogen inlet tube, a dropping funnel, and a simplified trap for removed solvent. While the mixture was stirred in a nitrogen stream, 4 parts of a 28% methanol solution of sodium methoxide was added thereto, and the resulting mixture was stirred at 65° C. for 8 hours. The amount of isocyanate in the obtained resin solution was 0.07 mol/kg. 870 parts of 4-methyl-2-pentanol was added thereto. The temperature of the reaction system was maintained at 90 to 95° C., and the solvent was distilled off under reduced pressure over a period of 3 hours. 120 parts of 4-methyl-2-pentanol was further added to obtain 1,400 parts of a blocked polyisocyanate compound solution (B-3). 183 parts of isopropanol was contained in the simplified trap for removed solvent. The obtained blocked polyisocyanate compound solution (B-3) had a solids concentration of about 60%.

Production Example 12

480 parts of "Sumidur N-3300," 150 parts of ethyl acetate, 330 parts diisopropyl malonate, and 27 parts of isopropyl acetoacetate were placed in a reactor equipped with a thermometer, a thermostat, a stirrer, a reflux condenser, a nitrogen inlet tube, a dropping funnel, and a simplified trap for removed solvent. While the mixture was stirred in a nitrogen stream, 4 parts of a 28% methanol solution of sodium methoxide was added thereto, and the resulting mixture was stirred at 65° C. for 8 hours. The amount of isocyanate in the obtained resin solution was 0.08 mol/kg. 870 parts of 4-methyl-2-pentanol was added thereto. While the temperature of the reaction system was maintained at 90 to 95° C., the solvent was distilled off under reduced pressure over a period of 3 hours. Then, 20 parts of 4-methyl-2-pentanol was further added to obtain 1,390 parts of a blocked polyisocyanate compound solution (B-4). 173 parts of isopropanol was contained in the simplified trap for removed solvent. The obtained blocked polyisocyanate compound solution (B-4) had a solids concentration of about 60%.

Production Example 13

480 parts of "Sumidur N-3300," 150 parts of ethyl acetate, 280 parts of diethyl malonate, and 30 parts of isobutyryl ethyl acetate were placed in a reactor equipped with a thermometer, a thermostat, a stirrer, a reflux condenser, a nitrogen inlet tube, a dropping funnel, and a simplified trap for removed solvent. While the mixture was stirred in a nitrogen stream, 4 parts of a 28% methanol solution of sodium methoxide was added thereto, and the resulting mixture was stirred at 65° C. for 8 hours. The amount of isocyanate in the obtained resin solution was 0.08 mol/kg. 870 parts of 4-methyl-2-pentanol was added thereto. While the temperature of the reaction system was maintained at 90 to 95° C., the solvent was distilled off under reduced pressure over a period of 3 hours. Then, 120 parts of 4-methyl-2-pentanol was further added to obtain 1,350 parts of a blocked polyisocyanate compound solution (B-5). 133 parts of ethanol was contained in the simplified trap for removed solvent. The obtained blocked polyisocyanate compound solution (B-5) had a solids concentration of about 60%.

Production Example 14

480 parts of "Sumidur N-3300," 150 parts of ethyl acetate, and 360 parts of diisopropyl malonate were placed in a reactor equipped with a thermometer, a thermostat, a stirrer, a reflux condenser, a nitrogen inlet tube, a dropping funnel, and a simplified trap for removed solvent. While the mixture was stirred in a nitrogen stream, 4 parts of a 28% methanol solution of sodium methoxide was added thereto, and the resulting mixture was stirred at 65° C. for 8 hours. The amount of isocyanate in the obtained resin solution was 0.07 mol/kg. 990 parts of 5-methyl-2-hexanol was added thereto. While the temperature of the reaction system was maintained at 90 to 95° C., the solvent was distilled off under reduced pressure over a period of 3 hours. Then, 120 parts of 5-methyl-2-hexanol was further added to obtain 1,400 parts of a blocked polyisocyanate compound solution (B-6). 180 parts of isopropanol was contained in the simplified trap for removed solvent. The obtained blocked polyisocyanate compound solution (B-6) had a solids concentration of about 60%.

Production Example 15

450 parts of "Duranate TPA-100," 150 parts of ethyl acetate, and 360 parts of diisopropyl malonate were placed in a reactor equipped with a thermometer, a thermostat, a stirrer, a reflux condenser, a nitrogen inlet tube, a dropping funnel, and a simplified trap for removed solvent. While the mixture was stirred in a nitrogen stream, 4 parts of a 28% methanol solution of sodium methoxide was added thereto, and the resulting mixture was stirred at 65° C. for 8 hours. The amount of isocyanate in the obtained resin solution was 0.07 mol/kg. 1,110 parts of 6-methyl-2-heptanol was added thereto. While the temperature of the reaction system was maintained at 80 to 85° C., the solvent was distilled off under reduced pressure over a period of 6 hours. Then, 120 parts of 6-methyl-2-heptanol was further added to obtain 1,430 parts of a blocked polyisocyanate compound solution (B-7). 170 parts of isopropanol was contained in the simplified trap for removed solvent. The obtained blocked polyisocyanate compound solution (B-7) had a solids concentration of about 60%.

Production Example 16

480 parts of "Sumidur N-3300," 150 parts of ethyl acetate, and 310 parts of diethyl malonate were placed in a reactor equipped with a thermometer, a thermostat, a stirrer, a reflux condenser, a nitrogen inlet tube, a dropping funnel, and a simplified trap for removed solvent. While the mixture was stirred in a nitrogen stream, 4 parts of a 28% methanol solution of sodium methoxide was added thereto, and the resulting mixture was stirred at 65° C. for 8 hours. The amount of isocyanate in the obtained resin solution was 0.06 mol/kg. 630 parts of n-butanol was added thereto. While the temperature of the reaction system was maintained at 90 to 95° C., the solvent was distilled off under reduced pressure over a period of 3 hours. Then, 90 parts of n-butanol was further added to obtain 1,270 parts of a blocked polyisocyanate compound solution (B-8). 100 parts of ethanol was contained in the simplified trap for removed solvent. The obtained blocked polyisocyanate compound solution (B-8) had a solids concentration of about 60%.

Production Example 17

480 parts of "Sumidur N-3300," 150 parts of ethyl acetate, and 310 parts of diethyl malonate were placed in a reactor equipped with a thermometer, a thermostat, a stirrer, a reflux condenser, a nitrogen inlet tube, a dropping funnel, and a simplified trap for removed solvent. While the mixture was stirred in a nitrogen stream, 4 parts of a 28% methanol solution of sodium methoxide was added thereto, and the resulting mixture was stirred at 65° C. for 8 hours. The amount of isocyanate in the obtained resin solution was 0.06 mol/kg. 1,110 parts of 2-ethylhexanol was added thereto. While the temperature of the reaction system was maintained at 80 to 85° C., the solvent was distilled off under reduced pressure over a period of 6 hours. Then, 120 parts of 2-ethylhexanol was further added to obtain 1,410 parts of a blocked polyisocyanate compound solution (B-9). 130 parts of ethanol was contained in the simplified trap for removed solvent. The obtained blocked polyisocyanate compound solution (B-9) had a solids concentration of about 60%.

Production Example 18

480 parts of "Sumidur N-3300," 150 parts of ethyl acetate, and 310 parts of diethyl malonate were placed in a reactor equipped with a thermometer, a thermostat, a stirrer, a reflux condenser, a nitrogen inlet tube, a dropping funnel, and a simplified trap for removed solvent. While the mixture was stirred in a nitrogen stream, 4 parts of a 28% methanol solution of sodium methoxide was added thereto, and the resulting mixture was stirred at 65° C. for 8 hours. The amount of isocyanate in the obtained resin solution was 0.06 mol/kg. 1,000 parts of propylene glycol monopropyl ether was added thereto. While the temperature of the reaction system was maintained at 90 to 95° C., the solvent was distilled off under reduced pressure over a period of 3 hours. Then, 120 parts of propylene glycol monopropyl ether was further added to obtain 1,380 parts of a blocked polyisocyanate compound solution (B-10). 125 parts of ethanol was contained in the simplified trap for removed solvent. The obtained blocked polyisocyanate compound solution (B-10) had a solids concentration of about 60%.

Production of Aqueous First Colored Coating Composition (X)

Production Example 19

89 parts (resin solids content: 10 parts) (solids mass) of the pigment dispersion paste (P-1) obtained in Production Example 7, 45 parts (solids mass) of the hydroxy-containing acrylic resin (A1-2) dispersion obtained in Production Example 2, 15 parts (solids mass) of the hydroxy-containing polyester resin (A2-1) solution obtained in Production Example 4, 20 parts (solids mass) of the blocked polyisocyanate compound (B-1) obtained in Production Example 9, and 10 parts (solids mass) of "Cymel 325" (trade name, percentage of mononuclear melamine: 45%, weight average molecular weight: 800, melamine resin having imino and methylol groups, solids content: 80%) were uniformly mixed in accordance with a standard method. Subsequently, "UH-752" (trade name, produced by ADEKA Co. Ltd., a urethane associative thickener), 2-(dimethylamino)ethanol, and deionized water were added to the resulting mixture to obtain an aqueous first colored coating composition (X-1) having a pH of 8.0, a solids concentration of 48%, and a viscosity of 30 seconds as measured with Ford Cup No. 4 at 20° C.

Production Examples 20 to 43

Aqueous first colored coating compositions (X-2) to (X-25) were produced in the same manner as in Production Example 19, except that the formulations shown in Table 2 below were used. The resulting compositions had a pH of 8.0 and a viscosity of 30 seconds as measured with Ford Cup No. 4 at 20° C.

The formulations of the aqueous first colored coating compositions (X) shown in Table 1 are expressed as mass ratios of the components on a solids basis.

TABLE 1

| Production Example No. | | | | 19 | 20 | 21 | 22 | 23 | 24 | 25 |
|---|---|---|---|---|---|---|---|---|---|---|
| Aqueous first colored coating composition (X) | | | | X-1 | X-2 | X-3 | X-4 | X-5 | X-6 | X-7 |
| Pigment dispersion paste | Name of pigment dispersion paste | | | P-1 | P-1 | P-1 | P-1 | P-1 | P-1 | P-1 |
| | Aqueous film-forming resin (A) | Hydroxy-containing acrylic resin (A1) | Hydroxy-containing acrylic resin aqueous solution (A1-1) | 10 | 10 | 10 | 10 | 10 | 10 | 10 |
| | Pigment | Color pigment | "JR-806" (titanium oxide) | 60 | 60 | 60 | 60 | 60 | 60 | 60 |
| | | | "MA-100" (carbon black) | 1 | 1 | 1 | 1 | 1 | 1 | 1 |
| | | Extender pigment | "Bariace B-35" (barium sulfate) | 15 | 15 | 15 | 15 | 15 | 15 | 15 |
| | | | "MICRO ACE S-3" (talc) | 3 | 3 | 3 | 3 | 3 | 3 | 3 |
| | | Electrically conductive pigment | "Balkan XC72" (conductive carbon black) | | | | | | | |
| Aqueous film-forming resin (A) | | Hydroxy-containing acrylic resin (A1) | Hydroxy-containing acrylic resin aqueous dispersion (A1-2) | 45 | 45 | 45 | 40 | 40 | 40 | 45 |
| | | | Hydroxy-containing acrylic resin aqueous dispersion (A1-3) | | | | | | | |
| | | Hydroxy-containing polyester resin (A2) | Hydroxy-containing polyester resin (A2-1) | 15 | 15 | 15 | 15 | 15 | 10 | 15 |
| | | | Hydroxy-containing polyester resin (A2-2) | | | | | | | |
| | | Aqueous polyurethane resin | "U-COAT UX-310" (Note 1) | | | | | | 10 | |
| | | Aqueous polyolefin resin | Modified polyolefin resin aqueous dispersion (Production Example 6) | | | | | | | |
| Curing agent component | Blocked polyisocyanate compound (B) | | Type | B-1 | B-1 | B-1 | B-1 | B-1 | B-1 | B-2 |
| | | | Amount | 20 | 30 | 10 | 20 | 20 | 20 | 20 |
| | Curing agent (C) other than component (B) | | "Cymel 325" | 10 | 0 | 20 | 10 | 10 | 10 | 10 |
| Oligomer | | | "GP600" (Note 2) | | | | | 5 | | |
| Diester compound | | | Diester compound (Note 3) | | | | | | 5 | |

| Production Example No. | | | | 26 | 27 | 28 | 29 | 30 |
|---|---|---|---|---|---|---|---|---|
| Aqueous first colored coating composition (X) | | | | X-8 | X-9 | X-10 | X-11 | X-12 |
| Pigment dispersion paste | Name of pigment dispersion paste | | | P-1 | P-1 | P-1 | P-1 | P-1 |
| | Aqueous film-forming resin (A) | Hydroxy-containing acrylic resin (A1) | Hydroxy-containing acrylic resin aqueous solution (A1-1) | 10 | 10 | 10 | 10 | 10 |
| | Pigment | Color pigment | "JR-806" (titanium oxide) | 60 | 60 | 60 | 60 | 60 |
| | | | "MA-100" (carbon black) | 1 | 1 | 1 | 1 | 1 |
| | | Extender pigment | "Bariace B-35" (barium sulfate) | 15 | 15 | 15 | 15 | 15 |
| | | | "MICRO ACE S-3" (talc) | 3 | 3 | 3 | 3 | 3 |
| | | Electrically conductive pigment | "Balkan XC72" (conductive carbon black) | | | | | |
| Aqueous film-forming resin (A) | | Hydroxy-containing acrylic resin (A1) | Hydroxy-containing acrylic resin aqueous dispersion (A1-2) | 45 | 45 | 45 | 45 | 45 |
| | | | Hydroxy-containing acrylic resin aqueous dispersion (A1-3) | | | | | |
| | | Hydroxy-containing polyester resin (A2) | Hydroxy-containing polyester resin (A2-1) | 15 | 15 | 15 | 15 | 15 |
| | | | Hydroxy-containing polyester resin (A2-2) | | | | | |
| | | Aqueous polyurethane resin | "U-COAT UX-310" (Note 1) | | | | | |
| | | Aqueous polyolefin resin | Modified polyolefin resin aqueous dispersion (Production Example 6) | | | | | |
| Curing agent component | Blocked polyisocyanate compound (B) | | Type | B-3 | B-4 | B-5 | B-6 | B-7 |
| | | | Amount | 20 | 20 | 20 | 20 | 20 |
| | Curing agent (C) other than component (B) | | "Cymel 325" | 10 | 10 | 10 | 10 | 10 |
| Oligomer | | | "GP600" (Note 2) | | | | | |
| Diester compound | | | Diester compound (Note 3) | | | | | |

| Production Example No. | | | | 31 | 32 | 33 | 34 | 35 | 36 | 37 |
|---|---|---|---|---|---|---|---|---|---|---|
| Aqueous first colored coating composition (X) | | | | X-13 | X-14 | X-15 | X-16 | X-17 | X-18 | X-19 |
| Pigment dispersion paste | Name of Pigment dispersion paste | | | P-2 | P-2 | P-2 | P-2 | P-2 | P-2 | P-2 |
| | Aqueous film-forming resin (A) | Hydroxy-containing acrylic resin (A1) | Hydroxy-containing acrylic resin aqueous solution (A1-1) | 10 | 10 | 10 | 10 | 10 | 10 | 10 |
| | Pigment | Color pigment | "JR-806" (titanium oxide) | 80 | 80 | 80 | 80 | 80 | 80 | 80 |
| | | | "MA-100" (carbon black) | | | | | | | |
| | | Extender pigment | "Bariace B-35" (barium sulfate) | | | | | | | |
| | | | "MICRO ACE S-3" (talc) | | | | | | | |
| | | Electrically conductive pigment | "Balkan XC72" (conductive carbon black) | 20 | 20 | 20 | 20 | 20 | 20 | 20 |
| Aqueous film-forming resin (A) | | Hydroxy-containing acrylic resin (A1) | Hydroxy-containing acrylic resin aqueous dispersion (A1-2) | | | | | | | |
| | | | Hydroxy-containing acrylic resin aqueous dispersion (A1-3) | 25 | 25 | 25 | 25 | 25 | 25 | 25 |
| | | Hydroxy-containing polyester resin (A2) | Hydroxy-containing polyester resin (A2-1) | | | | | | | |
| | | | Hydroxy-containing polyester resin (A2-2) | 5 | 5 | 5 | 5 | 5 | 5 | 5 |
| | | Aqueous polyurethane resin | "U-COAT UX-310" (Note 1) | 5 | 5 | 5 | 5 | 5 | 5 | 5 |

TABLE 1-continued

| | | | | | | | | | | | |
|---|---|---|---|---|---|---|---|---|---|---|---|
| | Aqueous polyolefin resin | Modified polyolefin resin aqueous dispersion (Production Example 6) | | 30 | 30 | 30 | 30 | 30 | 30 | 30 | |
| Curing agent component | Blocked polyisocyanate compound (B) | Type | | B-1 | B-2 | B-3 | B-4 | B-5 | B-6 | B-7 | |
| | | Amount | | 15 | 15 | 15 | 15 | 15 | 15 | 15 | |
| | Curing agent (C) other than component (B) | "Cymel 325" | | 10 | 10 | 10 | 10 | 10 | 10 | 10 | |
| Oligomer Diester compound | | "GP600" (Note 2) Diester compound (Note 3) | | | | | | | | | |

| | | | | Production Example No. | 38 | 39 | 40 | 41 | 42 | 43 |
|---|---|---|---|---|---|---|---|---|---|---|
| Aqueous first colored coating composition (X) | | | | | X-20 | X-21 | X-22 | X-23 | X-24 | X-25 |
| Pigment dispersion paste | Name of Pigment dispersion paste | | | | P-1 | P-1 | P-1 | P-2 | P-2 | P-2 |
| | Aqueous film-forming resin (A) | Hydroxy-containing acrylic resin (A1) | Hydroxy-containing acrylic resin aqueous solution (A1-1) | | 10 | 10 | 10 | 10 | 10 | 10 |
| | Pigment | Color pigment | "JR-806" (titanium oxide) | | 60 | 60 | 60 | 80 | 80 | 80 |
| | | | "MA-100" (carbon black) | | 1 | 1 | 1 | | | |
| | | Extender pigment | "Bariace B-35" (barium sulfate) | | 15 | 15 | 15 | | | |
| | | | "MICRO ACE S-3" (talc) | | 3 | 3 | 3 | | | |
| | | Electrically conductive pigment | "Balkan XC72" (conductive carbon black) | | | | | 20 | 20 | 20 |
| Aqueous film-forming resin (A) | | Hydroxy-containing acrylic resin (A1) | Hydroxy-containing acrylic resin aqueous dispersion (A1-2) | | 45 | 45 | 45 | | | |
| | | | Hydroxy-containing acrylic resin aqueous dispersion (A1-3) | | | | | 25 | 25 | 25 |
| | | Hydroxy-containing polyester resin (A2) | Hydroxy-containing polyester resin (A2-1) | | 15 | 15 | 15 | | | |
| | | | Hydroxy-containing polyester resin (A2-2) | | | | | 5 | 5 | 5 |
| | | Aqueous polyurethane resin | "U-COAT UX-310" (Note 1) | | | | | 5 | 5 | 5 |
| | | Aqueous polyolefin resin | Modified polyolefin resin aqueous dispersion (Production Example 6) | | | | | 30 | 30 | 30 |
| Curing agent component | Blocked polyisocyanate compound (B) | Type | | | B-8 | B-9 | B-10 | B-8 | B-9 | B-10 |
| | | Amount | | | 20 | 20 | 20 | 15 | 15 | 15 |
| | Curing agent (C) other than component (B) | "Cymel 325" | | | 10 | 10 | 10 | 10 | 10 | 10 |
| Oligomer Diester compound | | "GP600" (Note 2) Diester compound (Note 3) | | | | | | | | |

(Note 1)
U-COAT UX-310: trade name, produced by Sanyo Chemical Industries, Ltd., polyurethane resin emulsion, solids content: 40%.
(Note 2)
GP600: trade name, produced by Sanyo Chemical Industries, Ltd., polyoxypropylene glycerin ether (molecular weight: 600), water tolerance: 100 or more.
(Note 3)
Diester compound: a diester compound of polyoxyethylene glycol and 2-ethylhexanoic acid. In Formula (VIII) above, $R^8$ and $R^9$ represent 2-ethyl heptyl, $R^{10}$ represents ethylene, and m is 7. Molecular weight: 578.

Production of Clear Coating Composition (Z)

Production of Hydroxy-Containing Acrylic Resin (K)

Production Examples 44 to 55

31 parts of ethoxyethyl propionate was placed in a four-necked flask equipped with a stirrer, a thermometer, a condenser tube, and a nitrogen gas inlet, and heated to 155° C. under a nitrogen gas stream. After the temperature reached 155° C., the nitrogen gas stream was stopped, and a monomer mixture of the monomers and the polymerization initiator at the proportions shown in Table 2 below was added dropwise thereto over a period of 4 hours. Subsequently, aging was carried out at 155° C. for 2 hours under a nitrogen gas stream. The resulting product was then cooled to 100° C. and diluted with 32.5 parts of butyl acetate. Thereby, hydroxy-containing acrylic resins (K-1) to (K-12) having a solids content of 60% were obtained. Table 2 below shows the mass solids concentration (%) and resin properties of each of the obtained hydroxy-containing acrylic resins.

The glass transition temperature (° C.) values listed in Table 2 were calculated using the following formulae.

$$1/Tg(K) = (W1/T1) + (W2/T2) + \ldots$$

$$Tg(°C.) = Tg(K) - 273$$

In each formula, W1, W2, ... represent the mass fractions of the monomers used for copolymerization, and T1, T2, ... represent the Tg (K) of homopolymers of each of the monomers. The values shown in the column to the right side of each monomer name in Table 1 are the Tg (° C.) of the homopolymers of each of the monomers used for the above calculation.

TABLE 2

| | Production Example No. | | 44 | 45 | 46 | 47 | 48 | 49 | 50 |
|---|---|---|---|---|---|---|---|---|---|
| Hydroxy-containing acrylic resin | | | K-1 | K-2 | K-3 | K-4 | K-5 | K-6 | K-7 |
| | | Tg ° C. | | | | | | | |
| k1-1 | 2-hydroxypropyl acrylate | −60 | 38 | 21 | 46.6 | 38 | 38 | | 38 |
| | 2-hydroxypropyl methacrylate | 76 | | | | | | 42 | |

TABLE 2-continued

| | | | | | | | | | |
|---|---|---|---|---|---|---|---|---|---|
| k1-2 | 2-hydroxyethyl acrylate | −60 | | | | | | | |
| k2-1 | Isobornyl acrylate | 95 | 30 | 30 | 30 | 30 | 30 | 10 | |
| | Cyclohexyl methacrylate | 66 | | | | | | | 30 |
| k2 (other than k2-1) | 2-ethylhexyl acrylate | −53 | 11 | 28 | 2.4 | 11 | 11 | 37 | 11 |
| | n-butyl acrylate | −54 | | | | | | | |
| | Styrene | 100 | 20 | 20 | 20 | 20 | 20 | 10 | 20 |
| | Acrylic acid | 106 | 1 | 1 | 1 | 1 | 1 | 1 | 1 |
| di-t-amyl peroxide (polymerization initiator) | | | 4 | 4 | 4 | 9 | 1 | 4 | 4 |
| Resin property | Mass solids concentration (%) | | 60 | 60 | 60 | 60 | 60 | 60 | 60 |
| | Weight average molecular weight | | 13000 | 13000 | 13000 | 5000 | 30000 | 13000 | 13000 |
| | Hydroxy value (mg KOH/g) | | 164 | 90 | 201 | 164 | 164 | 163 | 164 |
| | Glass transition temperature (° C.) | | 0 | 2 | −1 | 0 | 0 | 17 | −5 |

| | | Production Example No. | 51 | 52 | 53 | 54 | 55 |
|---|---|---|---|---|---|---|---|
| | Hydroxy-containing acrylic resin | | K-8 | K-9 | K-10 | K-11 | K-12 |
| | | Tg ° C. | | | | | |
| k1-1 | 2-hydroxypropyl acrylate | −60 | 32 | 38 | | 19 | 51 |
| | 2-hydroxypropyl methacrylate | 76 | | | | | |
| k1-2 | 2-hydroxyethyl acrylate | −60 | 5 | | 34 | | |
| k2-1 | Isobornyl acrylate | 95 | 30 | | 30 | 30 | 28 |
| | Cyclohexyl methacrylate | 66 | | | | | |
| k2 (other than k2-1) | 2-ethylhexyl acrylate | −53 | 12 | 11 | 15 | 30 | |
| | n-butyl acrylate | −54 | | 30 | | | |
| | Styrene | 100 | 20 | 20 | 20 | 20 | 20 |
| | Acrylic acid | 106 | 1 | 1 | 1 | 1 | 1 |
| di-t-amyl peroxide (polymerization initiator) | | | 4 | 4 | 4 | 4 | 4 |
| Resin property | Mass solids concentration (%) | | 60 | 60 | 60 | 60 | 60 |
| | Weight average molecular weight | | 13000 | 13000 | 13000 | 13000 | 13000 |
| | Hydroxy value (mg KOH/g) | | 162 | 164 | 164 | 82 | 220 |
| | Glass transition temperature (° C.) | | −5 | −36 | 1 | −3 | −4 |

Production of Organometallic Catalyst

Part 1

Production Example 56

47 parts of ethyl-3-ethoxypropionate and 82 parts of Nikka Octhix Zinc (*1) (zinc octylate, produced by Nihon Kagaku Sangyo Co., Ltd., zinc content: 8 mass %) were placed in a reactor equipped with a stirrer, a condenser, a temperature controller, a nitrogen inlet tube, and a dropping funnel. The air in the reactor was replaced with nitrogen, and the mixture was heated to 50° C. Subsequently, 16 parts of 1-methylimidazole was added dropwise thereto while being stirred. After completion of the dropwise addition, the 50° C. temperature was maintained for 2 hours, and the reaction was terminated. The obtained organometallic catalyst (M-1) was a transparent liquid having a zinc content of 4.5 mass %.

Production Examples 57 to 66

Organometallic catalysts (M-2) to (M-11) having the compositions shown in Table 3 below were obtained in the same manner as in Production Example 56.

Table 3 below also shows the molar ratio of amidine compound (M2) to metallic compound (M1) and the metal concentration by mass (%) of each of the organometallic catalysts (M-1) to (M-11).

The (*1) to (*6) shown in Table 3 represent the following:

Nikka Octhix Zinc (*1): trade name, zinc octylate, zinc content: 8%, produced by Nihon Kagaku Sangyo Co., Ltd.

Nikka Octhix Tin (*2): trade name, tin octylate, tin content: 28%, produced by Nihon Kagaku Sangyo Co., Ltd.

Nikka Octhix Lead (*3): trade name, lead octylate, lead content: 24%, produced by Nihon Kagaku Sangyo Co., Ltd.

K-KAT 348 (*4): trade name, bismuth octylate, bismuth content: 25%, produced by King Industries Inc.

Nikka Octhix Cobalt (*5): trade name, cobalt octylate, cobalt content: 8%, produced by Nihon Kagaku Sangyo Co., Ltd.

Nikka Octhix Manganese (*6): trade name, manganese octylate, manganese content: 8%, produced by Nihon Kagaku Sangyo Co., Ltd.

TABLE 3

| Production Example No. | | 56 | 57 | 58 | 59 | 60 | 61 | 62 | 63 | 64 | 65 | 66 |
|---|---|---|---|---|---|---|---|---|---|---|---|---|
| Organometallic catalyst | | M-1 | M-2 | M-3 | M-4 | M-5 | M-6 | M-7 | M-8 | M-9 | M-10 | M-11 |
| M1 | Nikka Octhix Zinc (*1) | 82 | | | | | | | 82 | 82 | 82 | 82 |
| | Nikka Octhix tin (*2) | | 42 | | | | | | | | | 42 |
| | Nikka Octhix lead (*3) | | | 86 | | | | | | | | |
| | K-KAT 348 (*4) | | | | 84 | | | | | | | |

TABLE 3-continued

| Production Example No. | | 56 | 57 | 58 | 59 | 60 | 61 | 62 | 63 | 64 | 65 | 66 |
|---|---|---|---|---|---|---|---|---|---|---|---|---|
| | Nikka Octhix cobalt (*5) | | | | | 69 | | | | | | |
| | Nikka Octhix manganese (*6) | | | | | | 69 | | | | | |
| M2 | 1-Methylimidazole | 16 | 16 | 16 | 16 | 16 | 16 | | 33 | 15 | | |
| | Tetramethylguanidine | | | | | | | 23 | | | | |
| | Ethyl-3-ethoxy propionate | 47 | 205 | 358 | 364 | 46 | 37 | 41 | 31 | 49 | 63 | 217 |
| | Molar ratio of (M2)/(M1) | 2 | 2 | 2 | 2 | 2 | 2 | 2 | 4 | 1.8 | | |
| | Mass metal concentration (%) | 4.5 | 4.5 | 4.5 | 4.5 | 4.5 | 4.5 | 4.5 | 4.5 | 4.5 | 4.5 | 4.5 |

Production of Clear Coating Composition

Part 1

Production Examples 67 to 95

The hydroxy-containing acrylic resins (K-1) to (K-12) and the organometallic catalysts (M-1) to (M-11) obtained as described above, and the other components shown in Table 4 below were used in proportions as shown in Table 4 below and mixed while being stirred by a blade stirrer. Subsequently, butyl acetate was added to this mixture to adjust the viscosity to 25 seconds at 20° C. using Ford Cup No. 4. The formulations of the clear coating composition (Z) shown in Table 4 are expressed as mass ratios of the components on a solids basis.

The polyisocyanate compounds (L-1) to (L-5) in Table 4 represent the following compounds.

Polyisocyanate compound (L-1): a polyisocyanate compound derived from hexamethylene diisocyanate, composition ratio of multimers: isocyanurate trimer (53%) and other trimers or higher multimers (47%), solids content: 100%, NCO content: 21.8%, viscosity at 25° C.: 3000 mPa·s.

Polyisocyanate compound (L-2): a polyisocyanate compound derived from hexamethylene diisocyanate, composition ratio of multimers: isocyanurate trimer (63%), urethodione dimer (12%), and other trimers or higher multimers (25%), solids content: 100%, NCO content: 21.8%, viscosity at 25° C.: 500 mPa·s.

Polyisocyanate compound (L-3): N3200, trade name, produced by Bayer, biuret of hexamethylene diisocyanate, solids content: 100%, NCO content: 23.0%, viscosity at 25° C.: 2500 mPa·s.

Polyisocyanate compound (L-4): XP2580, trade name, produced by Bayer, allophanate of hexamethylene diisocyanate, solids content: 100%, NCO content: 19.5%, viscosity at 25° C.: 450 mPa·s.

Polyisocyanate compound (L-5): Z4470, trade name, produced by Bayer, isocyanurate of isophorone diisocyanate, solids content: 70%, NCO content: 11.9%, viscosity at 25° C.: 600 mPa·s.

TABLE 4

| Production Example No. | | 67 | 68 | 69 | 70 | 71 | 72 | 73 | 74 | 75 | 76 | 77 | 78 | 79 | 80 | 81 | 82 | 83 |
|---|---|---|---|---|---|---|---|---|---|---|---|---|---|---|---|---|---|---|
| Clear coating composition (Z) | | Z-1 | Z-2 | Z-3 | Z-4 | Z-5 | Z-6 | Z-7 | Z-8 | Z-9 | Z-10 | Z-11 | Z-12 | Z-13 | Z-14 | Z-15 | Z-16 | Z-17 |
| Hydroxy-containing acrylic resin (K) | Type | K-1 | K-1 | K-1 | K-1 | K-2 | K-3 | K-4 | K-5 | K-6 | K-7 | K-8 | K-9 | K-10 | K-1 | K-1 | K-1 | K-1 |
| | Amount | 64 | 54 | 72 | 64 | 71 | 59 | 64 | 64 | 64 | 64 | 64 | 64 | 64 | 64 | 65 | 61 | 63 |
| Polyisocyanate compound (L) | Type | L-1 | L-1 | L-1 | L-1 | L-1 | L-1 | L-1 | L-1 | L-1 | L-1 | L-1 | L-1 | L-1 | L-2 | L-3 | L-4 | L-1/L-5 |
| | Amount | 36 | 46 | 28 | 36 | 29 | 41 | 36 | 36 | 36 | 36 | 36 | 36 | 36 | 36 | 35 | 39 | 29/7.4 |
| Organometallic catalyst (M) | Type | M-1 | M-1 | M-1 | M-1 | M-1 | M-1 | M-1 | M-1 | M-1 | M-1 | M-1 | M-1 | M-1 | M-1 | M-1 | M-1 | M-1 |
| | Amount | 1.0 | 1.0 | 1.0 | 0.5 | 1.0 | 1.0 | 1.0 | 1.0 | 1.0 | 1.0 | 1.0 | 1.0 | 1.0 | 1.0 | 1.0 | 1.0 | 1.0 |
| NCO/OH ratio | | 1.0 | 1.5 | 0.7 | 1.0 | 1.0 | 1.0 | 1.0 | 1.0 | 1.0 | 1.0 | 1.0 | 1.0 | 1.0 | 1.0 | 1.0 | 1.0 | 1.0 |

| Production Example No. | | 84 | 85 | 86 | 87 | 88 | 89 | 90 | 91 | 92 | 93 | 94 | 95 |
|---|---|---|---|---|---|---|---|---|---|---|---|---|---|
| Clear coating composition (Z) | | Z-18 | Z-19 | Z-20 | Z-21 | Z-22 | Z-23 | Z-24 | Z-25 | Z-26 | Z-27 | Z-28 | Z-29 |
| Hydroxy-containing acrylic resin (K) | Type | K-1 | K-1 | K-1 | K-1 | K-1 | K-1 | K-1 | K-1 | K-11 | K-12 | K-1 | K-1 |
| | Amount | 64 | 64 | 64 | 64 | 64 | 64 | 64 | 64 | 74 | 57 | 64 | 64 |
| Polyisocyanate compound (L) | Type | L-1 | L-1 | L-1 | L-1 | L-1 | L-1 | L-1 | L-1 | L-1 | L-1 | L-1 | L-1 |
| | Amount | 36 | 36 | 36 | 36 | 36 | 36 | 36 | 36 | 26 | 43 | 36 | 36 |
| Organometallic catalyst (M) | Type | M-2 | M-3 | M-4 | M-5 | M-6 | M-7 | M-8 | M-9 | M-1 | M-1 | M-10 | M-11 |
| | Amount | 1.0 | 1.0 | 1.0 | 1.0 | 1.0 | 1.0 | 1.0 | 1.0 | 1.0 | 1.0 | 1.0 | 1.0 |
| NCO/OH ratio | | 1.0 | 1.0 | 1.0 | 1.0 | 1.0 | 1.0 | 1.0 | 1.0 | 1.0 | 1.0 | 1.0 | 1.0 |

Production of Organometallic Catalyst

Part 2

Production Example 96

Organometallic catalysts (M-12) to (M-14) having the compositions shown in Table 5 below were obtained as in Production Example 56. Table 5 below also shows the molar ratio of amidine compound (M2) to metal compound (M1) and the metal concentration by mass (%) of each of the organometallic catalysts (M-12) to (M-14). The (*7) to (*9) shown in Table 5 represent the following.

Nikka Octhix zirconium (*7): trade name, zirconium octylate, zirconium content: 12%, produced by Nihon Kagaku Sangyo Co., Ltd.

Tris(2,4-pentanedionato)aluminum (III) (*8): aluminum content: 8%, produced by Tokyo Chemical Industry Co., Ltd.

Bis(2,4-pentanedionato)molybdenum (VI) dioxide (*9): molybdenum content: 29%, produced by Tokyo Chemical Industry Co., Ltd.

TABLE 5

|     |                                              | Production Example No. | | |
| --- | -------------------------------------------- | --- | --- | --- |
|     |                                              | 96  | 97  | 98  |
|     | Organometallic catalyst (M)                  | M-12 | M-13 | M-14 |
| M1  | Nikka Octhix zirconium (*7)                  | 76  |     |     |
|     | Tris(2,4-pentanedionato) aluminum (III) (*8) |     | 34  |     |
|     | Bis(2,4-pentanedionato) molybdenumdioxide (*9) |   |     | 33  |
| M2  | 1-Methylimidazole                            | 16  | 16  | 16  |
|     | Tetramethylguanidine                         |     |     |     |
|     | Ethyl-3-ethoxy propionate                    | 110 | 10  | 164 |
|     | Molar ratio of (M2)/(M1)                     | 2   | 2   | 2   |
|     | Mass metal concentration (%)                 | 4.5 | 4.5 | 4.5 |

Production of Clear Coating Composition: Part 2

Production Examples 99 to 101

Clear coating compositions (Z-30) to (Z-32) having the compositions shown in Table 6 below were obtained as in Production Example 67. The formulations of the clear coating compositions (Z) shown in Table 6 are expressed as mass ratios of the components on a solids basis. The polyisocyanate compound (L-1) in Table 6 is as described above.

TABLE 6

|     |         | Production Example No. | | |
| --- | ------- | --- | --- | --- |
|     |         | 99  | 100 | 101 |
| Clear coating composition (Z) |  | Z-30 | Z-31 | Z-32 |
| Hydroxy-containing acrylic resin (K) | Type | K-1 | K-1 | K-1 |
|     | Amount | 64 | 64 | 64 |
| Polyisocyanate compound (L) | Type | L-1 | L-1 | L-1 |
|     | Amount | 36 | 36 | 36 |
| Organometallic catalyst (M) | Type | M-12 | M-14 | M-15 |
|     | Amount | 1.0 | 1.0 | 1.0 |
| NCO/OH ratio |         | 1.0 | 1.0 | 1.0 |

Method for Forming a Multilayer Coating Film

Preparation of Test Substrates

Part 1

"Electron GT-10" (trade name, produced by Kansai Paint Co., Ltd., a cationic electrodeposition coating composition) was applied to a zinc phosphated cold-rolled steel plate by electrodeposition to a cured film thickness of 20 μm, and cured by heating at 170° C. for 30 minutes to prepare a test substrate 1.

Preparation of Test Substrates

Part 2

A black polypropylene plate that has been subjected to degreasing treatment was used as a test substrate 2.

Method for Forming a Multilayer Coating Film

Part 1

Example 1

The aqueous first colored coating composition (X-1) obtained as described above was electrostatically applied to the test substrate 1 with a rotary electrostatic spray coater to a cured film thickness of 20 μm to form a first colored coating film. The film was allowed to stand for 3 minutes, followed by preheating at 80° C. for 3 minutes.

Subsequently, an aqueous second colored coating composition (Y-1) "WBC710 metallic base" (trade name, produced by Kansai Paint Co., Ltd., acrylic/melamine resin-based aqueous metallic color base coating composition) was electrostatically applied to the uncured first colored coating film with a rotary electrostatic spray coater to a cured film thickness of 15 μm to form a second colored coating film.

The resulting product was allowed to stand for 5 minutes, followed by preheating at 80° C. for 3 minutes. Thereafter, the clear coating composition (Z-1) obtained as described above was electrostatically applied to the uncured second colored coating film to a cured film thickness of 35 μm to form a clear coating film.

The resulting product was allowed to stand for 7 minutes at room temperature, and then heated at 100° C. for 7 minutes (the time during which the coated plate was maintained at 100° C.) to simultaneously cure the first colored coating film, the second colored coating film, and the clear coating film to produce a test coated plate.

Examples 2 to 12 and Comparative Examples 1 to 3

Test coated plates were produced as in Example 1, except that the aqueous first colored coating composition (X-1) used in Example 1 was replaced with any one of the aqueous first colored coating compositions (X-2) to (X-12) and (X-20) to (X-22) shown in Table 5.

Method for Forming a Multilayer Coating Film

Part 2

Example 13

The aqueous first colored coating composition (X-13) obtained as described above was applied by air spray to the test substrate 2 to a cured film thickness of 10 μm to form a first colored coating film.

The formed film was allowed to stand at room temperature for 3 minutes. The aqueous second colored coating composition (Y-1) "WBC710 metallic base" was electrostatically applied thereto to a cured film thickness of 15 μm to form a second colored coating film.

The resulting product was allowed to stand for 5 minutes, followed by preheating at 80° C. for 3 minutes. Thereafter, the clear coating composition (Z-1) obtained as described above was electrostatically applied to the uncured second colored coating film to a cured film thickness of 35 μm to form a clear coating film. The resulting product was allowed to stand at room temperature for 7 minutes, and then heated at 100° C. for 7 minutes (the time during which the coated plate was maintained at 100° C.) to simultaneously cure the first colored coating film, the second colored coating film, and the clear coating film to produce a test coated plate.

Examples 14 to 46 and Comparative Examples 4 to 10

Test coated plates were produced as in Example 13, except that the aqueous first colored coating composition (X-1) used in Example 13 was replaced with any one of the aqueous first colored coating compositions (X-14) to (X-19) and (X-23) to (X-25) shown in Table 5 below, and that the clear coating composition (Z-1) used in Example 13 was replaced with any one of the clear coating compositions (Z-2) to (Z-33) shown in Table 5 below.

Coating Film Evaluation

The test coated plates obtained in Examples 1 to 46 and Comparative Examples 1 to 10 were evaluated for anti-water adhesion, finished appearance, and Knoop hardness by using the following methods. Table 7 shows the evaluation results.

Anti-water adhesion: Each test plate was immersed in warm water at 40° C. for 240 hours. After being removed from the water, the test plate was dried at 20° C. for 1 hour. Then, cross-cuts reaching the substrate were made in the multilayer coating film of the test plate using a cutter knife to form a grid of 100 squares (2 mm×2 mm). Subsequently, adhesive cellophane tape was applied to the surface of the grid portion, and the tape was peeled off rapidly at 20° C. Then, the number of squares of the coating film remaining and the condition were checked. S and A are regarded as "pass."

S: 100 squares of the coating film remained, and no small edge chipping of the coating film occurred at the edge of the cut made by the cutter knife.

A: 100 squares of the coating film remained, but small edge chipping of the coating film occurred at the edge of the cut made by the cutter knife.

B: The number of squares of the coating film remaining was 99 or less.

Finished appearance: A brightness/darkness pattern of light on the surface of the coating film of each test plate was optically scanned by using a "Wave-Scan" (trade name, produced by BYK), which is a device for analyzing the contrast (intensity) of reflected light, to evaluate the smoothness and distinctness of image of the coating film surface. The smoothness was evaluated based on the Long Wave (LW) values measured in the wavelength region of 600 to 1,000 μm. The smaller the LW values, the better the smoothness. The test coated plates produced by using the test substrate 1 showed an LW value of 10 or less, which is regarded as "pass." The test coated plates produced by using the test substrate 2 showed an LW value of 12 or less, which is regarded as "pass." In contrast, the distinctness of image was evaluated based on Short Wave (SW) values measured in the wavelength region of 100 to 600 μm. The smaller the SW values, the better the distinctness of image of a coated surface. The test coated plates produced by using the test substrate 1 showed an SW value of 10 or less, which is regarded as "pass." The test coated plates produced by using the test substrate 2 showed an SW value of 12 or less, which is regarded as "pass."

Knoop hardness: After each test plate was allowed to stand in a thermostatic room at 20° C. for 24 hours, the measurement was performed using a Tukon tester (produced By American Chain & Cable Company, micro hardness tester). Knoop hardness is a value expressing the hardness of a coating film, and is determined by pressing a square pyramidal diamond indenter with a specific test load into the surface of a test material, and measuring the size of the diamond-shaped indentation in the surface. The higher the value, the greater the hardness.

TABLE 7

| | | Substrate | Aqueous first colored coating composition (X) | Aqueous second colored coating composition (Y) | Clear coating composition (Z) | Anti-water adhesion | Smoothness | Distinctness of image | Knoop hardness |
|---|---|---|---|---|---|---|---|---|---|
| Examples | 1 | Test substrate 1 | X-1 | Y-1 | Z-1 | S | 6 | 7 | 12 |
| | 2 | (steel plate | X-2 | Y-1 | Z-1 | A | 8 | 7 | 11 |
| | 3 | having an | X-3 | Y-1 | Z-1 | S | 7 | 8 | 10 |
| | 4 | etectrodeposition | X-4 | Y-1 | Z-1 | S | 6 | 7 | 12 |
| | 5 | coating film) | X-5 | Y-1 | Z-1 | S | 6 | 7 | 11 |
| | 6 | | X-6 | Y-1 | Z-1 | S | 6 | 7 | 11 |
| | 7 | | X-7 | Y-1 | Z-1 | S | 7 | 7 | 12 |
| | 8 | | X-8 | Y-1 | Z-1 | S | 8 | 8 | 12 |
| | 9 | | X-9 | Y-1 | Z-1 | S | 9 | 9 | 13 |
| | 10 | | X-10 | Y-1 | Z-1 | A | 8 | 9 | 12 |
| | 11 | | X-11 | Y-1 | Z-1 | S | 8 | 9 | 12 |
| | 12 | | X-12 | Y-1 | Z-1 | S | 8 | 9 | 12 |
| | 13 | Test substrate 2 | X-13 | Y-1 | Z-1 | S | 9 | 10 | 11 |
| | 14 | (polypropylene | X-14 | Y-1 | Z-1 | S | 10 | 10 | 11 |
| | 15 | plate) | X-15 | Y-1 | Z-1 | S | 11 | 11 | 11 |
| | 16 | | X-16 | Y-1 | Z-1 | S | 12 | 12 | 12 |
| | 17 | | X-17 | Y-1 | Z-1 | A | 11 | 12 | 11 |
| | 18 | | X-18 | Y-1 | Z-1 | S | 11 | 12 | 11 |
| | 19 | | X-19 | Y-1 | Z-1 | S | 11 | 12 | 11 |
| | 20 | | X-13 | Y-1 | Z-2 | S | 8 | 9 | 11 |
| | 21 | | X-13 | Y-1 | Z-3 | A | 10 | 10 | 10 |
| | 22 | | X-13 | Y-1 | Z-4 | S | 8 | 9 | 10 |
| | 23 | | X-13 | Y-1 | Z-5 | S | 8 | 9 | 8 |
| | 24 | | X-13 | Y-1 | Z-6 | S | 10 | 10 | 12 |
| | 25 | | X-13 | Y-1 | Z-7 | S | 8 | 9 | 11 |
| | 26 | | X-13 | Y-1 | Z-8 | S | 10 | 11 | 12 |
| | 27 | | X-13 | Y-1 | Z-9 | S | 10 | 10 | 13 |
| | 28 | | X-13 | Y-1 | Z-10 | S | 9 | 10 | 11 |
| | 29 | | X-13 | Y-1 | Z-11 | S | 9 | 10 | 12 |

TABLE 7-continued

|  | Substrate | Aqueous first colored coating composition (X) | Aqueous second colored coating composition (Y) | Clear coating composition (Z) | Anti-water adhesion | Smoothness | Distinctness of image | Knoop hardness |
|---|---|---|---|---|---|---|---|---|
|  | 30 | X-13 | Y-1 | Z-12 | S | 8 | 9 | 10 |
|  | 31 | X-13 | Y-1 | Z-13 | S | 10 | 11 | 13 |
|  | 32 | X-13 | Y-1 | Z-14 | S | 8 | 9 | 12 |
|  | 33 | X-13 | Y-1 | Z-15 | S | 9 | 10 | 12 |
|  | 34 | X-13 | Y-1 | Z-16 | S | 9 | 9 | 11 |
|  | 35 | X-13 | Y-1 | Z-17 | S | 9 | 11 | 13 |
|  | 36 | X-13 | Y-1 | Z-18 | S | 10 | 10 | 12 |
|  | 37 | X-13 | Y-1 | Z-19 | S | 10 | 10 | 12 |
|  | 38 | X-13 | Y-1 | Z-20 | S | 10 | 10 | 12 |
|  | 39 | X-13 | Y-1 | Z-21 | S | 9 | 10 | 11 |
|  | 40 | X-13 | Y-1 | Z-22 | S | 8 | 9 | 10 |
|  | 41 | X-13 | Y-1 | Z-23 | S | 9 | 10 | 11 |
|  | 42 | X-13 | Y-1 | Z-24 | S | 7 | 8 | 9 |
|  | 43 | X-13 | Y-1 | Z-25 | S | 10 | 11 | 12 |
|  | 44 | X-13 | Y-1 | Z-30 | S | 9 | 9 | 9 |
|  | 45 | X-13 | Y-1 | Z-32 | S | 10 | 10 | 11 |
|  | 46 | X-13 | Y-1 | Z-33 | S | 9 | 9 | 10 |
| Comparative Examples | 1 Test substrate 1 | X-20 | Y-1 | Z-1 | A | 12 | 13 | 12 |
|  | 2 | X-21 | Y-1 | Z-1 | A | 11 | 11 | 12 |
|  | 3 | X-22 | Y-1 | Z-1 | B | 13 | 13 | 13 |
|  | 4 Test substrate 2 | X-23 | Y-1 | Z-1 | A | 15 | 15 | 11 |
|  | 5 | X-24 | Y-1 | Z-1 | A | 14 | 13 | 11 |
|  | 6 | X-25 | Y-1 | Z-1 | B | 16 | 15 | 12 |
|  | 7 | X-13 | Y-1 | Z-26 | B | 8 | 9 | 3 |
|  | 8 | X-13 | Y-1 | Z-27 | S | 12 | 17 | 13 |
|  | 9 | X-13 | Y-1 | Z-28 | S | 12 | 15 | 11 |
|  | 10 | X-13 | Y-1 | Z-29 | S | 15 | 20 | 13 |

The invention claimed is:

1. A method for forming a multilayer coating film, the method comprising:

applying an aqueous first colored coating composition (X) to a substrate to form a first colored coating film;

applying an aqueous second colored coating composition (Y) to the uncured first colored coating film to form a second colored coating film;

applying a clear coating composition (Z) to the uncured second colored coating film to form a clear coating film; and simultaneously curing the uncured first colored coating film, the uncured second colored coating film, and the uncured clear coating film, wherein the aqueous first colored coating composition (X) comprises an aqueous film-forming resin (A) and a blocked polyisocyanate compound (B) having at least one blocked isocyanate group selected from blocked isocyanate groups represented by Formula (I) below:

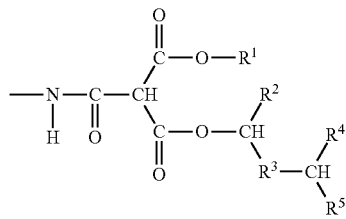

(I)

wherein $R^1$ represents isopropyl, $R^2$, $R^4$, and $R^5$ each independently represent $C_{1-12}$ hydrocarbon, and $R^3$ represents linear or branched $C_{1-12}$ alkylene, blocked isocyanate groups represented by Formula (II) below:

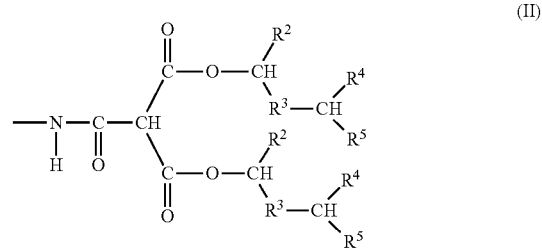

(II)

wherein $R^2$, $R^3$, $R^4$, and $R^5$ are as defined above, and blocked isocyanate groups represented by Formula (III) below:

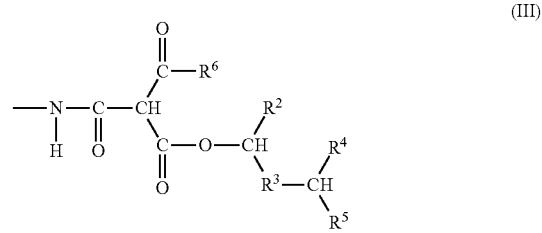

(III)

wherein $R^2$, $R^3$, $R^4$, and $R^5$ are as defined above, and $R^6$ represents isopropyl, and wherein the clear coating composition (Z) comprises a hydroxy-containing acrylic resin (K) having a hydroxy value of 85 to 215 mg KOH/g, a polyisocyanate compound (L), and an organometallic catalyst (M) containing a metal compound (M1) containing one or more metals selected from the group consisting of zinc, tin, zirconium, bismuth, lead, cobalt, manganese, titanium, aluminum, and molybdenum, and an amidine compound (M2).

2. The method for forming a multilayer coating film according to claim 1, wherein the blocked polyisocyanate compound (B) is obtainable by reacting a blocked polyisocyanate compound (b3-1) having a blocked isocyanate group represented by Formula (IV) below:

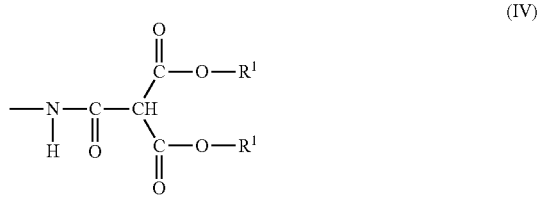

(IV)

wherein each $R^1$ is as defined above, and are identical or different,
with a secondary alcohol (b4) represented by Formula (VI) below:

(VI)

wherein $R^2$, $R^3$, $R^4$, and $R^5$ are as defined above.

3. The method for forming a multilayer coating film according to claim 1, wherein the blocked polyisocyanate compound (B) is obtainable by reacting a blocked polyisocyanate compound (b3-2) having a blocked isocyanate group represented by Formula (V) below:

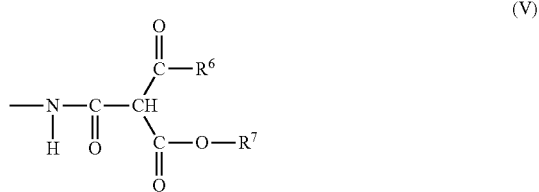

(V)

wherein $R^6$ is as defined above, and $R^7$ represents $C_{1-12}$ hydrocarbon, with a secondary alcohol (b4).

4. The method for forming a multilayer coating film according to claim 1, wherein the blocked polyisocyanate compound (B) is a blocked polyisocyanate compound (B') having a hydrophilic group.

5. The method for forming a multilayer coating film according to claim 1, wherein the hydroxy-containing acrylic resin (K) comprises a secondary hydroxy-containing polymerizable unsaturated monomer (k1-1) in an amount of 50 to 100 mass %, based on the total mass of hydroxy-containing polymerizable unsaturated monomer (k1).

6. The method for forming a multilayer coating film according to claim 1, wherein the hydroxy-containing acrylic resin (K) has a weight average molecular weight in the range of 2,000 to 50,000.

7. The method for forming a multilayer coating film according to claim 1, wherein the metal compound (M1) is a carboxylic acid metal salt compound.

8. The method for forming a multilayer coating film according to claim 1, wherein the organometallic catalyst (M) is used in an amount of 0.05 to 5 mass %, based on the total mass of the hydroxy-containing acrylic resin (K) and the polyisocyanate compound (L).

9. An article having a multilayer coating film formed by the method for forming a multilayer coating film of claim 1.

10. An article having a multilayer coating film formed by the method for forming a multilayer coating film of claim 2.

11. An article having a multilayer coating film formed by the method for forming a multilayer coating film of claim 3.

12. An article having a multilayer coating film formed by the method for forming a multilayer coating film of claim 4.

13. An article having a multilayer coating film formed by the method for forming a multilayer coating film of claim 5.

14. An article having a multilayer coating film formed by the method for forming a multilayer coating film of claim 6.

15. An article having a multilayer coating film formed by the method for forming a multilayer coating film of claim 7.

16. An article having a multilayer coating film formed by the method for forming a multilayer coating film of claim 8.

* * * * *